United States Patent
Sofman

[19]

[11] Patent Number: 5,937,042
[45] Date of Patent: *Aug. 10, 1999

[54] METHOD AND SYSTEM FOR REHOME OPTIMIZATION

[75] Inventor: Lev B. Sofman, Plano, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/620,727

[22] Filed: Mar. 19, 1996

[51] Int. Cl.[6] .................................................. H04M 15/00
[52] U.S. Cl. .......................... 379/113; 379/112; 379/134; 379/220; 379/269
[58] Field of Search ..................... 379/9–10, 15, 379/16, 17, 33, 34, 111, 113, 201, 207, 219, 220, 221, 229, 230, 269, 133, 136, 112, 115, 242, 134; 364/825.07, 825.17

[56] References Cited

U.S. PATENT DOCUMENTS

| | | | |
|---|---|---|---|
| 4,197,427 | 4/1980 | Hutcheson et al. | 379/113 |
| 4,464,543 | 8/1984 | Kline et al. | 179/8 R |
| 5,270,919 | 12/1993 | Blake et al. | 364/401 |
| 5,559,877 | 9/1996 | Ash et al. | 379/221 |

Primary Examiner—Curtis A. Kuntz
Assistant Examiner—Binh K. Tieu

[57] ABSTRACT

Provided is a method and system for rehome optimization of a telecommunications network. Optimal network configurations are determined according to automatically derived attributes associated with granulations of elements in the network called rehome circuit groups (RCGs). RCGs are automatically derived from the telecommunications network. RCGs are definable as a rehoming set of one or more circuits in the network. Optimal network configurations satisfy specified constraints and are calculated in accordance with cost objectives. Constraints include rehoming RCGs on criteria of having a relationship with other RCGs in the network and how to treat certain RCGs in the rehome process.

13 Claims, 55 Drawing Sheets

| ENUMERATION | SWITCH | SERVING AREA ID | RCG TYPE |
|---|---|---|---|
| 1 | S1 | C1&C2 | HW |
| 2 | S1 | T3 | TA |
| 3 | S1 | T1 | AO |
| 4 | S1 | T2 | AO |
| 5 | S2 | T2 | TA |
| 6 | S2 | T3 | TA |
| 7 | S2 | C3 | HW |
| 8 | S2 | T4 | TA |
| 9 | S2 | T3 | AO |
| 10 | S2 | T4 | AO |
| 11 | S2 | T5 | AO |
| 12 | S2 | T5 | TA |
| 13 | S3 | C4 | HW |
| 14 | S3 | T5 | AO |

FIG. 6 switches 5
RCGs 10
number_of_linear_resources 2
IMT_cost 1.000000
dist_cost 0.000000
port_balance_cost 0.000000
permut_max 99
RC_max_cost 100.320000
number_of_solutions 5
number_of_diversity_groups 3
number_of_RCG's_not_to_be_rehomed 1
detail_lvl 1
prt_statist 1
dist_flag 1
HA_flag 1
div_flag 1
permut_flag 1
RC_flag 0
NR_flag 1
depth_max 3
norm_type 1
port_dispers_norm_type 2
impat_flag 1
iter_limit 0
attempt 5
time_out 99999
time_res_store 100
range 10
relax 5

FIG. 23

RCG-RCG_Traffic_Data:

4.000000 7.000000 2.000000 2.000000 2.000000 6.000000 8.000000 4.000000 4.000000
0.000000 0.000000 8.000000 3.000000 7.000000 1.000000 9.000000 3.000000 6.000000
4.000000 4.000000 3.000000 2.000000 9.000000 4.000000 5.000000 0.000000 2.000000
3.000000 3.000000 4.000000 8.000000 0.000000 7.000000 5.000000 4.000000 9.000000
0.000000 1.000000 1.000000 4.000000 7.000000 7.000000 6.000000 5.000000 8.000000
8.000000 7.000000 5.000000 4.000000 6.000000 8.000000 4.000000 5.000000 7.000000
9.000000 0.000000 7.000000 1.000000 6.000000 2.000000 1.000000 8.000000 3.000000
0.000000 6.000000 9.000000 7.000000 1.000000 8.000000 8.000000 7.000000 5.000000
2.000000 5.000000 2.000000 5.000000 6.000000 9.000000 0.000000 3.000000 9.000000
4.000000 1.000000 9.000000 4.000000 8.000000 4.000000 3.000000 6.000000 3.000000

RCG-Switch_Distance_Data:
8.000000 1.000000 9.000000 4.000000 4.000000
4.000000 1.000000 8.000000 3.000000 1.000000
0.000000 6.000000 0.000000 4.000000 9.000000
4.000000 9.000000 5.000000 8.000000 7.000000
0.000000 1.000000 2.000000 3.000000 9.000000
8.000000 8.000000 1.000000 0.000000 5.000000
2.000000 8.000000 6.000000 9.000000 4.000000
4.000000 3.000000 1.000000 1.000000 8.000000
3.000000 7.000000 4.000000 2.000000 8.000000
9.000000 8.000000 7.000000 3.000000 8.000000

Non_linear_constraint BHCA per_pair_of_RCG's 6.000000 0.000000 4.000000 6.000000 4.000000 2.000000 9.000000 5.000000 3.000000
6.000000 8.000000 2.000000 9.000000 1.000000 2.000000 2.000000 0.000000 1.000000
5.000000 0.000000 3.000000 2.000000 6.000000 8.000000 7.000000 8.000000 5.000000
0.000000 0.000000 8.000000 0.000000 0.000000 9.000000 6.000000 9.000000 0.000000
6.000000 6.000000 6.000000 8.000000 0.000000 7.000000 7.000000 9.000000 4.000000
6.000000 4.000000 3.000000 0.000000 0.000000 4.000000 7.000000 2.000000 0.000000
1.000000 5.000000 9.000000 9.000000 8.000000 3.000000 5.000000 1.000000 5.000000
1.000000 5.000000 4.000000 0.000000 6.000000 1.000000 2.000000 3.000000 5.000000
0.000000 5.000000 7.000000 0.000000 4.000000 4.000000 6.000000 7.000000 1.000000
8.000000 6.000000 6.000000 2.000000 5.000000 1.000000 1.000000 8.000000 5.000000 per_RCG 85.000000 78.000000 110.000000 71.000000 96.000000 77.000000 107.000000 95.00000

Non_linear_constraint_for_MCI_Switches:
    BHCA 137.000000 97.000000 245.000000 112.000000 228.000000

Linear_Constraints_for_RCG:

FIG. 24

Linear_Constrain_#_1

7.000000 4.000000 6.000000 0.000000 5.000000 6.000000 2.000000 5.000000 4.000000

Linear_constrain_#_2

7.000000 0.000000 2.000000 1.000000 0.000000 1.000000 2.000000 0.000000 8.000000

Linear_Constraints_for_MCI_Switches:

Linear_Constrain_#_1

9.000000 10.000000 16.000000 11.000000 23.000000

Linear_Constrain_#_2

6.000000 5.000000 20.000000 7.000000 13.000000

Distance_constraints_for_switches:

4.000000 3.000000 7.000000 4.000000 9.000000 n_HA_counters_array:     7 3 8 1 3

HA_constraints:

```
1 1 3 1 5 6 7
1 2 3
1 2 3 4 5 6 1 8
1
2 2 3
``` n_el_counters_array:  2 2 2

Diversity_groups:

```
5 2
9 1
1 2
```

RCG's_not_to_be_rehomed:

1

Initial_assignment:

Thu Sep 14 13:41:39 1995

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Input   data (the scope of the problem):

| FSID | Status |
|---|---|
| DNG1 | A |
| DNG2 | A |

← 552

| FSID | Serv.Area | Type | #ckt |
|---|---|---|---|
| DNG1 | DNG1DALTERM | HW | 3 |
| DNG1 | DOCSNY11111 | AO | 168 |
| DNG1 | LGRCILLGHIN | AO | 12 |
| DNG1 | MRSBILDNG01 | AO | 385 |
| DNG1 | TVS1ILDNG06 | AO | 120 |
| DNG1 | TVS1ILDNG07 | AO | 120 |
| DNG1 | TVS1ILDNG08 | AO | 120 |
| DNG1 | TVS1ILDNG09 | AO | 120 |
| DNG1 | TVS1ILDNG10 | AO | 120 |
| DNG1 | TVS1ILDNG11 | AO | 120 |
| DNG1 | TVS1ILDNG12 | AO | 120 |
| DNG1 | TVS1ILDNG13 | AO | 120 |
| DNG1 | TVS1ILDNG14 | AO | 120 |
| DNG1 | TVS2ILDNG01 | AO | 120 |
| DNG1 | TVS2ILDNG02 | AO | 120 |
| DNG1 | TVS2ILDNG03 | AO | 120 |
| DNG1 | TVS2ILDNG04 | AO | 120 |
| DNG1 | TVS2ILDNG05 | AO | 120 |
| DNG2 | APPLWIO10GT | AO | 156 |
| DNG2 | APPLWI011GT | AO | 12 |
| DNG2 | APPLWI0161T | AO | 24 |
| DNG2 | BLTNILXD50T | AO | 633 |
| DNG2 | BLTNILXN50T | AO | 24 |
| DNG2 | CHCGILWB12T | AO | 30 |
| DNG2 | CHCGILWB50T | AO | 24 |
| DNG2 | CHLCMOMI06T | AO | 6 |
| DNG2 | CHMPILCP51T | AO | 756 |
| DNG2 | CLMAMOXA01T | AO | 6 |
| DNG2 | COVLILCQ50T | AO | 6 |
| DNG2 | COVLILCQ50T | TA | 24 |
| DNG2 | CRDLILXE51T | AO | 168 |
| DNG2 | CRPNINCX10T | AO | 24 |
| DNG2 | DCTRILDC51T | AO | 270 |
| DNG2 | DCTRILDC51T | TA | 192 |
| DNG2 | DDCYKS0107T | AO | 6 |
| DNG2 | DESMIADT18T | AO | 6 |
| DNG2 | DGVLWIXA31T | AO | 24 |
| DNG2 | DIXNILXA50T | AO | 60 |
| DNG2 | DIXNILXA50T | TA | 120 |
| DNG2 | DKLBILXA50T | AO | 312 |
| DNG2 | DKLBILXA50T | TA | 192 |
| DNG2 | DNG2DALTERM | HW | 34627 |
| DNG2 | EUCLWI011GT | AO | 12 |
| DNG2 | EUCLWI0161T | AO | 30 |
| DNG2 | FRPTILXA50T | AO | 154 |
| DNG2 | FRPTILXA50T | TA | 144 |
| DNG2 | GARYINGO10T | AO | 48 |

| | | | |
|---|---|---|---|
| DNG2 | GLBGILXD50T | AO | 10 |
| DNG2 | GLBGILXD50T | TA | 48 |
| DNG2 | GNBYWI0161T | AO | 24 |
| DNG2 | HFESILWL50T | AO | 24 |
| DNG2 | HTSNKS0207T | AO | 6 |
| DNG2 | JCVLILXC50T | AO | 318 |
| DNG2 | JCVLILXC50T | TA | 168 |
| DNG2 | JFCYMOXA11T | AO | 24 |
| DNG2 | KEWNILXD50T | AO | 72 |
| DNG2 | KEWNILXD50T | TA | 48 |
| DNG2 | KKVLMOMO10T | AO | 6 |
| DNG2 | KSCYKSJO07T | AO | 12 |
| DNG2 | KSCYMO5503T | AO | 6 |
| DNG2 | LCRSWIXC61T | AO | 6 |
| DNG2 | LGRCILLGHIN | AO | 2076 |
| DNG2 | LGRCILLG50T | AO | 624 |
| DNG2 | LNCLILXC50T | AO | 144 |
| DNG2 | LNCLILXC50T | TA | 72 |
| DNG2 | LXTNKYXA08T | AO | 6 |
| DNG2 | MCMBILXD50T | AO | 48 |
| DNG2 | MCMBILXD50T | TA | 96 |
| DNG2 | MDSNWI111GT | AO | 12 |
| DNG2 | MDSNWI1161T | AO | 24 |
| DNG2 | MILWWI121GT | AO | 24 |
| DNG2 | MILWWI1261T | AO | 24 |
| DNG2 | MNFDOHXA51T | AO | 6 |
| DNG2 | MPLSMNDT12T | AO | 24 |
| DNG2 | MRQTMIMN20T | AO | 18 |
| DNG2 | MTMOILXDDSO | AO | 24 |
| DNG2 | NBRKILNT52T | AO | 36 |
| DNG2 | OMAHNENW03T | AO | 18 |
| DNG2 | OWBOKYMA1GT | AO | 6 |
| DNG2 | PEORILPJ52T | AO | 822 |
| DNG2 | PRSSKSWA07T | AO | 12 |
| DNG2 | PRTNILXA50T | AO | 168 |
| DNG2 | RCFRILRT52T | AO | 702 |
| DNG2 | RCHEILXA50T | AO | 24 |
| DNG2 | SKSTMOGR04T | AO | 24 |
| DNG2 | SNPRWIXA51T | AO | 24 |
| DNG2 | SPFDILES52T | AO | 744 |
| DNG2 | SPFDMOTL02T | AO | 30 |
| DNG2 | SPRRWI1261T | AO | 6 |
| DNG2 | SRBLIAXODS0 | AO | 144 |
| DNG2 | STJSMODN03T | AO | 6 |
| DNG2 | STLSMO05FUL | AO | 6 |
| DNG2 | STLSMO0501T | AO | 78 |
| DNG2 | STPTWI0161T | AO | 6 |
| DNG2 | TPKAKSJA07T | AO | 6 |
| DNG2 | TVSLILDNG09 | AO | 240 |
| DNG2 | TVSLILDNG14 | AO | 96 |
| DNG2 | WAUSWIXA31T | AO | 24 |
| DNG2 | WAUSWIXB51T | AO | 24 |
| DNG2 | WCHTKSBR07T | AO | 18 |

← 554

Weight coefficients for the cost factors:
    IMT factor            - 0.700000
    distance factor      - 0.000000 ← 556
    port balance factor   - 0.300000

The original cost is 1.00 ← 558

FIG. 27C

Total TSA-TSA traffic = 19194.09 — 560
* Total IMT traffic: 68.7 * — 562
* Total intraswitch traffic: 19125.4 *
    and by switches: — 566   564
    0.0   19125.4
Port utilization for FX circuits (in absolute values and %%)
    2245.0  (3.5%)   10721.0  (41.1%) ◄ — 568
Medium port utilization = 0.144857 ——— 570
Measure of dispersion   = 0.424305 ——— 572
*****************************************************************
The best found assignments are:
                    — 574
Solution #1:
-----------------

| FSID | Serv.Area | Type | #ckt | Rehomings |
|------|-----------|------|------|-----------|
| DNG1 | DNG1DALTERM | HW | 3 | |
| DNG1 | DOCSNY11111 | AO | 168 | should be rehomed to a switch DNG2 |
| DNG1 | LGRCILLGHIN | AO | 12 | |
| DNG1 | MRSBILDNG01 | AO | 385 | |
| DNG1 | TVSLILDNG06 | AO | 120 | |
| DNG1 | TVSLILDNG07 | AO | 120 | should be rehomed to a switch DNG2 |
| DNG1 | TVSLILDNG08 | AO | 120 | |
| DNG1 | TVSLILDNG09 | AO | 120 | should be rehomed to a switch DNG2 |
| DNG1 | TVSLILDNG10 | AO | 120 | |
| DNG1 | TVSLILDNG11 | AO | 120 | |
| DNGI | TVSLILDNG12 | AO | 120 | should be rehomed to a switch DNG2 |
| DNG1 | TVSLILDNG13 | AO | 120 | |
| DNG1 | TVSLILDNG14 | AO | 120 | |
| DNG1 | TVS2ILDNG01 | AO | 120 | should be rehomed to a switch DNG2 |
| DNG1 | TVS2ILDNG02 | AO | 120 | |
| DNG1 | TVS2ILDNG03 | AO | 120 | should be rehomed to a switch DNG2 |
| DNG1 | TVS2ILDNG04 | AO | 120 | |
| DNG1 | TVS2ILDNG05 | AO | 120 | should be rehomed to a switch DNG2 |
| DNG2 | APPLWI010GT | AO | 156 | should be rehomed to a switch DNG1 |
| DNG2 | APPLWI011GT | AO | 12 | should be rehomed to a switch DNG1 |
| DNG2 | APPLWI0161T | AO | 24 | should be rehomed to a switch DNG1 |
| DNG2 | BLTNILXD50T | AO | 633 | |
| DNG2 | BLTNILXN50T | AO | 24 | should be rehomed to a switch DNG1 |
| DNG2 | CHCGILWB12T | AO | 30 | should be rehomed to a switch DNG1 |
| DNG2 | CHCGILWB50T | AO | 24 | should be rehomed to a switch DNG1 |
| DNG2 | CHLCMOMI06T | AO | 6 | should be rehomed to a switch DNG1 |
| DNG2 | CHMPILCP51T | AO | 756 | |
| DNG2 | CLMAMOXA01T | AO | 6 | should be rehomed to a switch DNG1 |
| DNG2 | COVLILCQ50T | AO | 6 | should be rehomed to a switch DNG1 |
| DNG2 | COVLILCQ50T | TA | 24 | should be rehomed to a switch DNG1 |
| DNG2 | CRDLILXE51T | AO | 168 | should be rehomed to a switch DNG1 |
| DNG2 | CRPNINCX10T | AO | 24 | should be rehomed to a switch DNG1 |
| DNG2 | DCTRILDC51T | AO | 270 | |
| DNG2 | DCTRILDC51T | TA | 192 | |
| DNG2 | DDCYKS0107T | AO | 6 | should be rehomed to a switch DNG1 |
| DNG2 | DESMIADT18T | AO | 6 | should be rehomed to a switch DNG1 |
| DNG2 | DGVLWIXA31T | AO | 24 | should be rehomed to a switch DNG1 |
| DNG2 | DIXNILXA50T | AO | 60 | |
| DNG2 | DIXNILXA50T | TA | 120 | |
| DNG2 | DKLBILXA50T | AO | 312 | |
| DNG2 | DKLBILXA50T | TA | 192 | |

FIG. 27D

| | | | | |
|---|---|---|---|---|
| DNG2 | DNG2DALTERM | HW | 34627 | |
| DNG2 | EUCLWI011GT | AO | 12 | should be rehomed to a switch DNG1 |
| DNG2 | EUCLWI0161T | AO | 30 | should be rehomed to a switch DNG1 |
| DNG2 | FRPTILXA50T | AO | 154 | |
| DNG2 | FRPTILXA50T | TA | 144 | |
| DNG2 | GARYINGO10T | AO | 48 | should be rehomed to a switch DNG1 |
| DNG2 | GLBGILXD50T | AO | 10 | |
| DNG2 | GLBGILXD50T | TA | 48 | |
| DNG2 | GNBYWI0161T | AO | 24 | should be rehomed to a switch DNG1 |
| DNG2 | HFESILWL50T | AO | 24 | |
| DNG2 | HTSNKS0207T | AO | 6 | should be rehomed to a switch DNG1 |
| DNG2 | JCVLILXC50T | AO | 318 | |
| DNG2 | JCVLILXC50T | TA | 168 | |
| DNG2 | JFCYMOXA11T | AO | 24 | should be rehomed to a switch DNG1 |
| DNG2 | KEWNILXD50T | AO | 72 | |
| DNG2 | KEWNILXD50T | TA | 48 | |
| DNG2 | KKVLMOMO10T | AO | 6 | should be rehomed to a switch DNG1 |
| DNG2 | KSCYKSJO07T | AO | 12 | should be rehomed to a switch DNG1 |
| DNG2 | KSCYMO5503T | AO | 6 | should be rehomed to a switch DNG1 |
| DNG2 | LCRSWIXC61T | AO | 6 | should be rehomed to a switch DNG1 |
| DNG2 | LGRCILLGHIN | AO | 2076 | |
| DNG2 | LGRCILLG50T | AO | 624 | should be rehomed to a switch DNG1 |
| DNG2 | LNCLILXC50T | AO | 144 | |
| DNG2 | LNCLILXC50T | TA | 72 | |
| DNG2 | LXTNKYXA08T | AO | 6 | should be rehomed to a switch DNG1 |
| DNG2 | MCMBILXD50T | AO | 48 | should be rehomed to a switch DNG1 |
| DNG2 | MCMBILXD50T | TA | 96 | |
| DNG2 | MDSNWI111GT | AO | 12 | ← 576 |
| DNG2 | MDSNWI1161T | AO | 24 | should be rehomed to a switch DNG1 |
| DNG2 | MILWWI121GT | AO | 24 | |
| DNG2 | MILWWI1261T | AO | 24 | should be rehomed to a switch DNG1 |
| DNG2 | MNFDOHXA51T | AO | 6 | should be rehomed to a switch DNG1 |
| DNG2 | MPLSMNDT12T | AO | 24 | should be rehomed to a switch DNG1 |
| DNG2 | MRQTMIMN20T | AO | 18 | should be rehomed to a switch DNG1 |
| DNG2 | MTMOILXDDS0 | AO | 24 | |
| DNG2 | NBRKILNT52T | AO | 36 | should be rehomed to a switch DNG1 |
| DNG2 | OMAHNENW03T | AO | 18 | should be rehomed to a switch DNG1 |
| DNG2 | OWBOKYMA1GT | AO | 6 | should be rehomed to a switch DNG1 |
| DNG2 | PEORILPJ52T | AO | 822 | |
| DNG2 | PRSSKSWA07T | AO | 12 | should be rehomed to a switch DNG1 |
| DNG2 | PRTNILXA50T | AO | 168 | |
| DNG2 | RCFRILRT52T | AO | 702 | |
| DNG2 | RCHEILXA50T | AO | 24 | should be rehomed to a switch DNG1 |
| DNG2 | SKSTMOGR04T | AO | 24 | should be rehomed to a switch DNG1 |
| DNG2 | SNPRWIXA51T | AO | 24 | should be rehomed to a switch DNG1 |
| DNG2 | SPFDILES52T | AO | 744 | |
| DNG2 | SPFDMOTL02T | AO | 30 | should be rehomed to a switch DNG1 |
| DNG2 | SPRRWI1261T | AO | 6 | should be rehomed to a switch DNG1 |
| DNG2 | SRBLIAXODS0 | AO | 144 | should be rehomed to a switch DNG1 |
| DNG2 | STJSMODN03T | AO | 6 | should be rehomed to a switch DNG1 |
| DNG2 | STLSMO05FUL | AO | 6 | should be rehomed to a switch DNG1 |
| DNG2 | STLSMO0501T | AO | 78 | should be rehomed to a switch DNG1 |
| DNG2 | STPTWI0161T | AO | 6 | should be rehomed to a switch DNG1 |
| DNG2 | TPKAKSJA07T | AO | 6 | should be rehomed to a switch DNG1 |
| DNG2 | TVSLILDNG09 | AO | 240 | should be rehomed to a switch DNG1 |
| DNG2 | TVSLILDNG14 | AO | 96 | |
| DNG2 | WAUSWIXA31T | AO | 24 | should be rehomed to a switch DNG1 |
| DNG2 | WAUSWIXB51T | AO | 24 | should be rehomed to a switch DNG1 |
| DNG2 | WCHTKSBR07T | AO | 18 | should be rehomed to a switch DNG1 |

FIG. 27E

The original cost is 1.00           *580*
The cost of this solution is 0.26 ——⟋      *582*
Cost gain vs. original assignment = 0.74 ——⟋
Number of rehomings = 59 ——*584*

Total TSA-TSA traffic = 19194.09 ———*586*
* Total IMT traffic: 0.0 * ←———*588*
* Total intraswitch traffic: 19194.1 * ←———*590*
  and by switches:
  0.0   19194.1 ←———*592*
Port utilization for FX circuits (in absolute values and %%)
  3577.0 (5.6%)   9389.0 (36.0%) ←———*594*
Medium port utilization = 0.144857 ——— *596*
Measure of dispersion    = 0.366771 ——— *598*

Switch Data:

| Field | Format |
|---|---|
| FSID | CHAR(4) |
| Division | CHAR(2) |
| Region | CHAR(1) |
| Resource Limits:<br>    Max Number of Ports<br>    Max Busy Hour Call Attempts<br>    Max TPS | <br>INTEGER(6)<br>INTEGER(6)<br>INTEGER(6) |
| Available Resource:<br>    Available Number of Ports<br>    Available BHCA for each hour of 24 hours: | <br>INTEGER(6)<br>INTEGER(6) each |

FIG. 28

RCG Data:

| Field | Format |
|---|---|
| RCG ID | INTEGER(6) |
| FSID | CHAR(4) |
| Serving Area CLLI | CHAR(11) |
| RCG Type | CHAR(2) |
| Number of Circuits | INTEGER(6) |
| A record for each hour of 24 Hour Traffic:<br>    Access Call Attempts<br>    Egress Call Attempts<br>    RCG CCS | <br>INTEGER(9)<br>INTEGER(9)<br>INTEGER(9) |
| TPS | INTEGER(6) |

FIG. 29

RCG - RCG Data:

| Field | Format |
|---|---|
| Originating RCG ID | INTEGER(6) |
| Terminating RCG ID | INTEGER(6) |
| A record for each hour of 24 Hour Traffic:<br>    Blocked Call Attempts<br>    Outpulsed Call Attempts<br>    RCG to RCG CCS | <br>INTEGER(7)<br>INTEGER(7)<br>INTEGER(9) |
| Daily Call Attempts | INTEGER(11) |
| Daily CCS | INTEGER(13) |
| Average CCS per hour | INTEGER(9) |

599B points to the 24 Hour Traffic row.

FIG. 30

Distance Data:

| Field | Format |
|---|---|
| FSID | CHAR(4) |
| RCG ID | INTEGER(6) |
| Mileage | INTEGER(6) |

599H points to the Mileage row.

FIG. 31

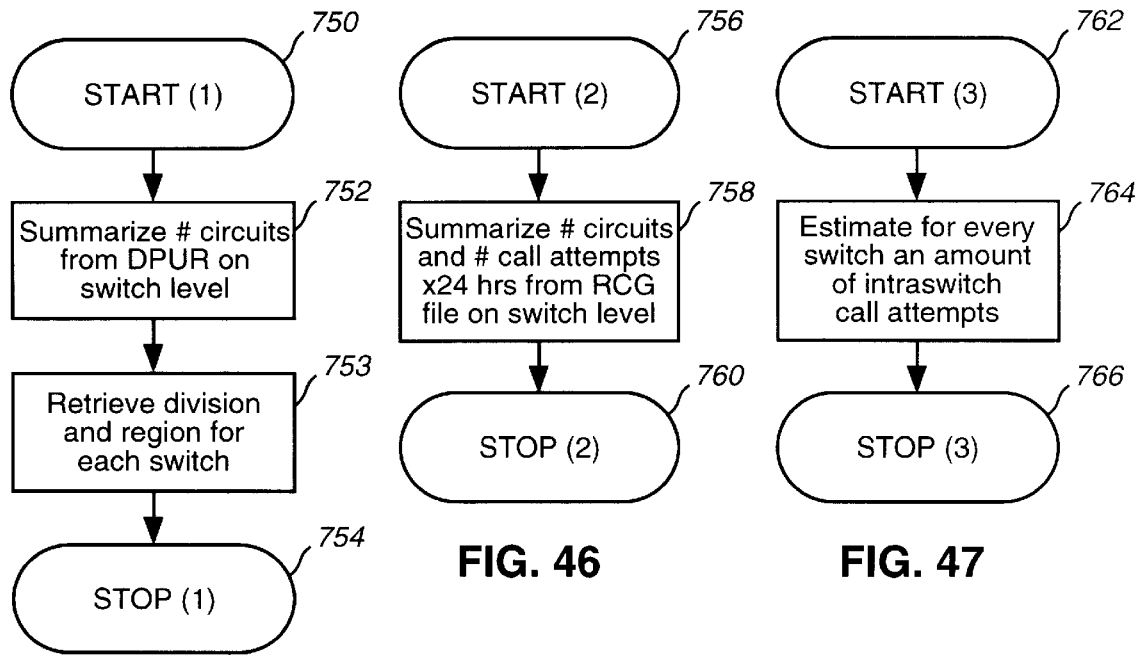
FIG. 45   FIG. 46   FIG. 47
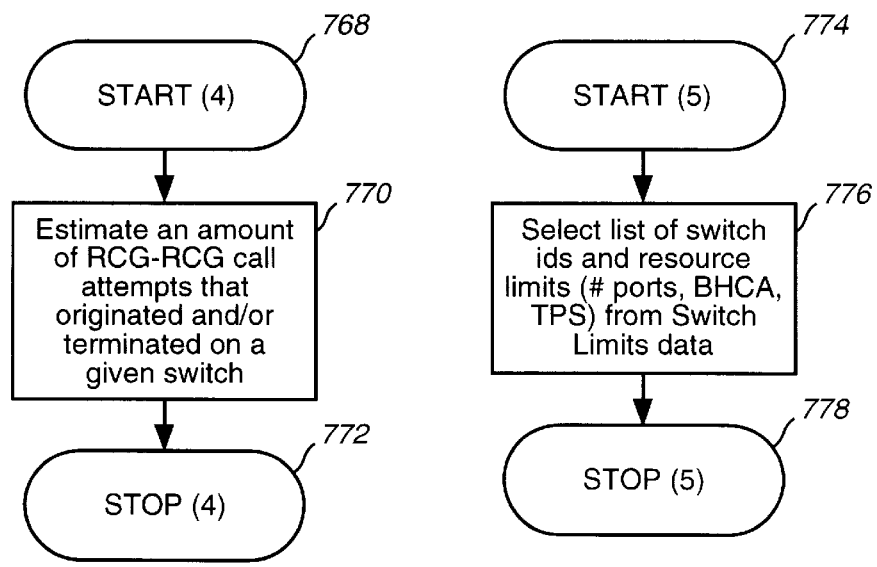
FIG. 48   FIG. 49

(p,k) -Enumeration Method

This is a method of (p,k) -enumeration of all vectors in k-neighborhood of a given R-dimensional assignment vector x, where p(t) is a permutation defined on R-dimensional vector t.

1. Initialise R-dimensional vector USED:

```
for (i=0; i<R; i++)
   USED[i] =0;
```

2. Set y = x (x and y are assignment vectors from (S,R)-vector sets.

3. Execute procedure PIVOT (int* y, int& n, int k, int start).

Here is a description of the recurcive procedure PIVOT.

```
int* PIVOT (int* y, int& n, int k, int start)
{
  int i, t, s;
  int hold;
  int nl;

n1 = n - 1;
  for   (t = start; t, < R; t++)
     if (!USED[p[t]])
     {
        USED([p[t]]) = 1;
        hold = y[p[t]];
        for (s = 0; s < S; s++)
        {
           y[p[t]] = s;
           if (n1 > 0)
               PIVOT (y, nl, k, t+1)
           else
              if (x not = y)
                    return y;
        }
     }
}
```

FIG. 57

METHOD AND SYSTEM FOR REHOME OPTIMIZATION

TECHNICAL FIELD OF THE INVENTION

The present invention relates in general to telecommunication networks having a plurality of nodes such as switches, and in particular, to a method and system for telecommunications topology optimization. Still more particularly, the present invention relates to a method and system for determining an optimal telecommunications network configuration.

BACKGROUND OF THE INVENTION

As a part of telecommunications network planning and provisioning activity, administrators have to make decisions about configuring resources in a geographical area targeted for change, enhancements or new facilities. The term rehome or rehoming, used as a noun, refers to a network change which involves moving telephone service traffic from one switching center to a different switching center. Likewise, the term rehome or rehoming, used in a verb sense, is referred to as making the network change of moving telephone service traffic from one switching center to a different switching center. For example, traffic on a first trunk between a first switch and a second switch may be rehomed onto a second trunk between the first switch and a third switch.

The need for rehoming may result from switch decommission or failure, network optimization, switch upgrades, new installations, migration such as from an hierarchical network to a flat network, phase out of equipment, or the like. When the network traffic is not balanced properly, switches can become overloaded, calls are blocked (e.g. fast busy signal) and revenue is lost.

Currently, administrators make major network decisions involving rehoming with mostly manual methods using traffic and resource information from different systems. This takes much time. Some systems have fancy Graphical User Interfaces (GUIs) but provide little rehoming calculation and functionality. For example, U.S. Pat. No. 5,270,919, entitled "Network Planning Tool", describes a fancy Graphical User Interface (GUI), but provides little rehoming optimization. Creating a user interface is straightforward. Implementing valuable functionality for the interface is challenging. Minimizing the cost of a rehoming solution while maximizing traffic efficiency is difficult.

In conventional network configuration environments, interfaces to digital switches exist. Operators can reconfigure such digital switches through software applications. Network failure alarms may warrant rehoming. Many restoration methods such as centralized restoration, dynamic restoration and self healing networks restore communications with priority for minimized restoration time. Consequently, such techniques may not achieve the best solution for the entire network.

Thus, rehomes are essential during network planning and growth, network maintenance, and in failure situations. Configuration or reconfiguration often requires rehoming traffic from one switch to an other switch.

SUMMARY OF THE INVENTION

The present invention provides the ability to distribute telecommunications traffic properly on a switched network by automatically analyzing network data, calculating optimal network configurations according to the network data, and presenting recommendations for rehome configurations.

In the preferred embodiment, network data is automatically gathered from the telecommunications network by a Data Granulator process. The data characterizes the current state of currently deployed network resources, including traffic throughput and resource availability. Switch information such as switch specifications and distances between switches is collected for a network topology. Circuit information is also collected. A circuit is a minimal network granulation, a medium upon which a single telephone call is embodied. The circuit may be embodied as a single analog session between telephone users or a single timeslot dedicated to a single telephone session between users over a digital network connection. Logical groups of circuits, referred herein as Rehome Circuit Groups (RCGs), are collected for the switches. Traffic information is associated to the RCGs.

An RCG is a group of circuits considered a logical indivisible entity in the process of rehoming. Actual circuits which are members of an RCG are automatically determined. An RCG may be any set of circuits which can be an object for rehoming. This includes a single circuit or a group of circuits having a switch as a control end, such as a trunk or multiple trunks.

A Rehoming Optimizer process analyzes the data collected, calculates candidate rehoming solutions, and produces a report which is easily read by a human. The report provides candidate rehoming solutions according to cost objectives and constraints specified by the human.

The rehoming optimizer includes a user interface which allows an administrator to specify constraints and cost objectives that must be used when calculating rehome solutions. The administrator's network knowledge and specific network requirements can be factored in to calculations.

An administrator specifies cost objectives through selecting weight coefficients to particular network characteristics, for example, traffic amounts on Intermachine Trunks (IMT), distances between switches, and balancing ports of switches. The weight coefficients are used by the rehoming optimizer to associate costs with candidate solutions. The administrator may also specify a cost limit for which all candidate solutions must adhere to.

An administrator specifies constraints through selecting or specifying switch capacity constraints, distance limit constraints, and network configuration constraints. Constraints provide information for focusing the rehoming optimizer solutions, thus, limiting the set of candidate solutions. Constraints are discussed in detail later in this specification.

One advantage of the present invention is providing an improved method and system of rehome optimization for the purpose of strategic planning, maintaining a network, and deployment of network resources. Time consuming manual processes are removed. Determination of accurate network solutions is automated. Network efficiency is assured.

Another advantage is that the present invention is conveniently flexible in allowing a user, such as an administrator, to specify constraints and criteria for calculations. Variables important to a rehoming process can be provided as user input. Thus, trial and error attempts at a solution are minimized.

Another advantage of the present invention is interswitch traffic can be minimized (or intraswitch traffic maximized), subject to resource constraints. Intraswitch traffic is a numerical representation of a Community of Interest (COI) factor. A COI relates to grouping telephone users that call each other with a high degree of frequency. Communities of interest affect plans for deployment of new switches and other resources which are associated with the COI.

Yet another advantage of the present invention is calculation of rehome optimization solutions according to cost objectives. A cost function is utilized which considers appropriate factors of COI, including IMT, distances between network resources such as between local tandems and switches, and port balancing.

It is another advantage of the present invention to allow a user, for example an administrator, to define a scope of a network problem in terms of RCGs, a calculable and minimal granulation of network resources which are appropriately subject for rehoming. Any subset of network circuits making an RCG is generically and accurately processed.

Another advantage of the present invention is it provides an improved method and system of rehome optimization in response to a network alarm such as a traffic threshold exceeded or a failure detected on a switch. Further, the present invention can validate that restoration processes have performed appropriately. Accurate rehoming from the standpoint of the entire network is achieved.

The present invention provides a data processing system which can be driven by a user through an arbitrary type of End User Interface (EUI).

Another advantage of the present invention is improvement of data integrity used by the rehoming calculation process. An automated data gathering subsystem is provided in order to remove human input of data.

The foregoing advantages are achieved as is now described. A method and system are disclosed for rehome optimization. The present invention allows determination of optimal telecommunications network configurations according to automatically derived attributes associated with optimal granulations called Rehome Circuit Groups (RCGs) of a telecommunications network.

The above as well as additional objects, features and advantages of the present invention will become apparent in the following detailed written description.

BRIEF DESCRIPTION OF DRAWINGS

FIG. 6 depicts a table with examples of RCGs which may occur as the result of the topology as described by FIG. 5;

FIG. 7 through FIG. 26 and FIG. 27A through FIG. 27F depict an example embodiment of an EUI, namely, a Graphical User Interface (GUI) for the present invention;

FIG. 28 through FIG. 31 depict tables describing a preferred embodiment of data collected and calculated from various telecommunications network resources;

FIG. 35 through FIG. 51 depicts flowcharts of a preferred embodiment for the automated data gathering aspect of the present invention;

FIG. 57 depicts a C programming example for implementing the (p,k) enumeration method of the present invention.

DETAILED DESCRIPTION OF THE INVENTION

Figure 1:
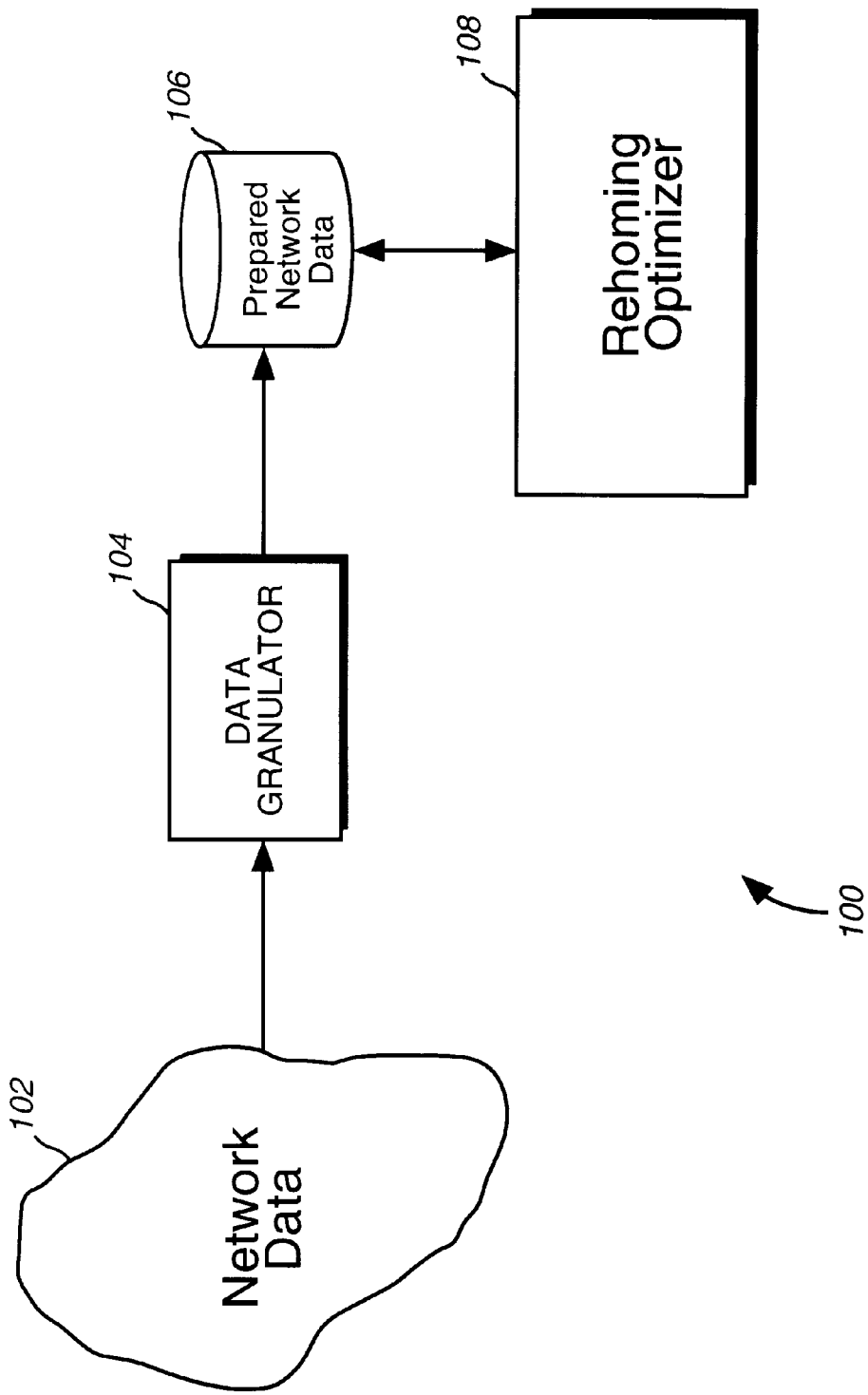
FIG. 1 depicts a high level design representation of a preferred embodiment of the present invention.

FIG. 1 depicts a high level design representation of a preferred embodiment of the present invention. This embodiment includes a Data Granulator 104 which accesses network data 102 and builds switch and RCG data into a Database 106, and a Rehoming Optimizer 108 which uses database 106 as input. Rehoming optimizer 108 interfaces with a user through an EUI. The user specifies cost objectives and constraints for focusing rehoming optimizer calculations. Rehoming optimizer 108 uses user input data together with data from database 106 to calculate rehoming solutions for optimal network configurations. Solutions are then presented and managed through the EUI of the rehoming optimizer.

Data granulator 104 and rehoming optimizer 108 are independent processes each of which may or may not execute with knowledge that the other is executing. In a preferred embodiment, data granulator 104 and rehoming optimizer 108 be synchronized to established copies of data in the database 106. The preferred embodiment of the present invention executes data granulator 104 in such a way that the database 106 will contain a substantially recent snapshot of data for use by the rehoming optimizer 108.

Figure 2A:
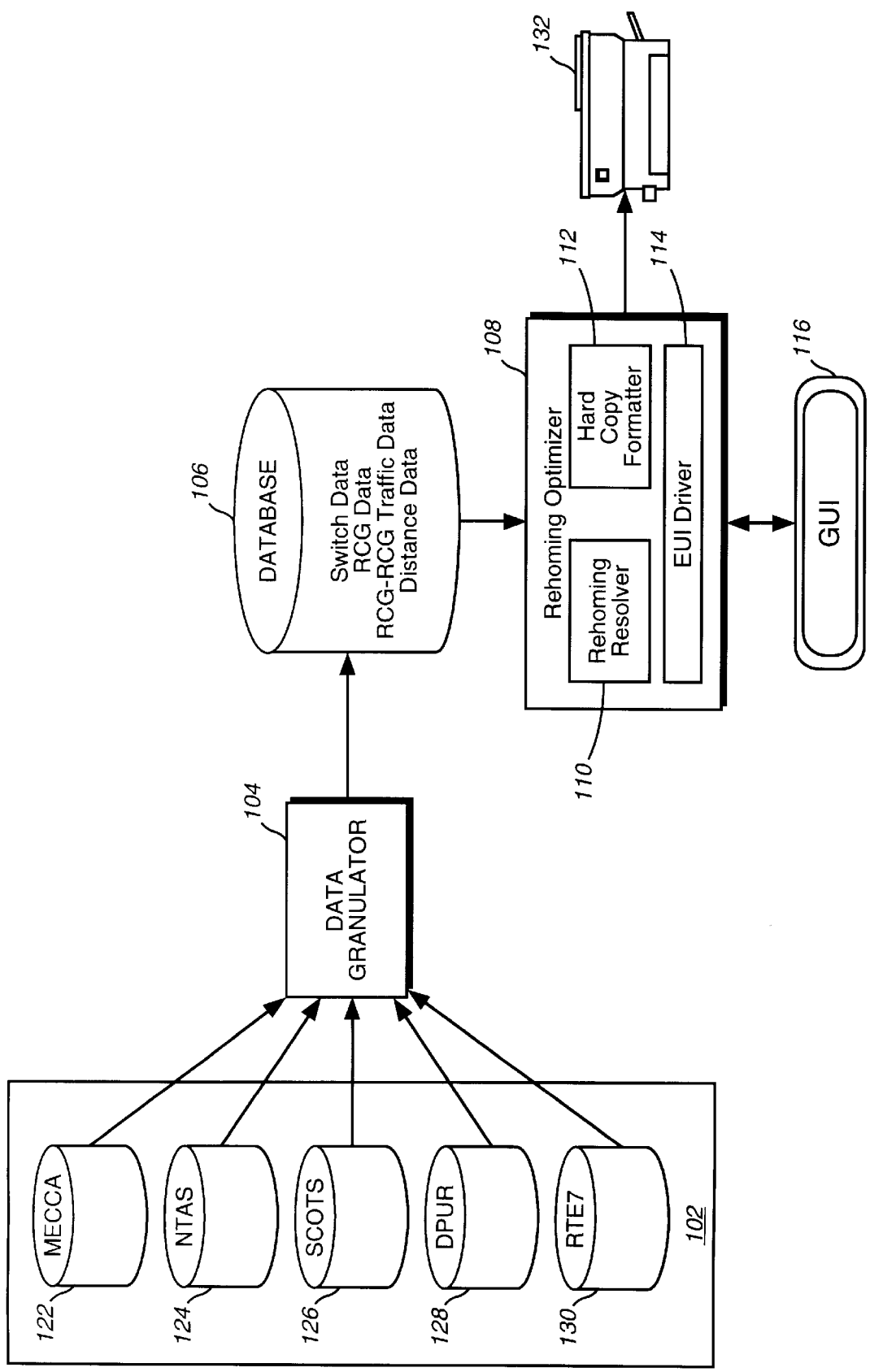
FIG. 2A depicts a design representation of a preferred embodiment of the present invention used as a stand-alone network planning tool.

With reference now to FIG. 2A, depicted is a design representation of a preferred embodiment of the present invention used as a stand-alone network planning tool. The data granulator 104 accesses various data repositories from a telecommunications network and derives a database 106 which is used as input to the rehoming optimizer 108. In a preferred embodiment, the data repositories accessed are MECCA (Multiplex Engineering Control Center Activity) data 122, NTAS (Network Traffic Analysis System) data 124, SCOTS (Switched Circuit Order and Tracking System) data 126, DPUR (Digital Port Utilization Report) data 128 and RTE7 (Route-7) data 130, all of which are data repositories maintained by their respective systems in an MCI telecommunications network (MCI is a registered trademark of MCI corporation).

This embodiment is described in terms of these example data repositories to facilitate discussion. After reading this description, it will become apparent to a person skilled in the relevant art how to implement this embodiment using other data sources in alternative telecommunication networks.

MECCA 122 is an integrated, automated data processing system that supports the business functions of managing and expanding the MCI multiplex network. NTAS 124 is a system which provides the traffic information for switches, trunk groups, end offices, serving areas and routing statistics. SCOTS 126 is an automated system which creates all shared switched circuit orders and allows maintaining of circuit provisioning related data. A DPUR 128 shows port and span usage versus installed port base for switches in the MCI network. RTE7 130 data provides routing information in the MCI network. Those skilled in the art will appreciate that substantially the same data may be obtained from other systems without departing from the spirit and scope of the invention.

The rehoming optimizer 108 includes a Rehoming Resolver 110 which calculates optimal network solutions, an End User Interface (EUI) Driver 114 which drives a user interface that prepares data for the rehoming resolver 110, and a Hard Copy Formatter 112 which can print the network solutions and associated data to a printer 132.

The data in database 106 may be gathered from an operating network or may be data created by a human (e.g. user/administrator) for a future planned network.

A user interfaces with rehoming optimizer 108 at Graphical User Interface (GUI) 116 through a user interface architecture, for example, Microsoft Windows 3.1 (Microsoft Windows is a registered trademark of Microsoft Corporation) or IBM Operating System/2 (OS/2) Presentation Manager (IBM and OS/2 are registered trademarks of International Business Machines Corporation). A GUI, full screen interface, line oriented interface, or any user interface may be used.

Figure 2B:
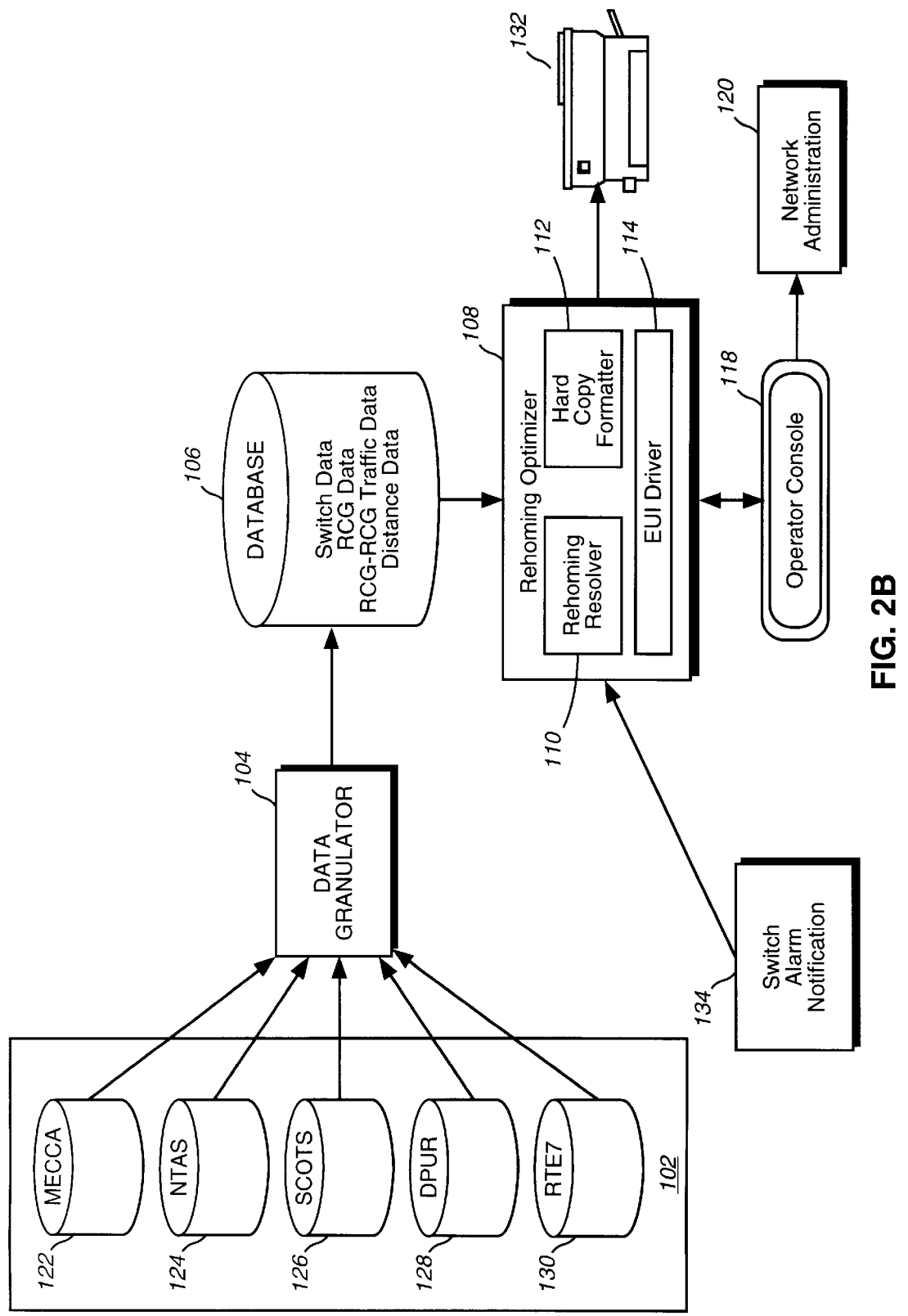
FIG. 2B depicts a design representation of a preferred embodiment of the present invention in conjunction with processing an alarm condition.

With reference now to FIG. 2B, depicted is a design representation of a preferred embodiment of the present invention in conjunction with processing an alarm condition. FIG. 2B corresponds with FIG. 2A and highlights that the rehoming optimizer 108 may interface to a user through a network Operator Console 118. At any time, a user can execute the rehoming optimizer 108 to provide solutions for any problem, whether it be a solution for a past, current or future situation.

In one embodiment, the operator console 118 is a user interface appearing on a monitor of a data processing system which executes the rehoming optimizer 108. Operator console 118 contains access to Network Administration 120 through an EUI. Those skilled in the art are aware of the many network administration interfaces which exist for use in a telecommunications network. For example, in the preferred embodiment, network administration 120 interfaces to a plurality of digital switches supporting real time configuration of their matrices for port reassignments as well as supporting real time reassignment of time slots through Time Slot Interchange (TSI).

The rehoming optimizer 108 is automatically invoked for some alarm by Switch Alarm Notification 134, in which case the user at operator console 118 is notified and the rehoming optimizer 108 executes asynchronously from user interaction to provide network solutions in response to the failure. Switch alarm notification 134 may result from a fault in the switch operation or may result from a traffic tolerance exceeded. Upon browsing available network solutions in response to the failure, the user can use network administration 120 to administrate changes in the network according to solutions provided.

Figure 3:
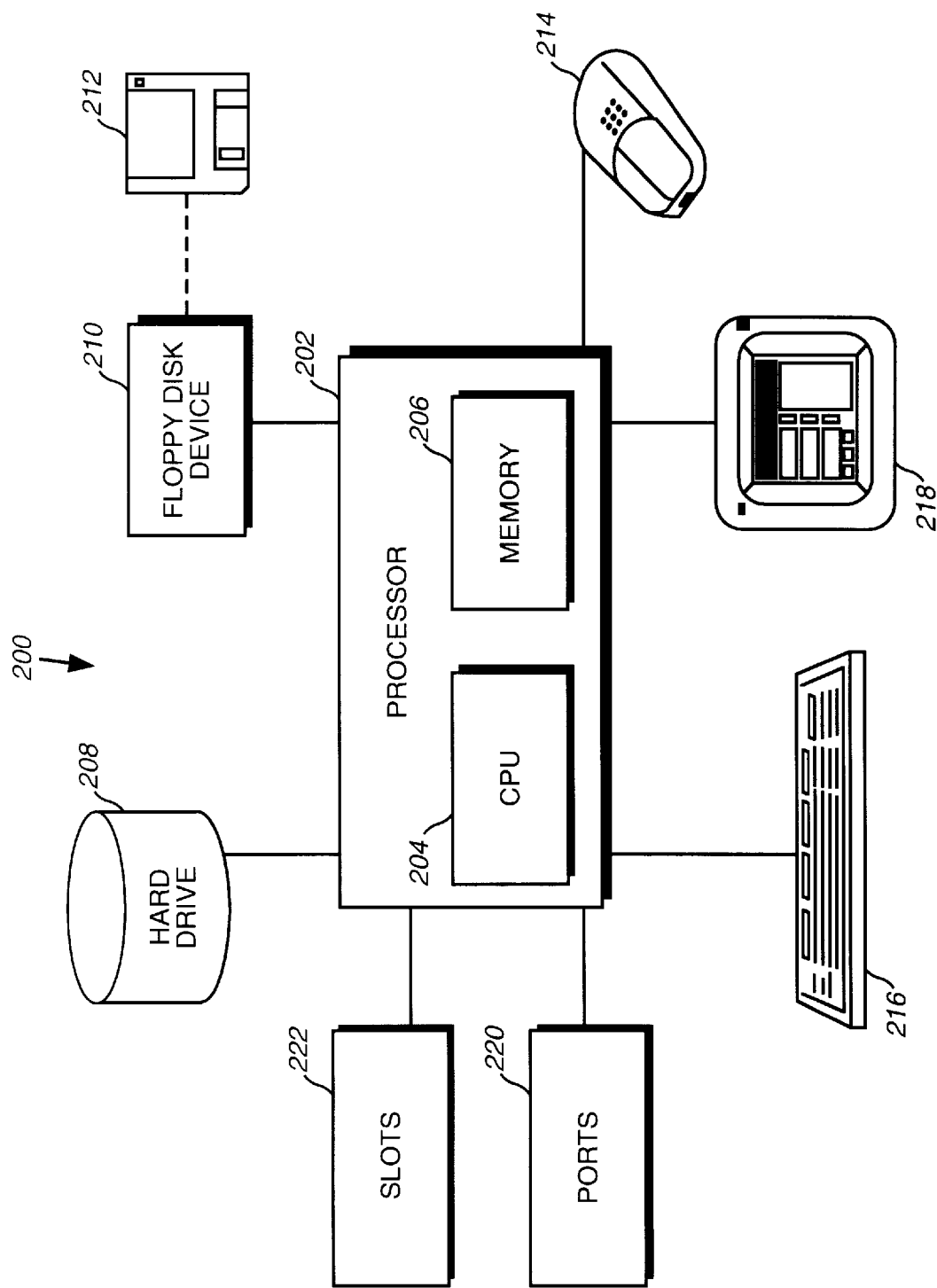
FIG. 3 depicts a representation of a data processing system which may be utilized to implement the method and system of the present invention.

With reference now to FIG. 3, depicted is a representation of a data processing system 200 which may be utilized to implement the method and system of the present invention. The data processing system 200 includes a processor 202, which includes at least one central processing unit (CPU) 204 and a memory 206. Additional memory, in the form of a hard disk file storage device 208 and a floppy disk device 210, may be connected to the processor 202. Floppy disk device 210 may receive a diskette 212 which has a data processing system programming implementation recorded thereon that implements the data processing system according to the present invention.

The data processing system 200 may include user interface hardware, including a mouse 214, a keyboard 216 and a display 218 for presenting visual data to the user. The data processing system may also include ports 220 (to receive cables) and slots 222 (to receive interface cards) for receiving hardware interface adapters. Ports 220 and slots 222 provide means for communicating with a network or other data processing systems, as well as many types of peripherals.

Those skilled in the art appreciate that rehoming optimizer 108, data granulator 104, switch alarm notification 134 and network administration 120, as described above, may each execute in the data processing system 200 or may execute on a like data processing system connected to data processing system 200 through a port of ports 220 and/or a slot of slots 222. The hardware embodiment of data processing system 200 may be a mainframe, a minicomputer, a personal computer, a telecommunications switch, or the like. Peripherals such as printers, scanners, microphones, sound cards, fax machines, monitors, or the like, may further complement the data processing system. Although the hardware overview has been particularly shown and described with reference to a preferred embodiment, it will be understood by those skilled in the art that various changes in form and detail may be made without departing from the spirit and scope of the invention.

Figure 4:
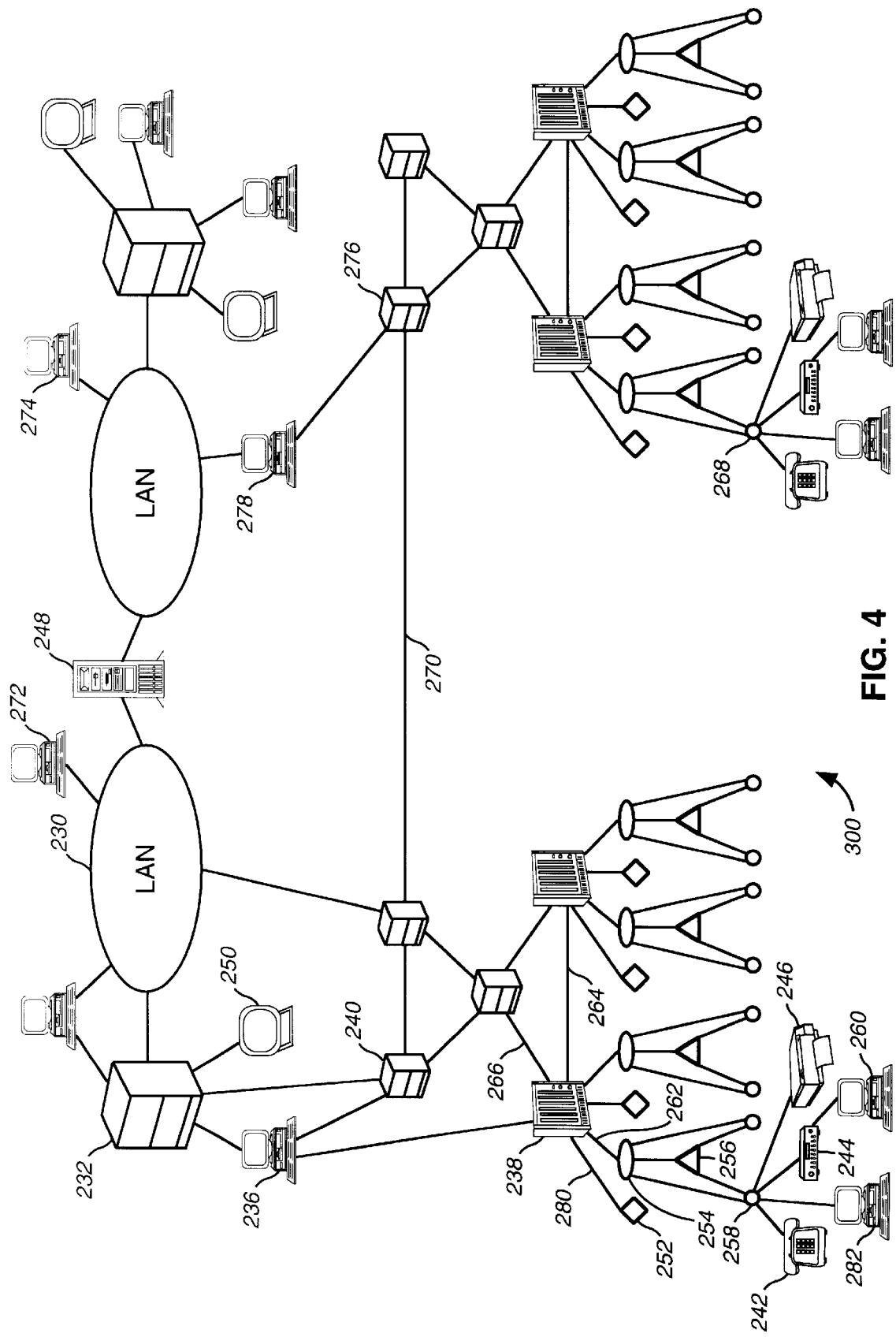
FIG. 4 depicts a representation of a telecommunications network in which or for which the present invention may be utilized.

With reference now to FIG. 4, depicted is a telecommunications network 300 in which or for which the present invention may be utilized. Same icons and same shapes in the figure represent the same type of system. The telecommunications network may be integrated with Local Area Networks (LANs) including Local Area Network (LAN) 230, mainframe systems including mainframe 232, personal computers (PCs) including personal computer (PC) 236, varieties of telecommunications digital cross connect (DXC) switches including class 3 switch 238 and class 1 switch 240, dumb terminals (DTs) such as Dumb Terminal (DT) 250, and varieties of other systems, often referred to as nodes in the network.

The term network, as used herein, refers to a collection of two or more nodes linked together with communications functionality. In fact, any node subset of FIG. 4 including two or more nodes which can communicate with each other is also a network. FIG. 4 may also be a subset of a larger network.

Lines shown between nodes in FIG. 4 demonstrate communications paths, links or spans. For example, a Direct Access Line (DAL) span 280 is at least one trunk between switch 238 and a directly connected customer Private Branch Exchange (PBX) 252. Point of Presence (POP) 254 is connected to a Local Tandem 256 and an End Office 258. The End Office (EO) 258 is the Local Exchange Company (LEC) switching center which provides dial tone and local service to end users who use equipment such as a telephone 242, an internal modem connected PC 282, a PC 260 which is connected with an external modem 244, a fax machine 246, or the like. Spans 262, 264 and 266 include at least a single trunk. An end user of EO 268 is able to communicate with an end user of EO 258 through a single circuit by way of a link of span 270. EO 268 and EO 258 may be great distances from each other. Spans 270, 264 and 266 could be accomplished with microwave via a satellite or optical fiber.

A telecommunications network, such as that which is shown in FIG. 4, is typically interconnected with other systems such as PC 236 or mainframe 232. These systems may be interconnected with LAN cables, telephone wires, wireless radio waves, or the like. Many varieties of protocols are available to facilitate communications over these mediums. They are interconnected to facilitate network management through applications implemented thereon. An end user PC 282 may contain access to a network management application. PC 236 may be enabled for direct communications with a host 232, a switch 238, a switch 240, a DT 250 through host 232, a LAN connected PC 272, a remote LAN PC 274 by way of a server bridge 248, or a switch 276 by way of a gateway server PC 278. In fact, users at any system of FIG. 4 may communicate with users at any other system in FIG. 4 by way of a communications path methodology well known to those skilled in the art.

The term network node refers to a point of traffic accumulation and distribution in a network, such as switch 238 and switch 240, which serves a number of subtending nodes. A subtending node is a point of traffic origination or termination such as EO 258.

Data for the telecommunications network is typically maintained on data storage devices at a switch, PC, mainframe, or any set of these systems. A user may access network management applications which utilize this data.

A data processing system may be embodied over more than a single entity of hardware. A data processing system may be embodied on a single system as depicted in FIG. 3 or as a coordinated and integrated implementation across many systems including switches, PCs and mainframes, as shown in FIG. 4.

Figure 5:
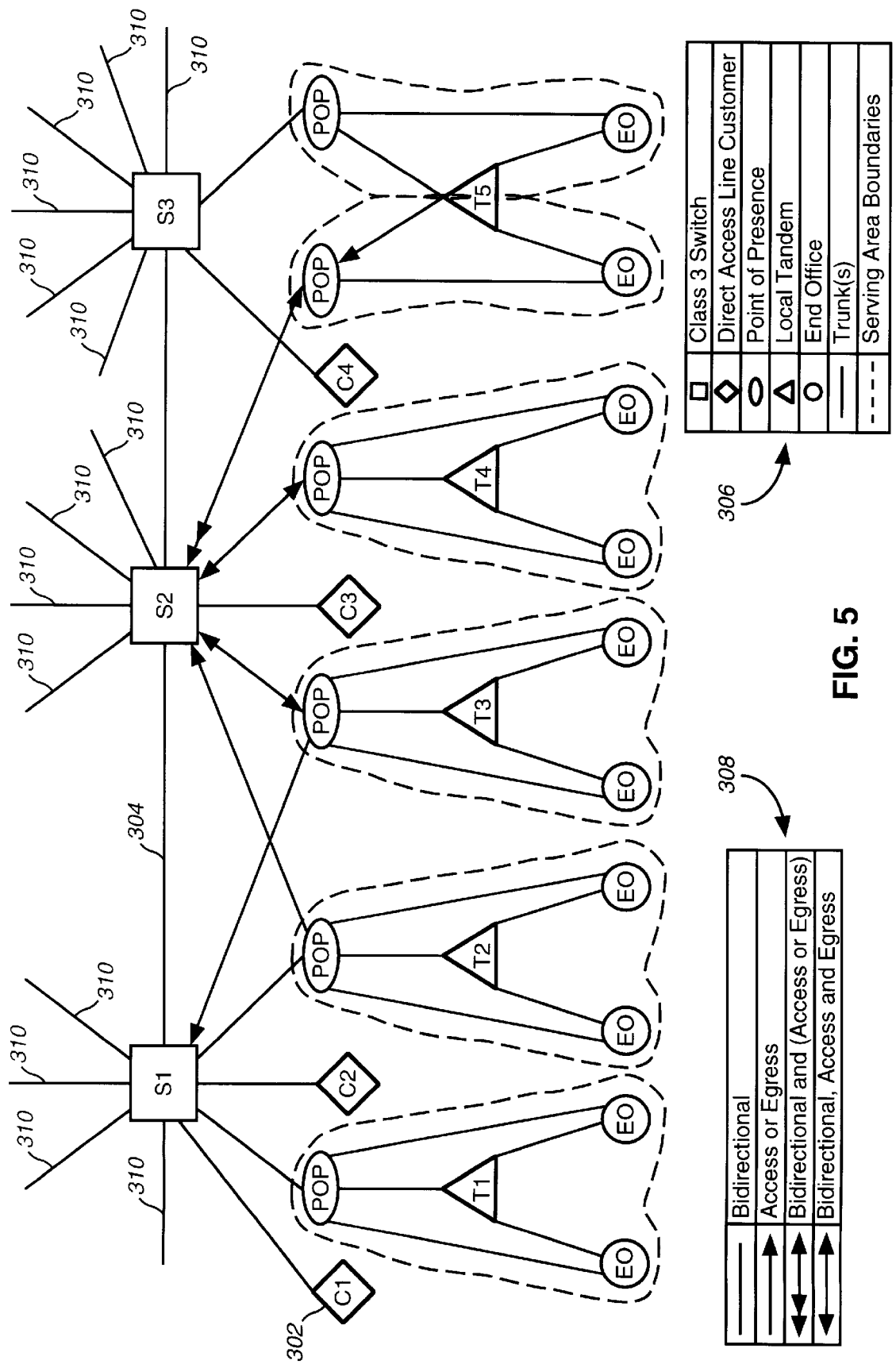
FIG. 5 depicts a subset topology of a telecommunications network to facilitate demonstration of RCGs that may be associated therewith.

With reference now to FIG. 5, depicted is a subset topology of a telecommunications network to facilitate demonstration of RCGs that may be associated therewith. FIG. 5 depicts a subset of a telecommunications network which is similar to telecommunications network 300. A legend 306 is provided for defining graphical objects depicted in FIG. 5. A legend 308 is provided for defining trunk group types. Terminology in the legends as well as the spirit of FIG. 5 discussions are from an Interexchange Carrier (IXC) perspective. An IXC provides long distance telephone services. All lines drawn between objects represent a set of trunks, at least one trunk in each set. Each trunk set 310 is understood to be connected to another switch.

A Serving Area (SA) is an area of telephone service. A Tandem Service Area (TSA) is a SA connected to a single local tandem. The FIG. 5 Serving Areas (SAs) are considered Tandem Service Areas (TSAs). A TSA is identified by a local tandem and Point of Presence (POP). A POP is a point in a telecommunications network where an IXC send or receives traffic to/from a SA. A TSA comprises a set of tandem trunks and End Offices (EOs) whose traffic subtends those tandem trunks. Each EO in the TSA can be connected to the local tandem or directly to a home switch through a POP. An EO provides local telephone services. A home switch is an IXC switch, such as switch S1, which serves a TSA. The local tandem identifier is available to applications at all nodes in the TSA. The local tandem is connected to the home switch through the POP. In case of sectorization, it is possible that one physical TSA is divided into two or more logical Tandem Service Areas (TSAs). In this case, a logical TSA will have its own POP, home switch, and its own set of EOs. A local tandem may have more than one home switch.

As also shown in FIG. 5, local circuits are access (traffic flows from TSA to home switch), egress (traffic flows from home switch to TSA), and bidirectional circuits between a home switch and other entities such as a local tandem, EO and directly connected customers. A directly connected customer is connected through a dedicated access line (DAL), hereinafter referred to as Hardwire (HW) circuits.

A Rehome Circuit Group (RCG) may be defined as a group of local circuits that can be considered as an indivisible entity in the process of rehoming. For example, from an access perspective, an RCG may be homed from the TSA to one given home switch S1, or rehomed from switch S1 to a switch S2. Each local circuit may belong to one and only one RCG. Intermachine Trunks (IMTs), for example trunk set 304, are not included for rehoming local circuits. As a result, the whole set of local circuits is partitioned on mutually non-overlapping RCGs, referred to as RCG-partitions. Depending on the level of granularity, a different set of RCG-partitions may be defined.

While the present invention rehoming resolver supports a minimal granulation of a single circuit to define an RCG, practical network rehoming problems are best tackled by defining as many circuits as are reasonable (maximized) in any RCG. In one extreme case, an RCG may consist of all circuits between an IXC switch and a given POP, but access and egress diversity as well as rehoming within the SA would not be weighed by the rehoming resolver. In another extreme case, an RCG contains a single circuit. However, this is not practical from a maintenance and provisioning standpoint. Also, single circuit RCGs would cause great amounts of rehoming resolver execution time.

In one embodiment, a problem scope may best be defined with RCGs that have any of the following basic levels of granularity:

SWITCH; typically the highest level of granularity because all circuits that belong to any given RCG should have the same control end.

SWITCH-POP; all circuits that have a given home switch as a control end and go through a given POP (may have intermediate POPs included in the path).

SWITCH-TYPE; all circuits that have a given home switch as a control end and have a given type. Type may be defined as:

TA (Tandem Access)
    DA (Direct Access)
    TB (Tandem Termination and Bi-directional)
    DB (Direct Termination and Bi-directional)
    HW (Hardwire); DALs such as customer site 302 which contains a PBX
    FGC (Feature Group C)
    CCFGB (Calling Card Feature Group B)
    In one example, all circuits that are not of TA or HW types are combined into a single RCG called All Other (AO).

SWITCH-POP-TYPE; all circuits of a particular type that have a given home switch as a control end and go through a given POP. See SWITCH-POP and SWITCH-TYPE above.

SWITCH-SERVING_AREA-TYPE; all circuits of a particular type that have a given home switch as a control end and are contained within a SA. A SA is represented by either a tandem CLLI (Common Language Location Identification) code or a HW string identifier (e.g. xxxxDALTERM, where xxxx is a switch name.

In a preferred access diversity embodiment of rehoming optimization, levels of granularity are further maximized in an RCG, thereby defining three RCG types as follows:

HW RCG=DAL trunks that have a home switch as a control end (one HW per switch).
    TA RCG=Tandem access trunks that have a home switch as a control end and a given local tandem as a distant end.

AO RCG=All trunks between a given switch and SA that do not belong to the HW RCG and the TA RCG.

An RCG is uniquely identified by the triple [switch, serving area (i.e. CLLI code or HW string id), RCG type]. A switch is referenced by a Field Switch Identifier (FSID). A CLLI code is an eleven character string as follows:

Characters 1–4=City

Characters 5–6=State

Characters 7–8=Building (in which equipment is located)

Characters 9–11=Equipment type

Some RCG Examples are

DNG1:DNG1DALTERM:HW

DNG1 is FSID,

DNG1DALTERM is a HW string identifier,

Hard Wire type

DNG1:DOCSNY11111:AO

DNG1 is FSID,

DOCSNY11111 is CLLI code of local tandem,

All Other type

DNG1:MRSBILDNG01:TA

DNG1 is FSID,

MRSBILDNG01 is CLLI code of local tandem,

Tandem Access type

With reference now to FIG. 6, a table is shown containing RCGs that may be obtained from FIG. 5 for the preferred access diversity embodiment. The enumeration is a uniquely generated RCG identifier. The SA identifier will actually be either a CLLI code of a particular tandem or a well known identifier for the HW group of circuits. The FIG. 6 table simply references objects found in FIG. 5.

The data granulator 104 builds RCG objects according to the metaphor desired and can be embodied differently without departing from the spirit and scope of the invention. The data granulator 104, through automatically accessed and constructed data, has identified SAs with surrounding dashed lines as shown in FIG. 5. Any diversity and RCG granulation is appropriately handled by the present invention. Reasonable network configurations including such features as multiple homings, sectorization, access diversity and egress diversity are supported. A user of the present invention may prefer certain RCGs manufactured from data collected by the data granulator to be suited for that user's problem.

One of the purposes of rehoming is to solve a COI problem such as to minimize interswitch traffic or maximize intraswitch traffic. Therefore, it is an objective to home RCGs with a strong community of interest to the same home switches. In any RCG partitioning embodiment, traffic information is considered for pairs of RCGs (A and B). Traffic which is originated from A and terminated at B is denoted as Traf(A,B). Total traffic between A and B in both directions is denoted as (Traf(A,B)+Traf(B,A)). This characterizes COI between A and B.

In theory, all RCGs may be rehomed to a single home switch to eliminate all interswitch traffic, however, switch capacities have limitations such as number of ports, Busy Hours Call Attempts (BHCA) limitations, Transactions Per Second (TPS) and distance limitations. Survivability characteristics and cost objectives as well as COI must be factored in. For example, reconfiguring by doubling the path length is undesirable for only a minimal gain in COI.

A cost function allows factoring not only a COI, but also distance and port balancing. The cost function distance component may include not only distance between POP and candidate home-switches, but also other parameters, such as cost of additional equipment (e.g. echo cancelers), type of transmission media, geographical region, etc. Port balancing can be used for balancing of port utilization. For example, two switches with a port utilization of 45% and 55% are better balanced than two switches with a port utilization of 1% and 99%. The present invention cost function is a weighted sum of components:

$$\text{Cost} = W_1{}^*C_1 + W_2{}^*C_2 + \ldots + W_n{}^*C_n$$

where $w_i$ are weight coefficients >=0, typically $\Sigma w_i = 1$, and $C_i$ are cost function components.

An illustrative embodiment of the present invention utilizes a cost function such as:

$$\text{Cost}(x) = w_1 * (\text{IMT\_Traffic}(x) / \text{IMT\_Traffic}(x_0)) +$$
$$w_2 * (Dist(x) / Dist(x_0)) +$$
$$w_3 * (PB(x) / PB(x_0))$$

where x is a current assignment (i.e. an assignment vector which is discussed in detail in FIG. 53 descriptions), $x_0$ is an original assignment, $w_1, w_2, w_3$ are user selected weight coefficients (typically $w_1+w_2+w_3=1$), IMT_traffic is an Intermachine Trunk traffic component, Dist is a Distance component, and PB is a Port Balancing component.

Each component is a value for a given assignment x divided by the corresponding values for an original assignment $x_0$. This normalization properly equalizes values of a different nature into a single formula. As a result, the cost value for the original assignment $\text{Cost}(x_0)=1$. The user may select values $w_i$ of the weights depending on priorities. The system itself may provide default values for these. The more important (from a user standpoint) some particular component, the bigger weight this component has in the cost function. For example, if a major priority is COI, then a 1 (or close to 1) is assigned to we and a 0 (or close to 0) to other $w_i$. There may be other components to the cost function in alternative embodiments without departing from the spirit and scope of the invention.

In sum, the present invention defines three groups of constraints: switch capacity, distance and configuration constraints.

With regard to switch capacity constraints, there is a limited number of ports (ports, as used herein, refers to number of circuits supported by a switch physical port) designated for local circuits. This number should not be less than the total number of lines (circuits) for all RCGs that are homed to a given switch. Every switch also has a CPU limitation in terms of Busy Hour Call Attempts (BHCA). BHCA for each RCG is used to calculate a total current BHCA amount for a given switch. This amount of BHCA should not exceed a switch limit on BHCA. Every switch also has a TPS limitation. Some types of calls (e.g. 800) require access to a centralized database for phone number translation which impacts TPS. TPS for each RCG is used to calculate a total current TPS amount for a given switch. This amount of TPS should not exceed a switch limit on TPS.

With regard to distance constraints, if a route distance between an EO and IXC switch is great, undesirable echo effects must be considered. Rehoming an RCG to a new switch is constrained to some distance limitation. For example, a non-microwave route distance between an RCG and IXC switch should not exceed a reasonable limit such as 600 miles. The distance of circuits in a particular RCG includes adding the distance between the switch and POP to the distance from POP to the most remote EO. However, if an echo-canceler (or echo suppresser) is used, the distance limit is extendible. In case of strong COI between an RCG A and RCG B that is homed to a remote switch S, a trade-off exists between COI and the cost of rehoming A to the remote switch S with echo-canceler(s).

With regard to configuration constraints, specifications are made for diversity, homings to avoid and circuit groups not to be rehomed. Configuration constraints are discussed in the user interface embodiment discussions below.

With reference now to FIG. 7 through FIG. 26 and FIG. 27A through FIG. 27F, depicted is an example embodiment of an EUI, namely, a Graphical User Interface (GUI) for the present invention. Standard controls of the GUI as architected by an OS/2 Presentation Manager or MS Windows user interface are applicable to the figures. All windows and child windows are sizable to user preferred dimensions. While a preferred embodiment of the GUI is shown, various changes may be made in alternative embodiments without departing from the spirit and scope of the invention.

A preferred embodiment for display of an RCG by the user interface includes the corresponding triple of information (i.e. switch, service area id, RCG type). In another embodiment, RCGs may be simply a resolvable system generated enumeration identifier. In any case, RCGs are displayed in the user interface as some RCG identifier. The user may invoke (e.g. mouse double click) an RCG for more detailed information from any user interface reference thereof.

Figure 7:
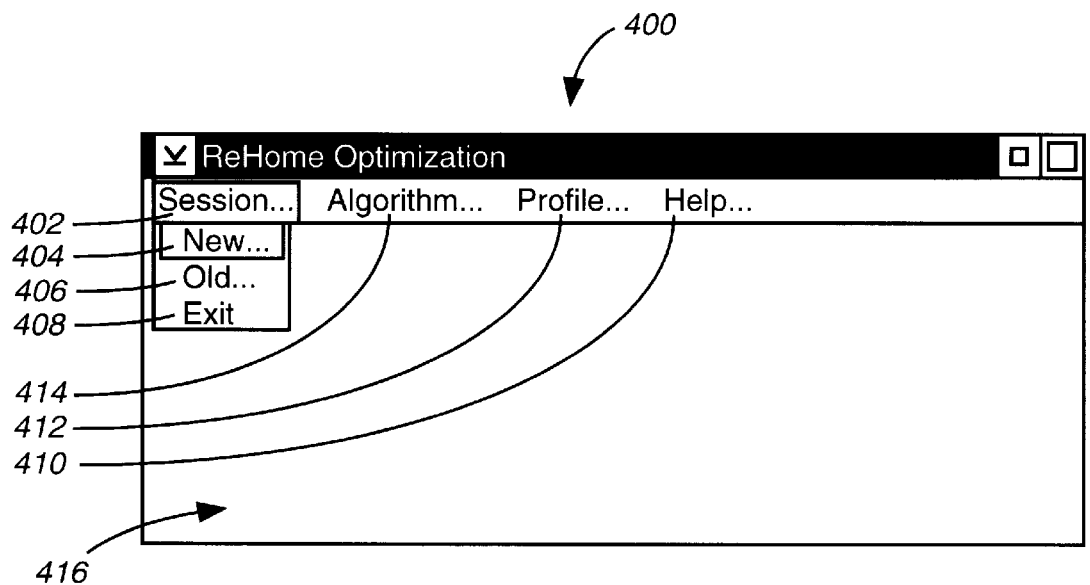

Referring now in particular to FIG. 7, shown is a main window 400 for interacting with the rehoming optimizer 108. The data granulator 104 is assumed to have constructed the database 106 (from the network data 102) which is used by the rehoming optimizer 108. Main window 400 may be presented to a user as the result of invocation (e.g. mouse double click) of an appropriate icon, button, list entry, or the like. Main window 400 may also be presented to a user in response to a network alarm. In an alarm invocation, a previously created session is started automatically and asynchronously. The window 416 of main window 400 indicates which sessions are executing by displaying the session line in reverse video. The session line (not shown) contains at least a unique identifier to the session and a corresponding plan name. There may be a plurality of sessions executing with their own instance of the rehoming resolver. A preferred embodiment may display additional information such as a plan description with the plan name on a line in the window 416. Horizontal or vertical scroll bars are automatically displayed for window 416 when appropriate. The Algorithm pulldown 414 may be used to control execution of sessions appearing in Window 416. Session pulldown 402 manages sessions. Only the sessions which are managed during the current invocation of rehoming optimizer 108 appear in window 416.

Selecting the New option 404 allows a user to define a new session. Selecting the Old option 406 allows utilizing previously created or maintained sessions. The Exit option 408 allows termination of the rehoming optimizer 108. The Help pulldown 410 provides a help facility and the Profile option 412 provides parameters which can be used to fine tune any default parameters as well as rehoming optimizer memory, performance and user interface usability.

Figure 8:
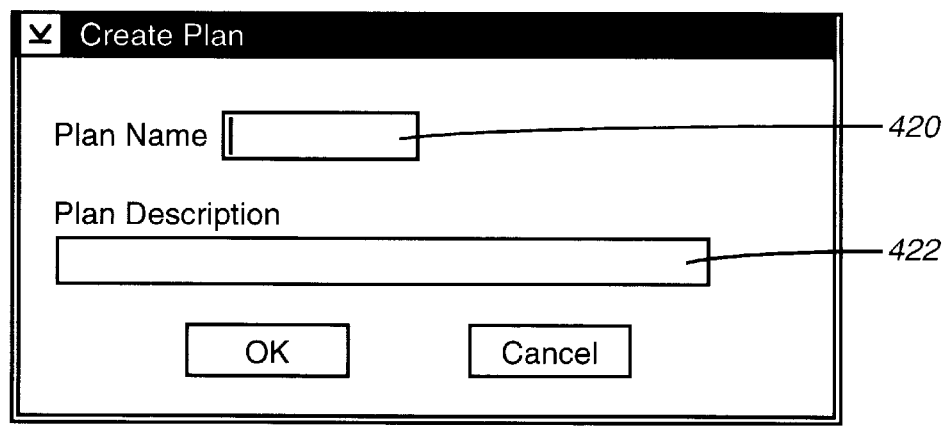

With reference now to FIG. 8, shown is the window produced in response to invoking the New option 404 of FIG. 7. The user enters a plan name in the Plan Name entry field 420 and enters an optional description in the Plan Description entry field 422. Plan names are validated for uniqueness. Every session has a corresponding unique plan name. Successful completion of the FIG. 8 window produces FIG. 9.

Figure 9:
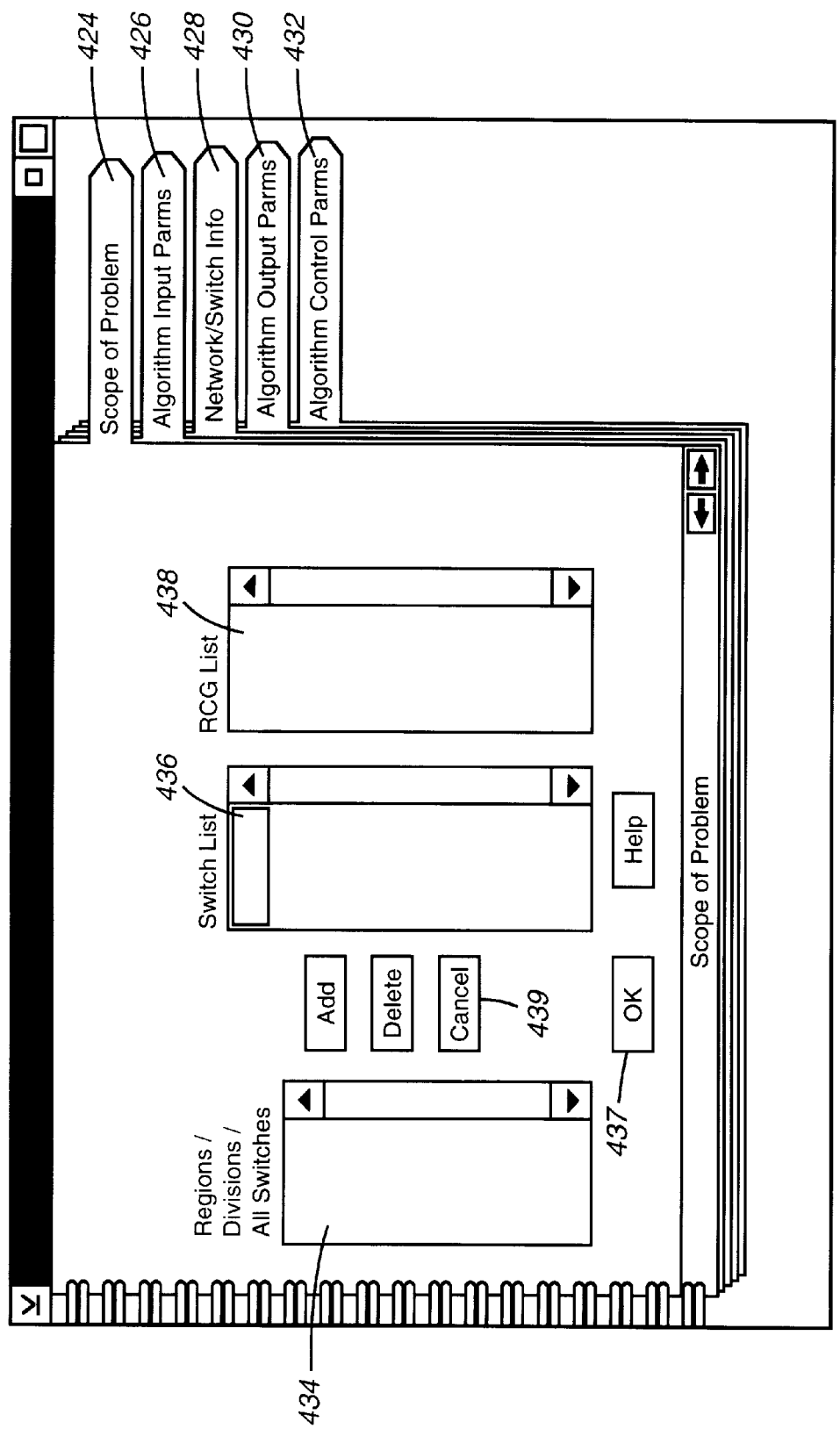

With reference now to FIG. 9, a tabbed window is shown. The foreground tab is highlighted indicating which page is currently viewed. At the beginning of each session, only the Scope of Problem tab is enabled. All other tabs are disabled. After the user successfully specifies a problem scope, the Scope of Problem tab becomes disabled and other tabs become enabled. The foreground tab of FIG. 9 is the Scope of Problem tab 424.

Regions, Divisions and switches in a network appear within scrollable window 434. All this data is available from switch data (FIG. 28). The database 106 produced by the data granulator 104 is accessed. A region is a highest level geographical set of Divisions. A Division is a geographical set of switches. For example, a division may be the string "South East" thereby defining the division of switches for the South Eastern division of the United States. Likewise, a region may be the string "East", thereby defining the Eastern region of the United States.

A switch is preferably displayed as a string for its FSID (Field Switch Identifier), such as "DNG1". The user may select (i.e. highlight) any items in the list of window 434 and maintain them to a list in scrollable window 436 with Add and Delete buttons. Insert and delete keys operate analogously. Selecting a division or region applies to all switches therein. Invocation (e.g. double mouse click) of a list item in window 434 provides a pop-up window (not shown) of additional details concerning that item, for example an associated location map.

All RCGs, which are manufactured by the data granulator 104 for all switches appearing in window 436 are displayed in scrollable window 438. The list of RCG ids is available from RCG data (FIG. 29). Selecting a switch in the list (mutually exclusive selection) of window 436 automatically selects (highlights) all RCGs in window 438 which are associated with that switch. Invoking (e.g. mouse double click) an entry of window 436 refreshes all RCGs for that selected switch to window 438 (user may have deleted RCGs from window 438). Invoking Cancel button 439 exits back to main window 400 of FIG. 7 and no session is created. Invoking OK button 437 completes problem scope specification. The Delete button or delete key may be used to remove selected RCGs from window 438. Thus, a user has the ability to select individual RCGs which are to participate in rehome optimization. Selection of tab 426 produces FIG. 10.

Figure 10:
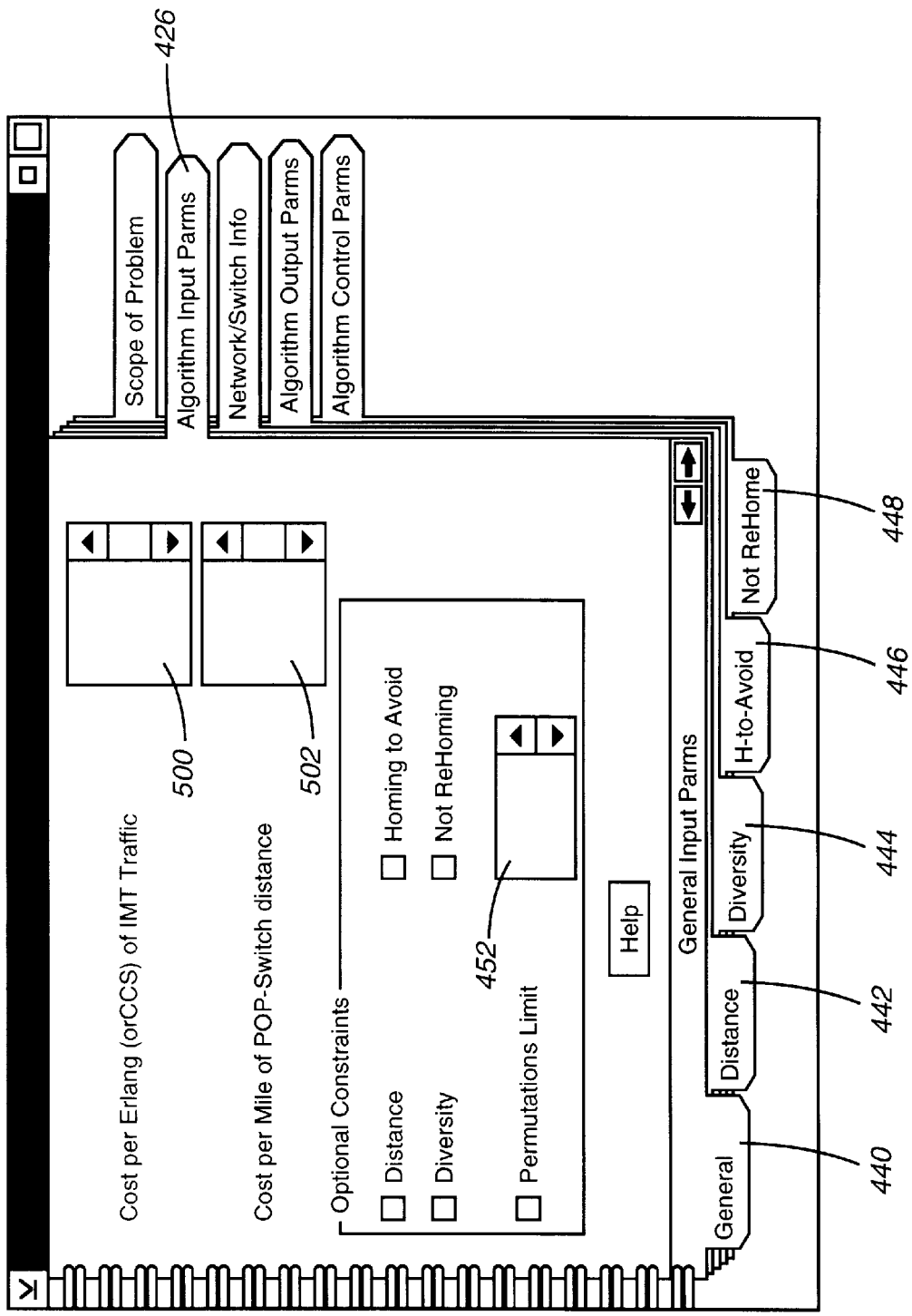

Referring now to FIG. 10, the main window for customizing rehoming resolver input is displayed. The user is able to specify cost function weight coefficients as a real number between 0 and 1 inclusive for each Erlang of traffic in window 500 and for each mile of physical communications medium between switches and POPs in window 502. Up and down arrows for cost function weight coefficients increase or decrease the value (e.g. by 0.01), respectively. The user can enter a real number manually.

At any time the user can place or remove check marks thereby indicating use or non-use of corresponding parameters. Tabs at the base of the window are invocable for a particular subset window of input parameters. Tabs 442, 444, 446 and 448 are enabled only when the corresponding check mark is present. Subsequent removal of a check mark only disables use of any associated data but does not remove that data from database 106.

Tab 440 demonstrates that the General input parameters window is shown. A check mark in the Distance check mark box enables the Distance tab 442 and enables data for the Distance tab 442. Similarly, the Diversity, Homing to Avoid and Not Rehoming check mark boxes enable corresponding tabs and data of the windows for tabs Diversity 444, H-to-Avoid 446 and Not Rehome 448, respectively.

Small window 452 is activated by a Permutation Limit check mark and provides means for a maximum number of rehomed RCGs for any particular solution by the rehoming resolver 110. Small window 452 allows pressing an up or down arrow to affect the value therein.

Figure 11:
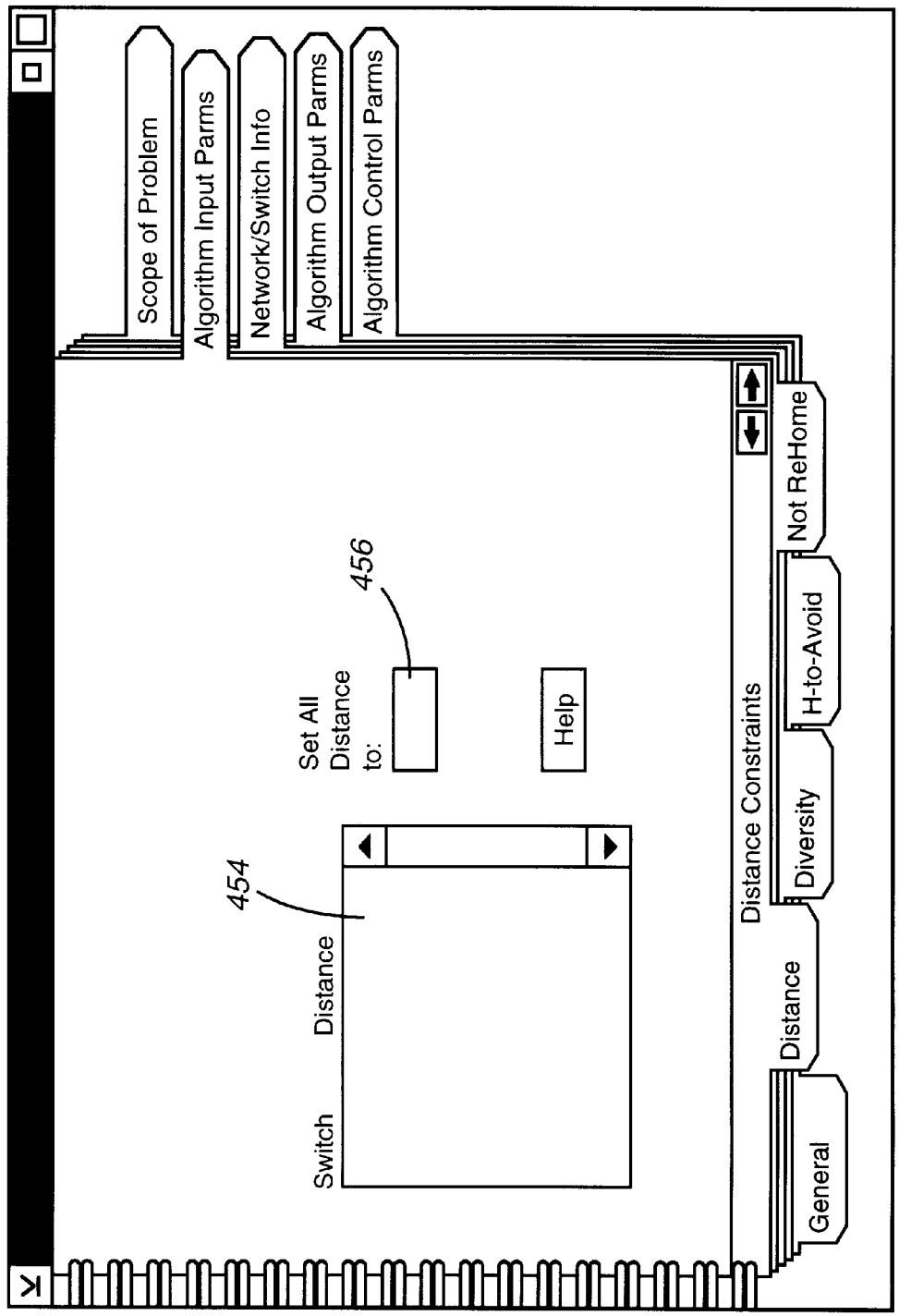

Referring now to FIG. 11, distance parameters may be enabled. Scrollable window 454 displays switches. Each switch FSID is displayed with its corresponding maximum distance value. The user is able to specify a maximum distance for which an RCG communications medium (e.g. optical fiber) should not exceed should it be rehomed to that switch. The user overtypes a value in the list entry or can blank it out to specify no limit. Entry field 456 allows a user to specify a maximum distance of physical medium for all switches which have been selected in window 454. The modified values are reflected in window 454 upon user press of the ENTER key while window 456 has focus.

Invocation of a list item in window 454 provides a pop-up window (not shown) of additional switch details which may include the switch communications medium(s).

Figure 12:
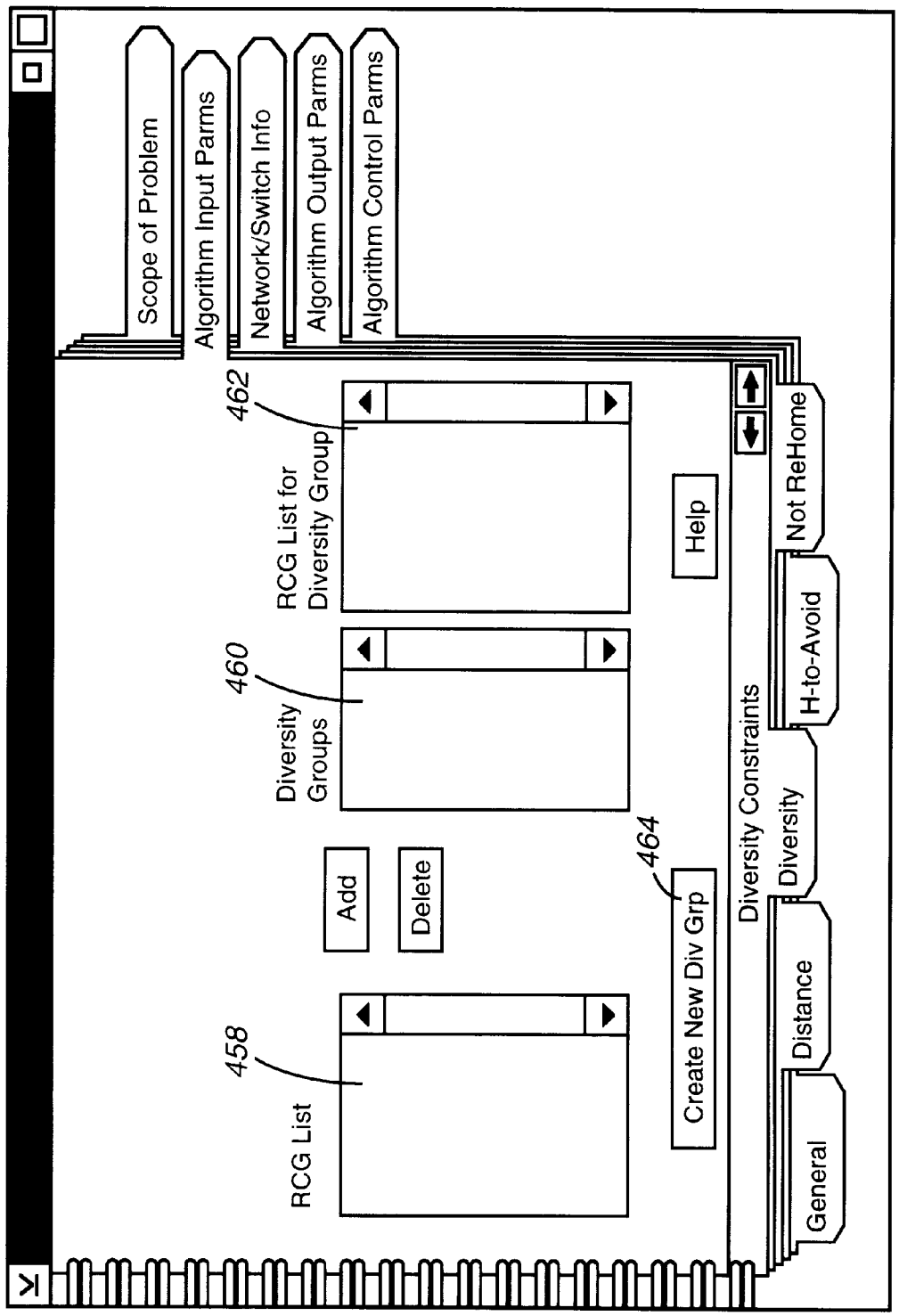

Referring now to FIG. 12, diversity parameters may be enabled. A user may press the Create New Diversity Group button 464 to create a named diversity group by entering a name string for the group in a pop-up window (not shown) containing an entry field. Name uniqueness validation is performed. Upon creation of the diversity group name, the name appears in the list of names (so far created) in scrollable window 460. RCGs are available in scrollable window 458 for adding to a diversity group in window 460. A diversity group name selected in window 460 for the Add button pressed (or insert key), when RCGs are selected in window 458, will receive the selected RCGs as members in that diversity group. Those members will then appear in scrollable window 462.

The Delete button or delete key allows deleting any selected entry in windows 460 or 462. Various embodiments allow deleting a local copy to the rehoming optimizer 108 of an RCG list displayed in window 458 or merely deleting the RCG from the choices in window 458. A diversity group specifies that each RCG in the group should be rehomed to different (mutually exclusive) switches.

Figure 13:
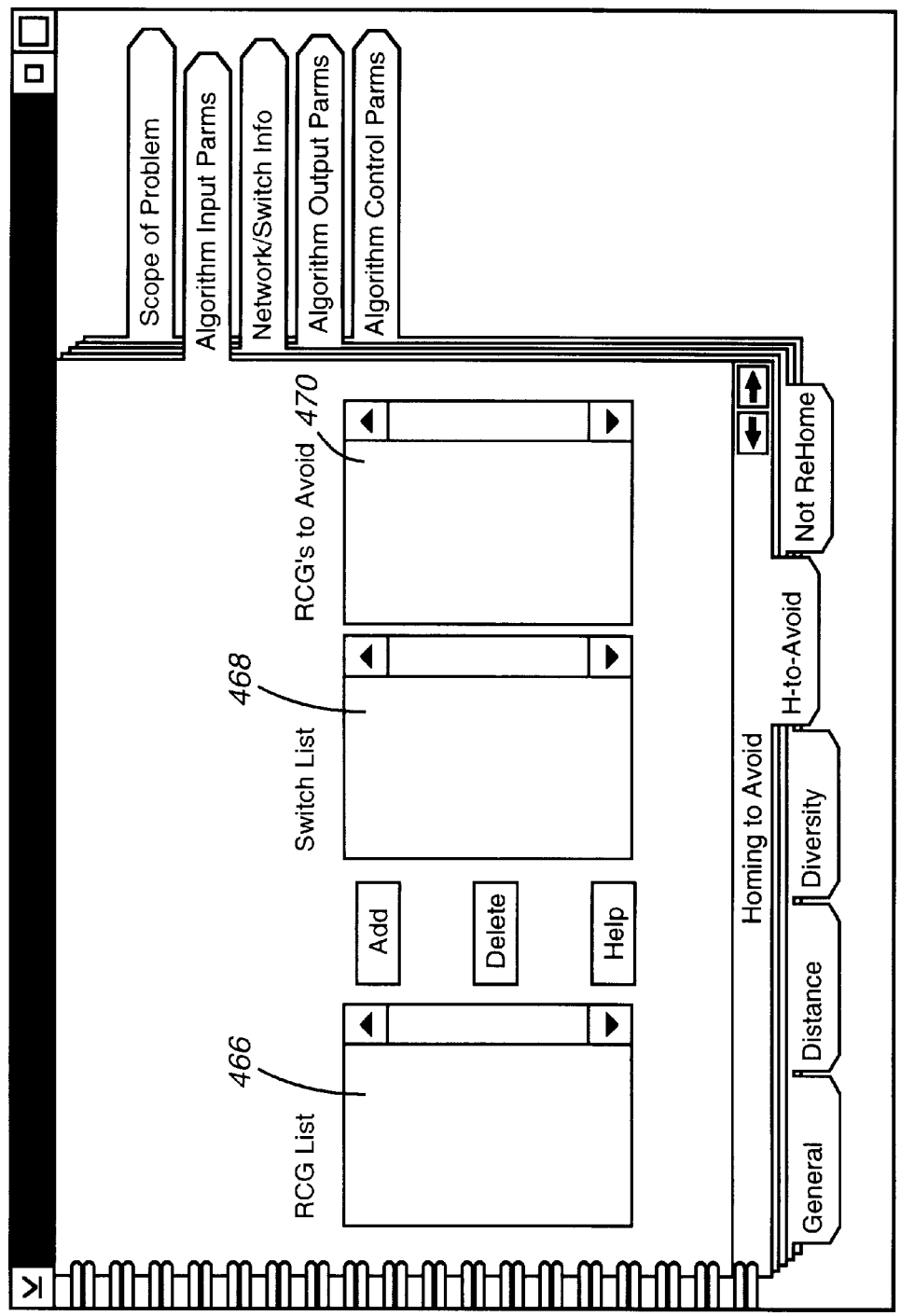

Referring now to FIG. 13, homings to avoid may be enabled. RCGs originally appear in the scrollable window 466. Switches appear in the scrollable window 468. The user is able to specify RCGs which should not be rehomed to a particular switch by selecting a switch in window 468, selecting one or more RCGs in window 466, and pressing the ADD button (or insert key). RCGs not to be rehomed to a particular switch will appear in scrollable window 470. Window 470 will display all RCGs which should not be rehomed to a mutually exclusively selected switch in window 468. The Delete button or delete key is used to delete selected RCGs from window 470.

Figure 14:
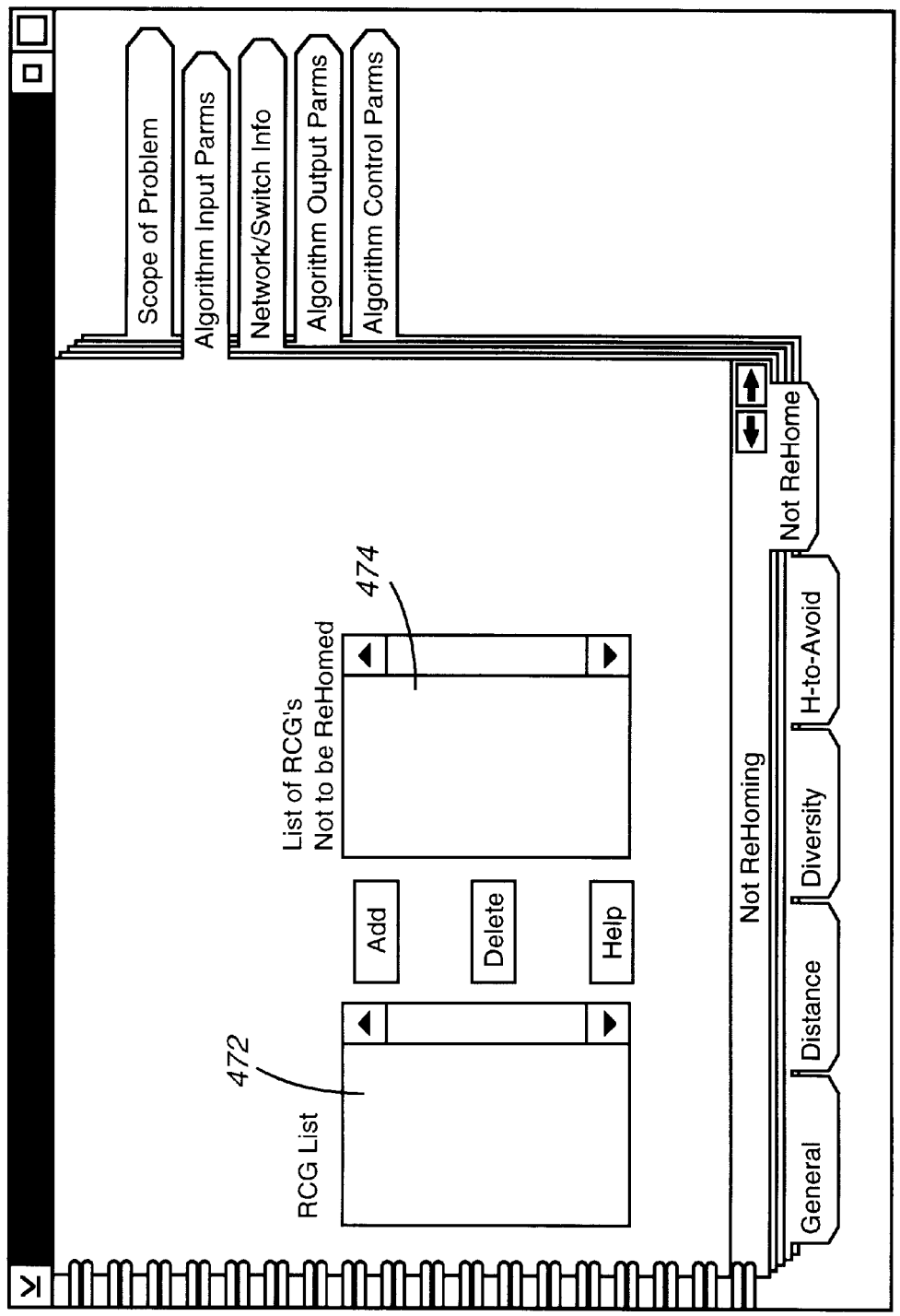

Referring now to FIG. 14, a user is able to select RCGs which should not be rehomed. RCGs appear in scrollable window 472. RCGs selected in window 472 may be added (with Add button or insert key) to the list in scrollable window 474 which contains RCGs that should not be rehomed. RCGs selected in window 474 may be deleted (with Delete button or delete key) from those that are not to be rehomed.

Figure 15:
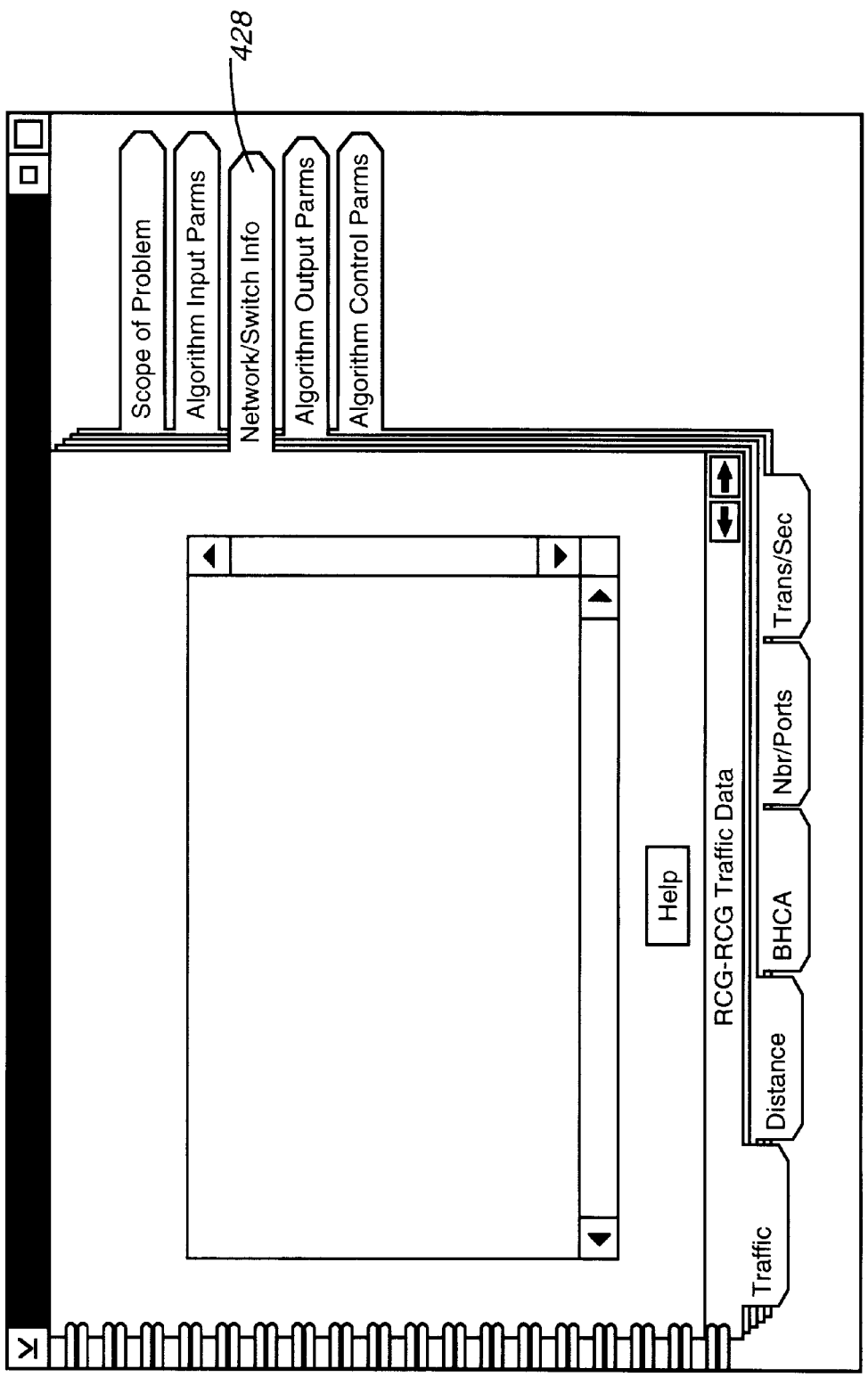

Referring now to FIG. 15, shown is the first window associated with the Network/Switch Information tab 428. Tabs at the bottom of the window provide navigation to windows for subsets of parameters thereof. FIG. 15 displays RCG to RCG traffic data originally maintained by the data granulator 104. The data is presented to the user in a scrollable two dimensional matrix spreadsheet form within the scrollable window wherein RCG to RCG traffic data is displayed in each cell for a particular RCG row and RCG column. This data is available from RCG to RCG traffic data (FIG. 30). Data in cells may be editable for the current session since each session may maintain its own snapshot of the database 106 upon plan creation. An alternative embodiment allows edit of data at the database 106. RCGs head columns and rows in the matrix.

Figure 16:
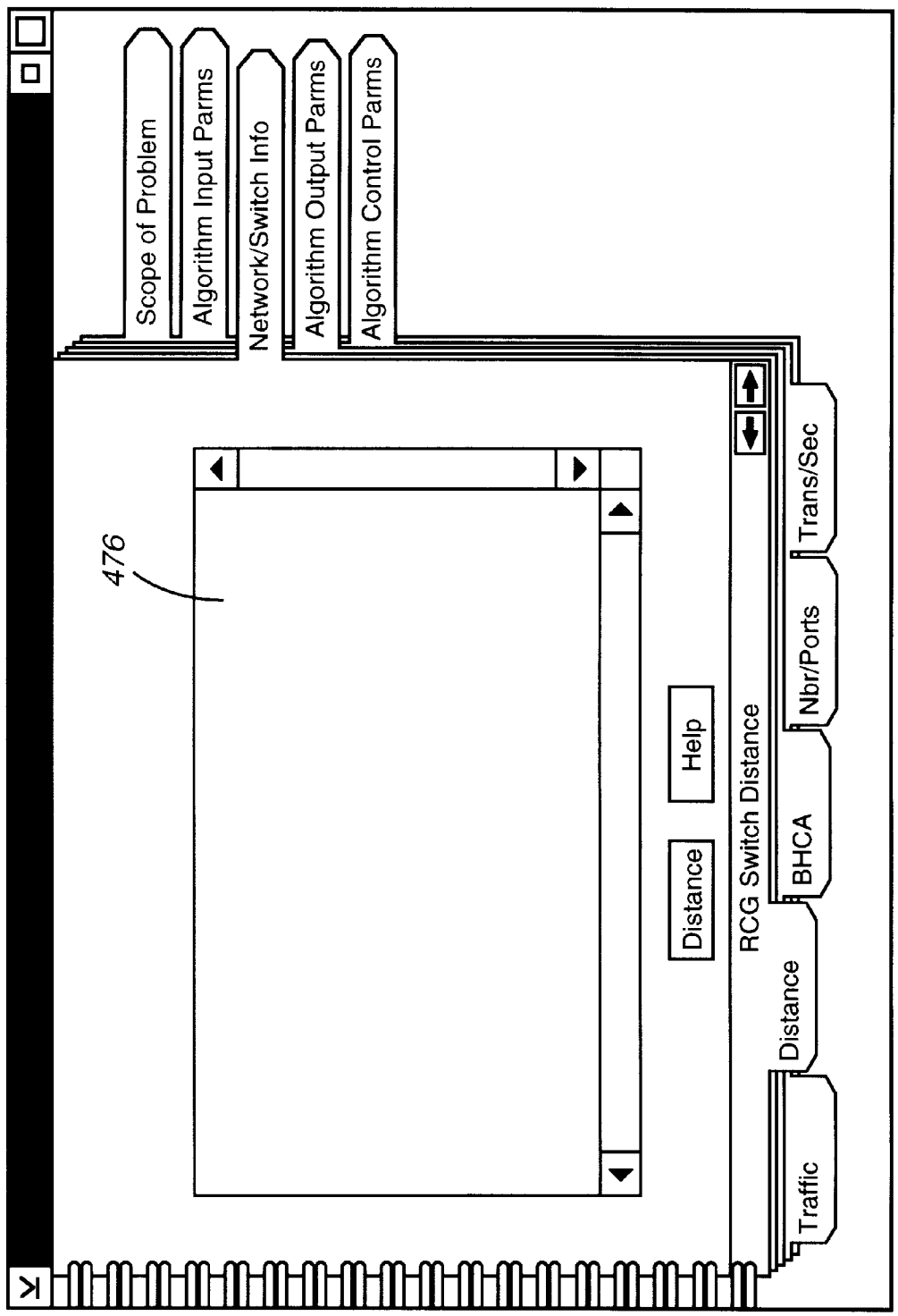

With reference now to FIG. 16, distance data is shown in scrollable window 476. The data is presented to the user in a scrollable two dimensional matrix spreadsheet form which displays a routing distance value in each cell. Each distance value is the distance between a switch and POP for a particular RCG. This data is available from Distance data (FIG. 31). Each cell is identifiable by the particular RCG row and switch column. Data in cells may be editable for the current session since each session can maintain its own snapshot of the database 106 upon session creation. An alternative embodiment allows edit of database 106. Invocation of the Distance button displays a route map (not shown) between a given switch and POP that is associated with a given RCG as identified by the position of an active cursor within window 476.

Figure 17:
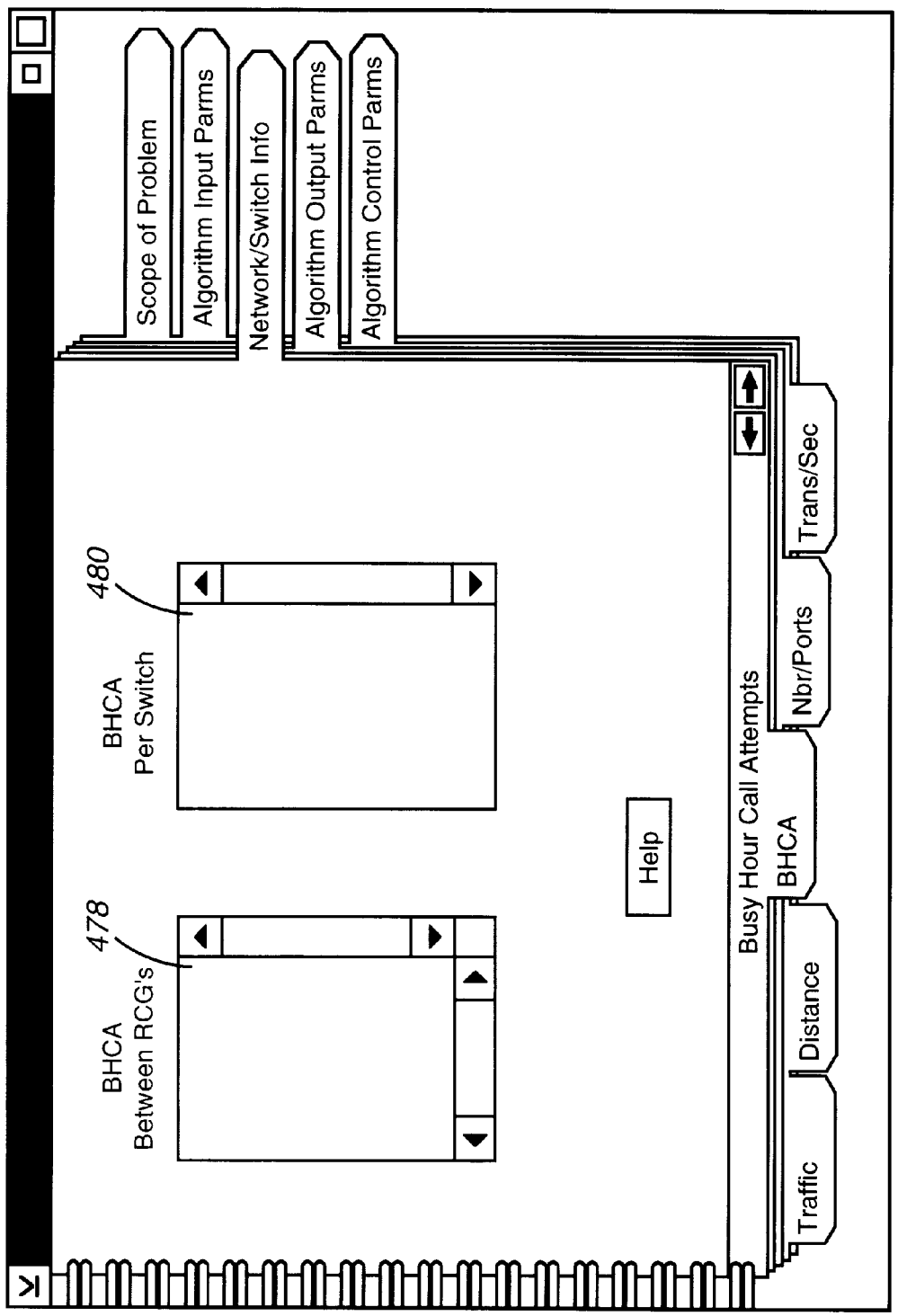

With reference now to FIG. 17, Busy Hour Call Attempts (BHCA) data is shown. Data is presented to the user in scrollable window 478 as a two dimensional matrix spreadsheet form wherein a BHCA value is displayed in each cell for a particular RCG row and RCG column. This data is available from RCG to RCG traffic data (FIG. 30). Data in cells may be editable for the current session since each session may maintain its own snapshot of the database 106 upon session creation. An alternative embodiment allows editing of database 106. RCGs head columns and rows in the matrix. As is true for all child windows, child window 478 may be sized by a user to accommodate desired viewing area within the sizable FIG. 17 window. Scrollable window 480 provides the list of switches along with their corresponding BHCA limit. This data is available from Switch data (FIG. 28).

Figure 18:
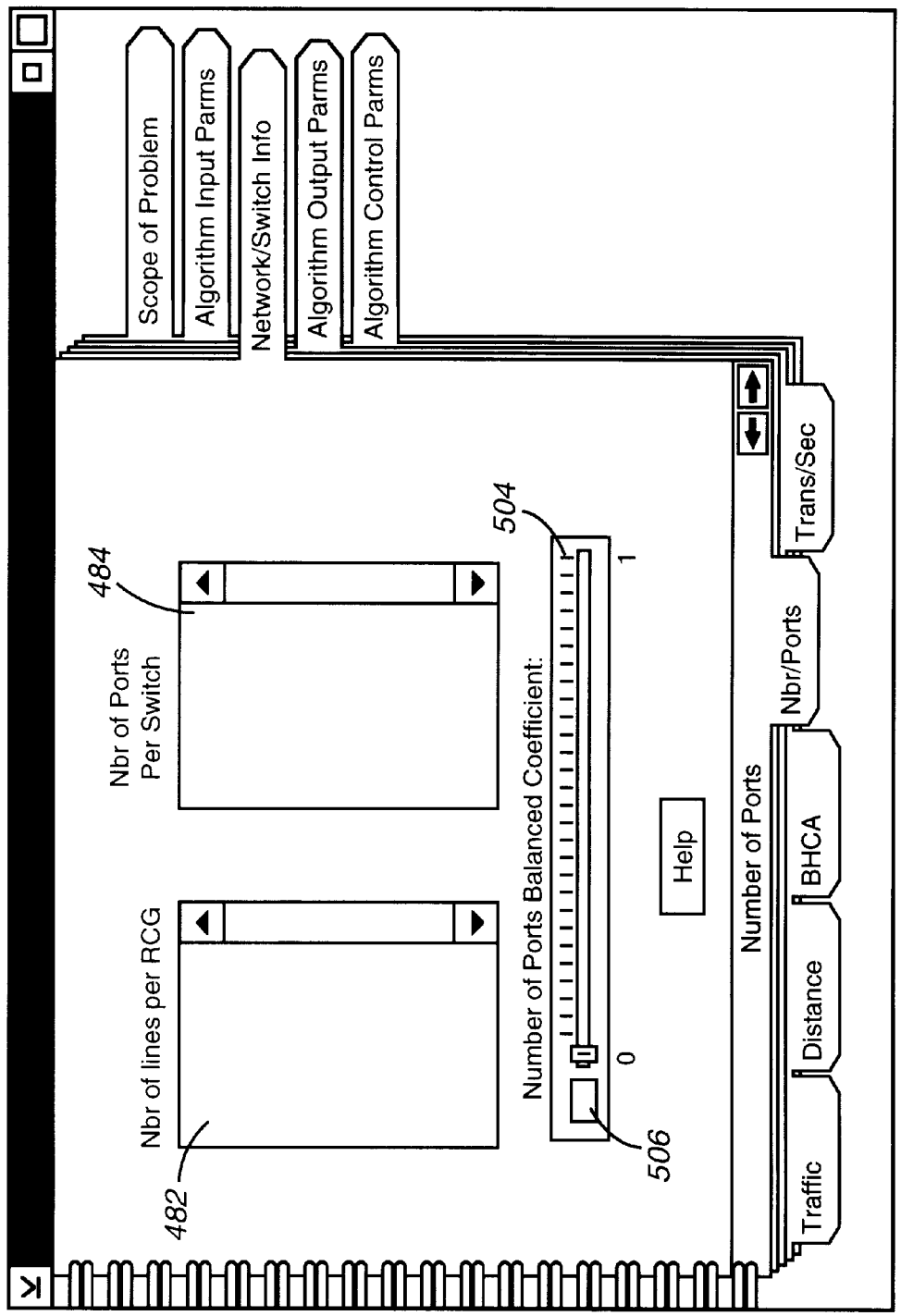

With reference now to FIG. 18, port data is displayed. Scrollable window 482 contains RCGs with their corresponding number of circuits (i.e. referred to as "lines" in the user interface). This data is available from RCG data (FIG. 29). Scrollable window 484 displays switches with their corresponding number of ports. This data is available from Switch data (FIG. 28). Number of circuits and number of ports may be editable values in various embodiments.

Another coefficient of the cost function, namely, a port balancing coefficient, is embodied as a slide bar 504 wherein the user simply slides the bar to determine the appropriate real number coefficient. The actual value derived from the bar is displayed in the small entry field window 506 which may also be directly modified and reflected accordingly in the bar.

Figure 19:
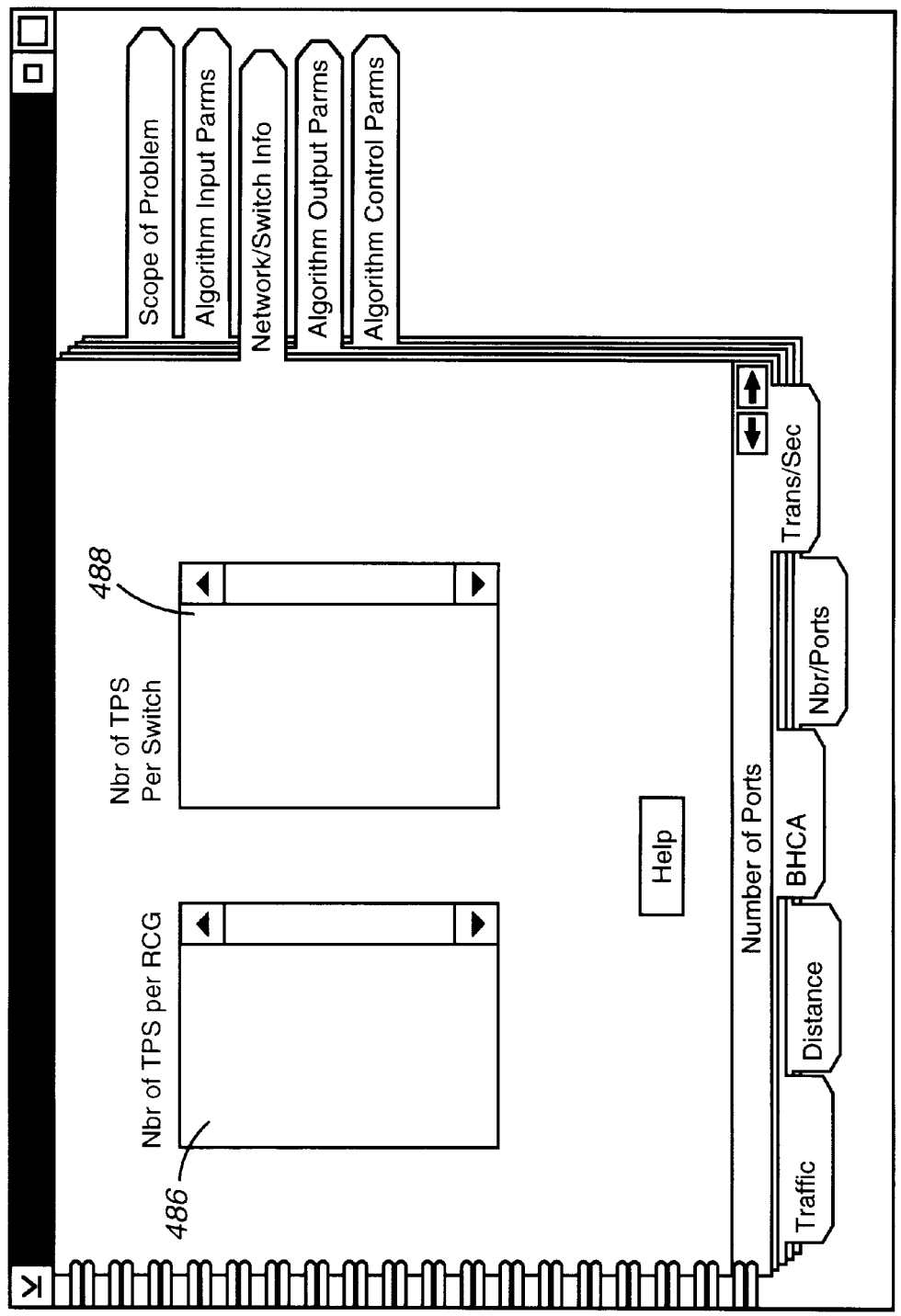

With reference now to FIG. 19, shown is a window for displaying RCG Transactions Per Second (TPS) data. TPS data is presented to the user in a scrollable list window 486 wherein the TPS data is displayed in each line for a particular RCG row. This data is available from RCG data (FIG. 29). TPS data may be editable for the current session since each session may maintain its own snapshot of the database 106 upon session creation. An alternative embodiment allows edit of database 106. Scrollable window 488 provides the list of switches along with their corresponding TPS. This data is available from Switch data (FIG. 28). TPS values may be edited to affect the data for the current session. An alternative embodiment allows edit of database 106.

Figure 20:
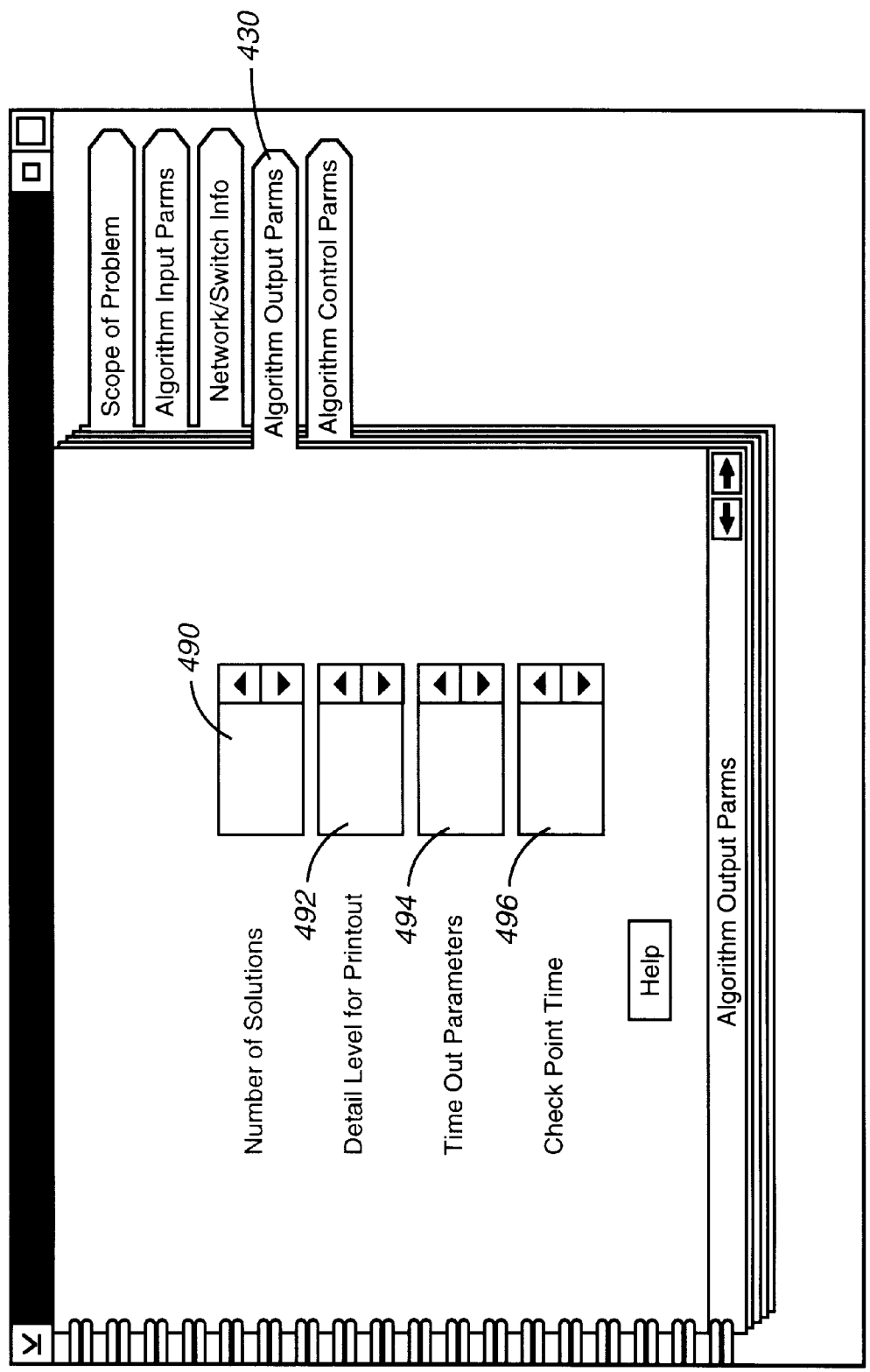
Figure 21:
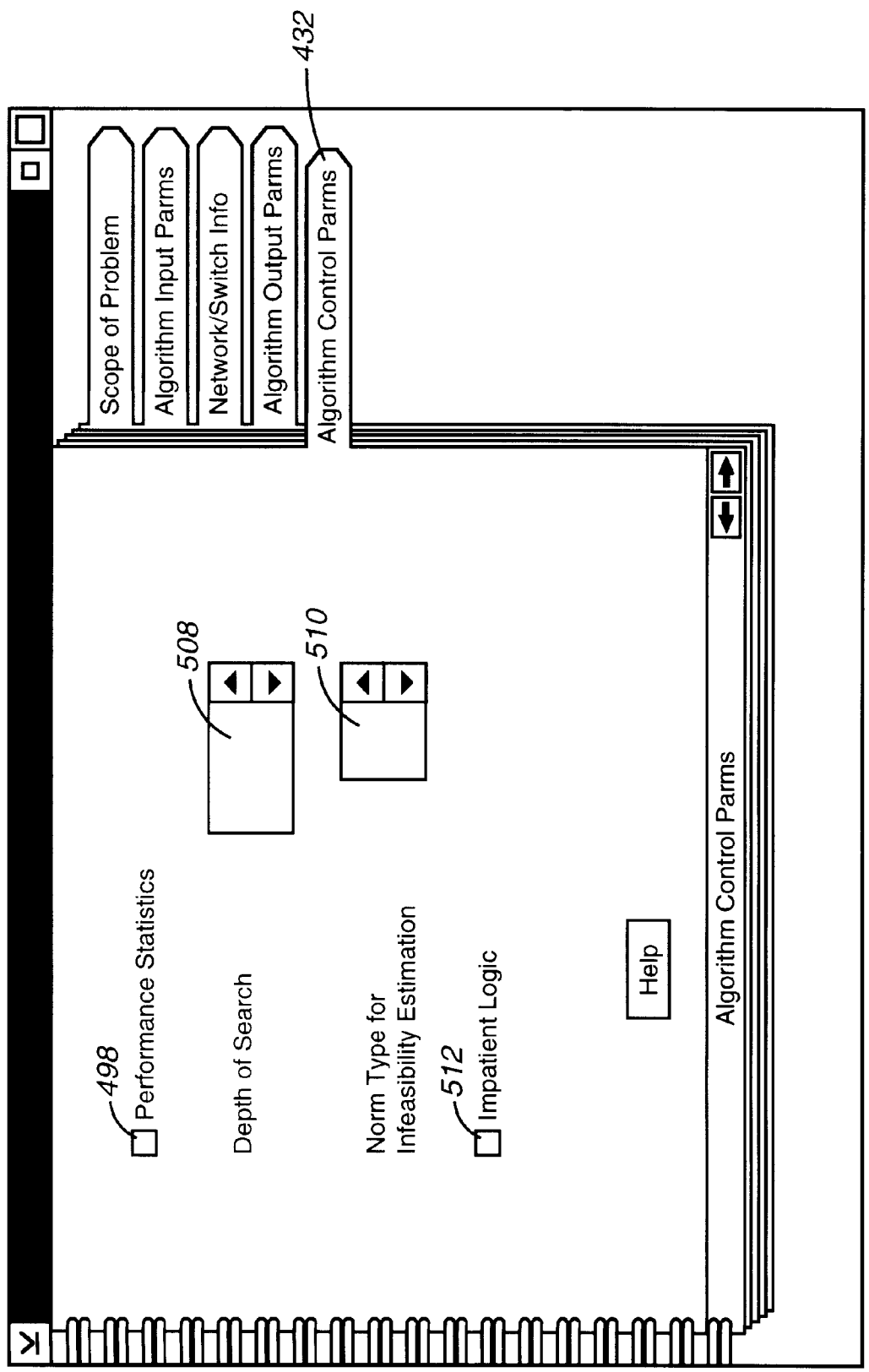

With reference now to FIG. 20 and FIG. 21, execution limitation parameters are enabled. Execution limitation parameters affect rehoming resolver 108 execution and include variables such as number of solutions, printout detail, time out, check point, performance statistics, depth of search, infeasibility and impatient logic, as hereinafter described.

With reference in particular to the window of FIG. 20, the rehoming resolver 110 output parameters are maintained thereon. Algorithm Output Parameter tab 430 navigates the user to the FIG. 20 window. Each child window is an entry field which may have its value affected by a mouse button press of an up and down arrow as shown. The Number of Solutions set in window 490 allows a user to specify how many solutions to calculate. If, for example, the value in window 490 is set to 5, then the best five solutions are presented to the user, best being those which most minimize rehoming cost according to the cost function (subject to constraints). The Detailed Level for Printout set in window 492 allows setting a level of solution printout verbosity.

The Time Out Parameter set in window 494 allows a user to specify in seconds a maximum time value for which the user is willing to tolerate execution of the rehoming resolver 110. A user may have specified a scope of problem which takes much time to perform calculations. A timer thread is spawned accordingly and asynchronously with, and at the start of, rehoming resolver 110 processing. Expiration of the timer thread after rehoming resolver 108 completion causes no action. Expiration of the timer thread before rehoming resolver 110 completion causes the timer thread to prematurely terminate rehoming resolver 110 execution. The Check Point Time set in window 496 allows setting a refresh value for which a resulting solution file will be refreshed by the rehoming resolver 110.

Referring now to FIG. 21, shown is a window which appears as the result of selecting the Algorithm Control Parameters tab 432. Check mark box 498 indicates that performance statistics data for this particular session will be appended to a special performance statistics file. Date/time stamps of starts and finishes of logical points in rehoming resolver 110 execution are output therein. A Depth of Search data value may be provided to window 508. It limits the number of combinatorial permutations a depth first solution search may perform. The Norm Type for Infeasibility Estimation specified in window 510 identifies the numerical code of the method of infeasibility calculation. There are two types. MAX_NORM (i.e. code 1) calculates overall infeasibility as a maximum of deficits for all constraints. SUM_NORM (i.e. code 2) calculates overall infeasibility as a sum of all deficits for all constraints. Check mark box 512 having a check mark indicates that the (p,k)-enumeration procedure (discussed later) should be terminated, and the next iteration tried, as soon as a feasible solution cost is less than the cost of the best solution so far. Windows 508 and 510 have associated up and down arrows for affecting any value in their corresponding windows.

Figure 22:
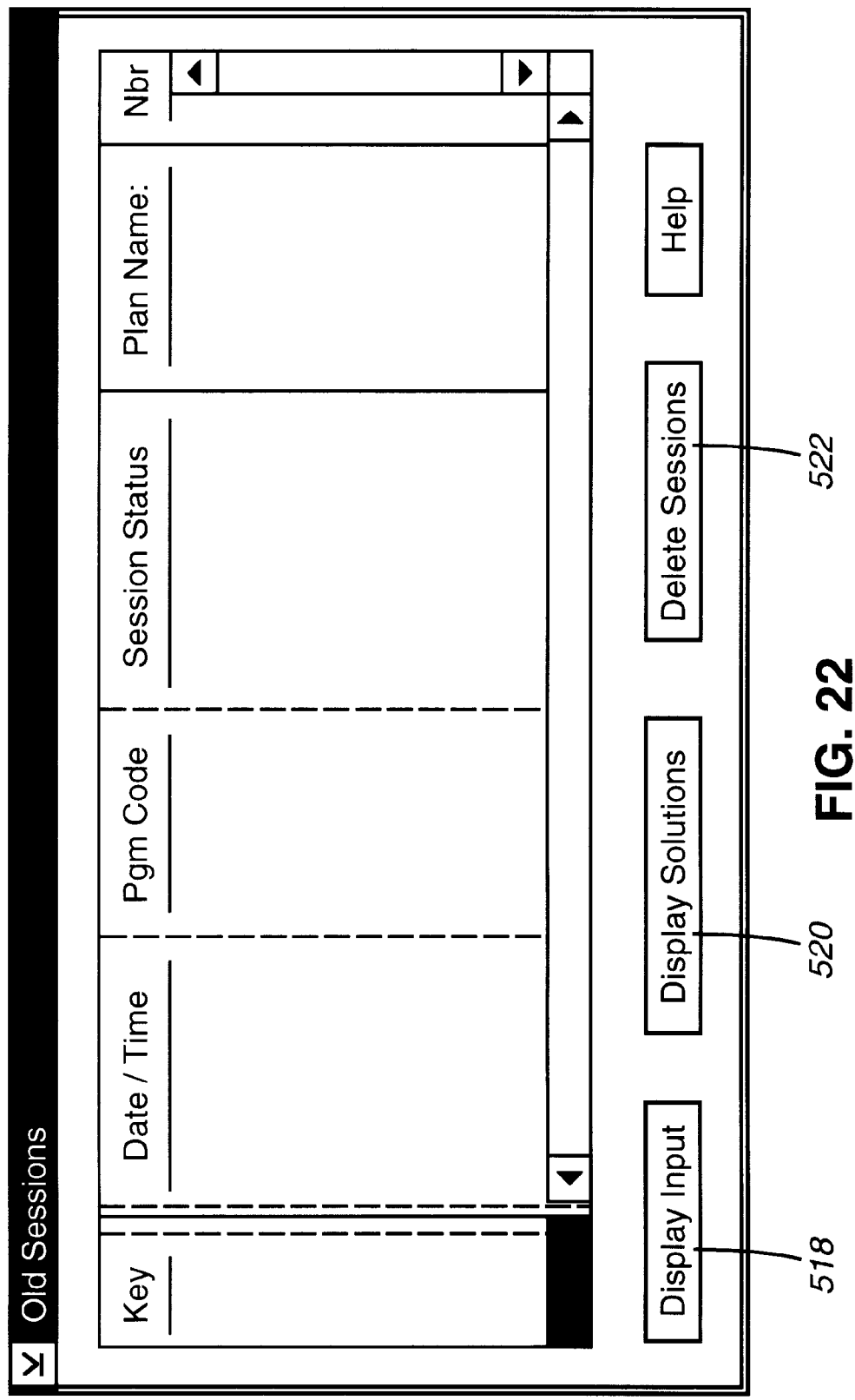

Referring back to FIG. 7, if a user invokes the Old option 406, then FIG. 22 results. With reference now to FIG. 22, a window with a scrollable child window is shown which contains information for all known sessions previously maintained to date. Line entries contained in the window preferably appear in a date/time sorted order with the most recent session at the top. In an alternative embodiment, a single plan name may appear multiple times for sessions run multiple times with different constraints.

The columns of Key, Date/Time, Pgm Code, Session Status, Plan Name and Nbr are defined as the following: automatically generated unique enumeration for a session (a handle to the session), date/time stamp for session run time, any error code associated with the session run, a status indicating the state of the session such as whether or not the rehoming resolver 110 is still running, name of the plan, and number of solutions, respectively. The Key column, as shown, is preferably a stable column continuously displayed for all data scrolled on other columns. Other criteria (in the scrollable area) about sessions may also be displayed. Data fields on FIG. 22 are protected from user editing.

The Delete Session button 522 will delete any sessions selected. Pressing Display Input button 518 for a selected session which was previously run allows transposing to a corresponding browse mode (read only) of FIG. 9 and subsequent processing as heretofore described. Pressing Display Input button 518 for a selected session which was not previously run allows transposing to a corresponding edit mode of FIG. 9 and subsequent processing. A copy operator, implemented with a hot key recoginzed by FIG. 22 processing, is provided for copying a session to a new session.

Upon copying invocation of a selected session, the user is presented with the FIG. 8 window and subsequent window processing as previously described. Data is defaulted in user interface windows according to data of the session copied from. Invoking a session entry (e.g. mouse double click) in the list of FIG. 22 activates a browse window for an intermediate form of input data which is conveyed to the Rehoming resolver 108 and is maintained in memory and/or file for the session. A hot key is provided for returning from the browse mode back to FIG. 22. The intermediate form of input is preferably a manufactured flat file from data specified in user interface windows as heretofore described.

FIGS. 23 through 25 represent a contiguous three page listing, in respective page order, of an actual example of the intermediate form of input from a particular session. The intermediate input data is easily recognizable by a user familiar with operation and internals of the rehoming resolver 110. The Display Solutions button 520, for a selected session, produces the window of FIG. 27A. Hot key support is provided to the FIG. 22 window so that a selected session can be started (Run) and terminated (Stop) therefrom.

Figure 26:
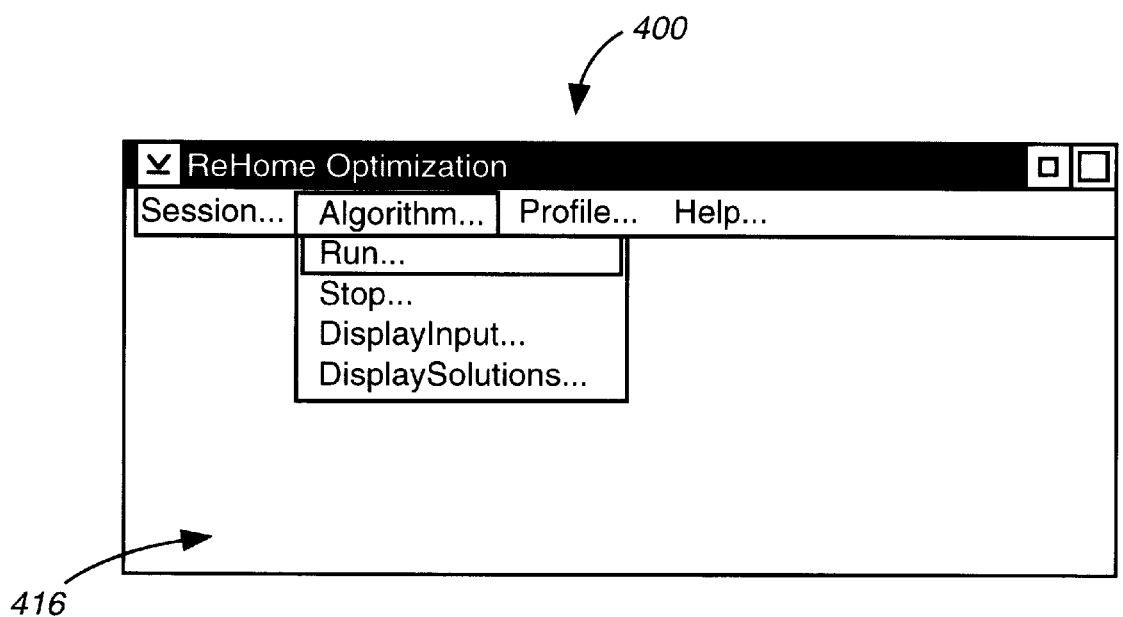

With reference now to FIG. 26, the main window 400 is shown with the pulldown exposed for the Algorithm option. The DisplayInput and DisplaySolutions selections are equivalent to buttons 518 and 520, respectively, of FIG. 22, when applied to selection of any session made within window 416. The Run and Stop options applied to selections within window 416 behave similarly. Upon use of Run or Stop, FIG. 22 is displayed for the session with the corresponding status displayed thereon. The Run option will start the rehoming resolver 110 and the Stop option will terminate the rehoming resolver 110 at the next opportune iteration. The rehoming resolver 110 will terminate on its own upon normal completion and a status is found in the window demonstrated in FIG. 22.

Figure 27A:
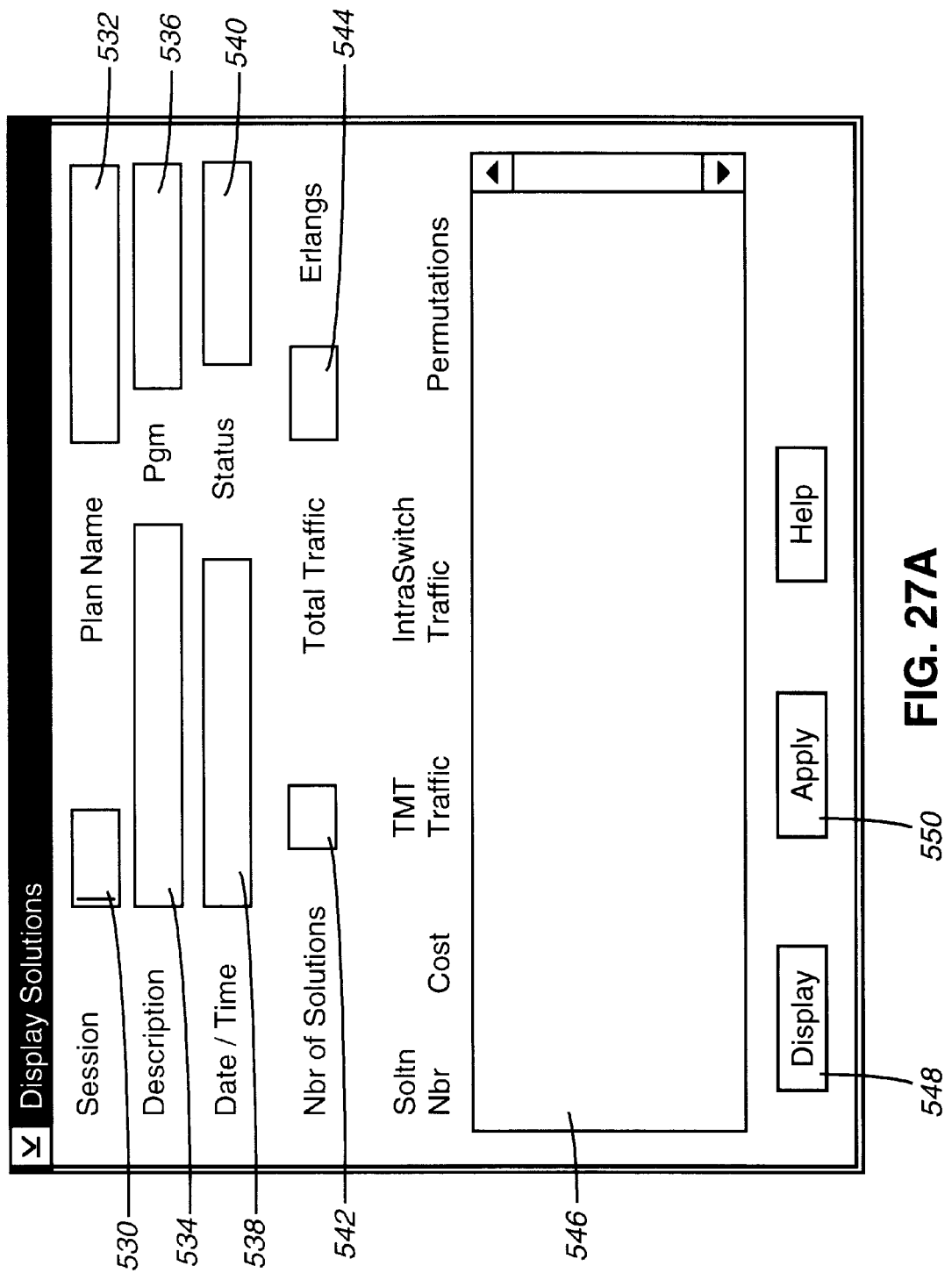

With reference now to FIG. 27A, a list of solutions for a session is displayed. FIG. 27A displays as the result of pressing button 520 for a selected completed session in FIG. 22. All fields on FIG. 27A are read only and an active cursor in a field allows horizontal scrolling. The Session field 530 equates to the Key data from FIG. 22. The Plan name field 532 equates to the Plan Name 420 of FIG. 8. The Description field 534 equates to the Plan Description 422 of FIG. 8. The Pgm field 536 is the executable program path name of the rehoming resolver 110. The Date/Time field 538 is a date/time stamp of when the problem scope was submitted for execution (i.e. Run). The Status field 540 equates to the Session Status from FIG. 22. The Nbr of Solutions field 542 is the number of solutions appearing in window 546. The Total Traffic field 544 is the total traffic for the problem scope.

All solutions appear as individual rows in scrollable window 546. Each row contains at least five columns of data. Solution Number, Cost, IMT Traffic, intraswitch Traffic and Permutations are defined as: a unique system generated enumeration for the particular solution, the cost according to the cost function, total IMT traffic, total Intraswitch traffic, and the number of rehomes used by the solution, respectively.

Hot keys are provided for sorting rows in window 546. A sort can be performed on any column of window 546. The Apply button 550 allows a user to cause automatic execution of a selected plan to a connected network. Hot key support is provided for printing a selected solution in window 546 with utilization of the Hard Copy Formatter. Invoking the Display button 548 for a selected solution in window 546 produces a detailed description of the solution. In one embodiment, a browsable flat file (read only) listing is produced. For example, invoking button 548 on a selected session produces a browse mode on a flat file such as that which is described by FIGS. 27B through 27F. A hot key is provided for returning from the browse mode back to FIG. 27A.

With reference now to FIGS. 27B through FIG. 27F, an actual browse format of solution detail is shown. FIGS. 27B through 27F comprise a single contiguous page listing of information, respectively.

Turning in particular to FIG. 27B, an FSID list 552 of switches involved in the problem scope is displayed. Thereafter, an RCG list 554 involved in the problem scope is also displayed. Each RCG triple is displayed in RCG list 554, followed by the number of circuits contained therein. RCG list 554 continues on to FIG. 27C.

Turning now to FIG. 27C, cost function weight coefficients 556 are displayed. Displayed therewith is the original cost value 558 which represents the cost of the original assignment vector.

Turning now to FIG. 27D, displayed are current rehome assignment solution values (prior to rehome optimization) including a total TSA to TSA traffic value 560, an IMT traffic total value 562 (traffic expressed in Centry Call Seconds) for all IMT traffic, a total intraswitch traffic value 564, and break by switches traffic value line 566 for each switch in the scope of the problem, a number of ports and port utilization percentage values 568 for each switch in the scope of the problem, the medium (average) port utilization value 570 for port utilization and the dispersion measurement value 572 which is a numerical characteristic of how evenly port utilization is distributed between switches. The solution number 574 equates to the Solution Number column data value in window 546 of FIG. 27A. An RCG list 576 (see FIG. 27D and FIG. 27E) provides solution rehoming information. The first three columns of the list (FSID, Serving Area and Type) make up an RCG. The next column is a number of circuits per RCG. The last column indicates (if necessary) whether an RCG is to be rehomed to a particular switch, for the particular solution. For example, instruction 578 indicates that RCG DNG2-DESMIADT18T-AO should be rehomed to a switch DNG1.

Turning now to FIG. 27F, displayed are the main parameters of this solution: normalized cost value 580, cost gain 582 with respect to an original assignment (normalized cost of original assignment is 1), number of rehomings 584, a total IMT traffic value 588, a total intraswitch traffic value 590, intraswitch traffic values 592 for each switch, a number of ports and port utilization percentage values 594 for each switch, a medium (average) port utilization 596 and the dispersion measurement of port utilization 598. Values 588 and 590 add up to a total SA to SA traffic value 586.

GUI data and raw data is merged into the intermediate input data before execution of the rehoming resolver 110. Various embodiments will save the data to disk at opportune moments throughout user interface interaction. Data manufactured by the data granulator 104 is raw data for filling in the GUI. In one embodiment, the GUI may be used to affect its own local copy of the data. In an alternative embodiment, the GUI may be used to affect the copy maintained in database 106.

With reference now to FIGS. 28 through 31, results output by a preferred embodiment of the data granulator 104 are shown as tables. The data granulator 104 creates at least four database tables, Switch data, RCG data, RCG to RCG traffic data and Distance data. The tables may be embodied as flat files or as normalized Standard Query Language (SQL) database tables.

With reference to FIG. 28 Switch data, each record therein contains eight primary fields. Fields are self explanatory. Field 599E is made up of 24 records for each hour of the day.

With reference to FIG. 29 RCG data, each record therein contains seven primary fields. Fields are self explanatory. Field 599A is made up of 24 records for each hour of daily traffic (three fields each).

With reference to FIG. 30 RCG to RCG traffic data, each record therein contains six primary fields. An RCG ID is the system generated unique identifier for a particular RCG. The RCG ID joins to a record in the FIG. 29 RCG data. Those skilled in the art will appreciate other methods for normalizing data in the database 106. Fields are self explanatory. CCS is an acronym for Centry Call Seconds. Specifically, one CCS is equivalent to one hundred seconds of telephone conversation. Field 599B is made up of 24 records for each hour of daily traffic (three fields each).

With reference to FIG. 31 Distance data, each record therein contains three fields. Fields are self explanatory.

A working implementation of a preferred embodiment of the data granulator 104 has shown that for the entire current MCI network, the switch file is about 100 records, the RCG file is between 3000 and 4000 records, the distance file is between 300,000 and 400,000 records and the RCG-RCG Traffic data is around 2 to 3 million records.

Figure 32:
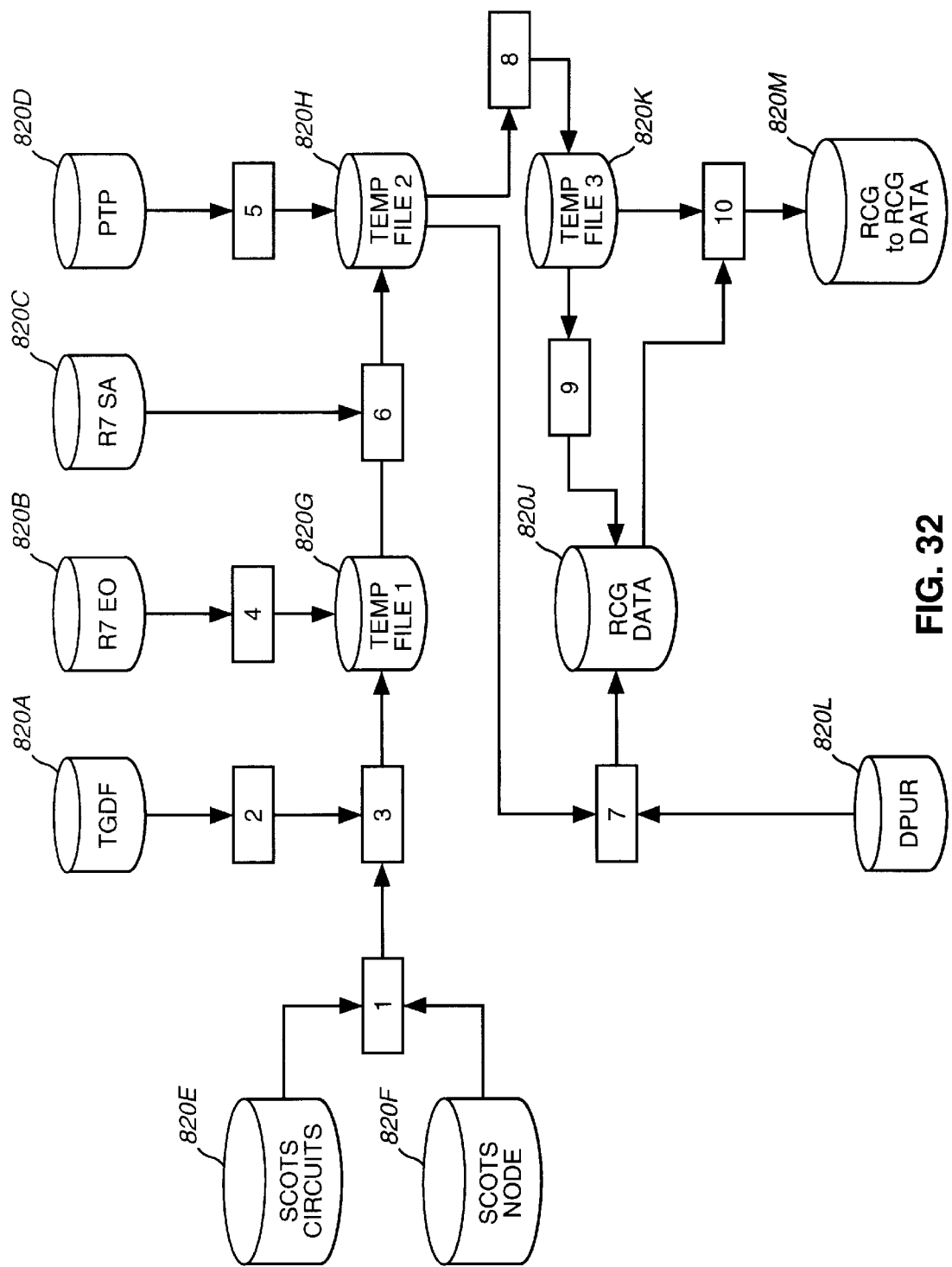
FIG. 32 through FIG. 34 depict a high level design of a preferred embodiment for the automated data gathering aspect of the present invention.
Figure 33:
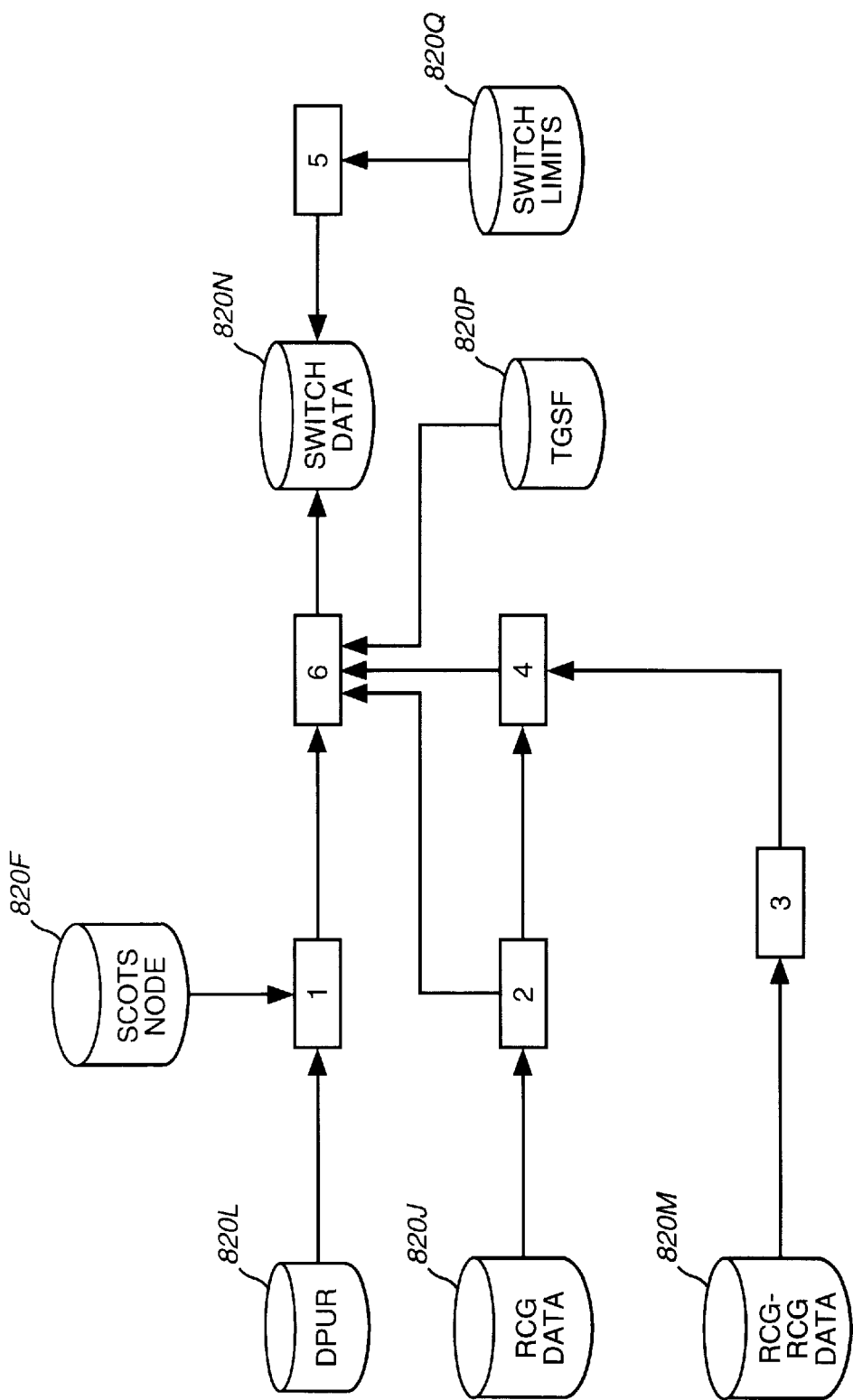
Figure 34:
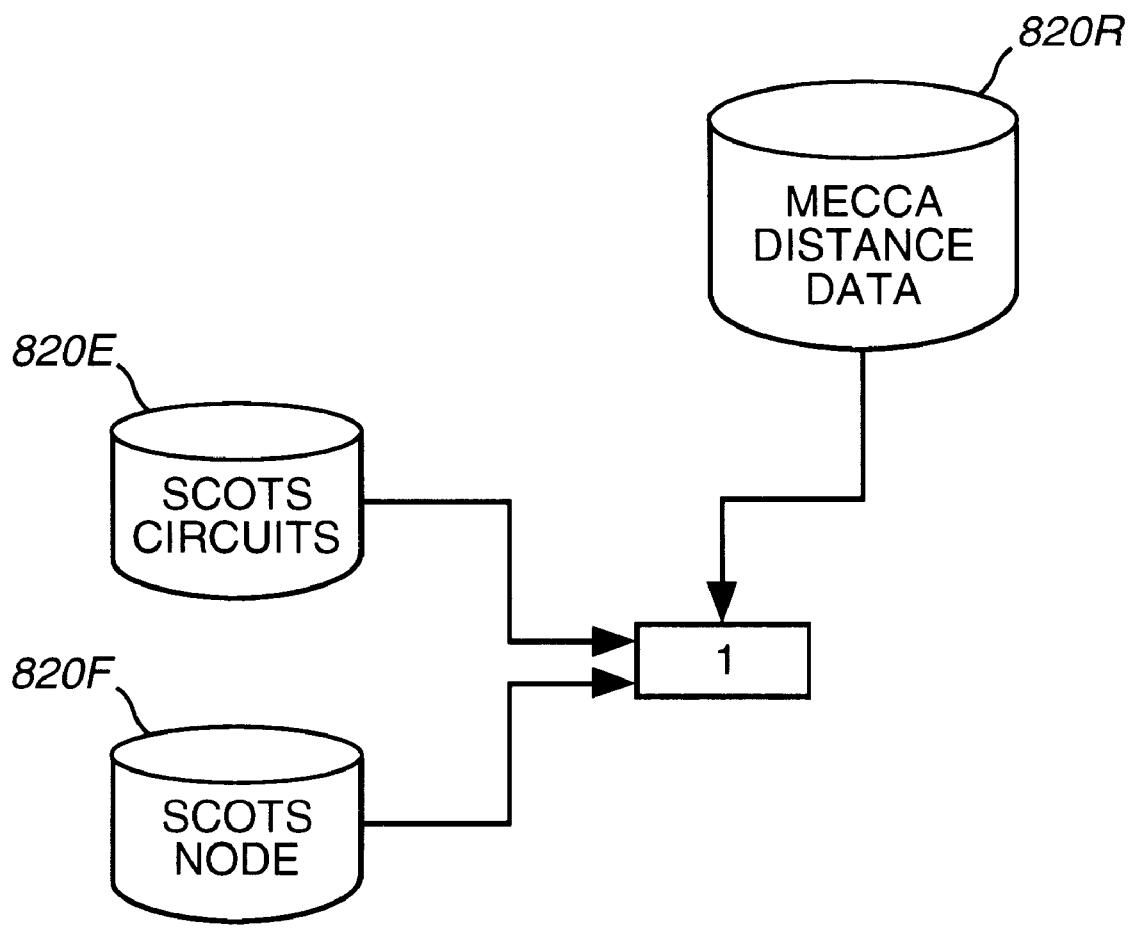

With reference now to FIG. 32 through FIG. 34, data flow diagrams are shown. FIGS. 32 through 34 demonstrate a preferred embodiment of the data granulator 104 for automatic manufacturing of data in the database 106 of FIGS. 1 and 2, as well as data in FIGS. 28 through 31. In this particular embodiment, data is manufactured from an authentic MCI network in accordance with the RCG partition example as heretofore described. Disk icons in FIGS. 32 through 34 represent data files or databases. Rectangular icons in FIGS. 32 through 34 contain step numbers therein and represent processing flows. Lines between icons demonstrate a data flow direction. The enumeration of steps indicate an order by which the data granulator 104 is to operate.

The data granulator may be a single threaded data processing system wherein steps occur synchronously, one after another. The data granulator may also be multi-threaded wherein a plurality of simultaneously executing threads exist for each step. Each thread is easily synchronized appropriately with semaphores to enforce the correct order of processing. A thread may be a process in itself or spawned from a process. Threads of the data granulator 104 may execute on the same hardware, or on communications network connected hardware. This allows distributing the data granulator 104 data processing system across as many machines as required to maximize performance. Step numbers indicate interfaces for synchronizing independent threads of execution in which case execution order may not be important except at the interfaces of the steps. Temporary files shown in the figures may be embodied as data written to a persistent storage device such as a hard disk drive, or data written to processor memory.

Figure 35:
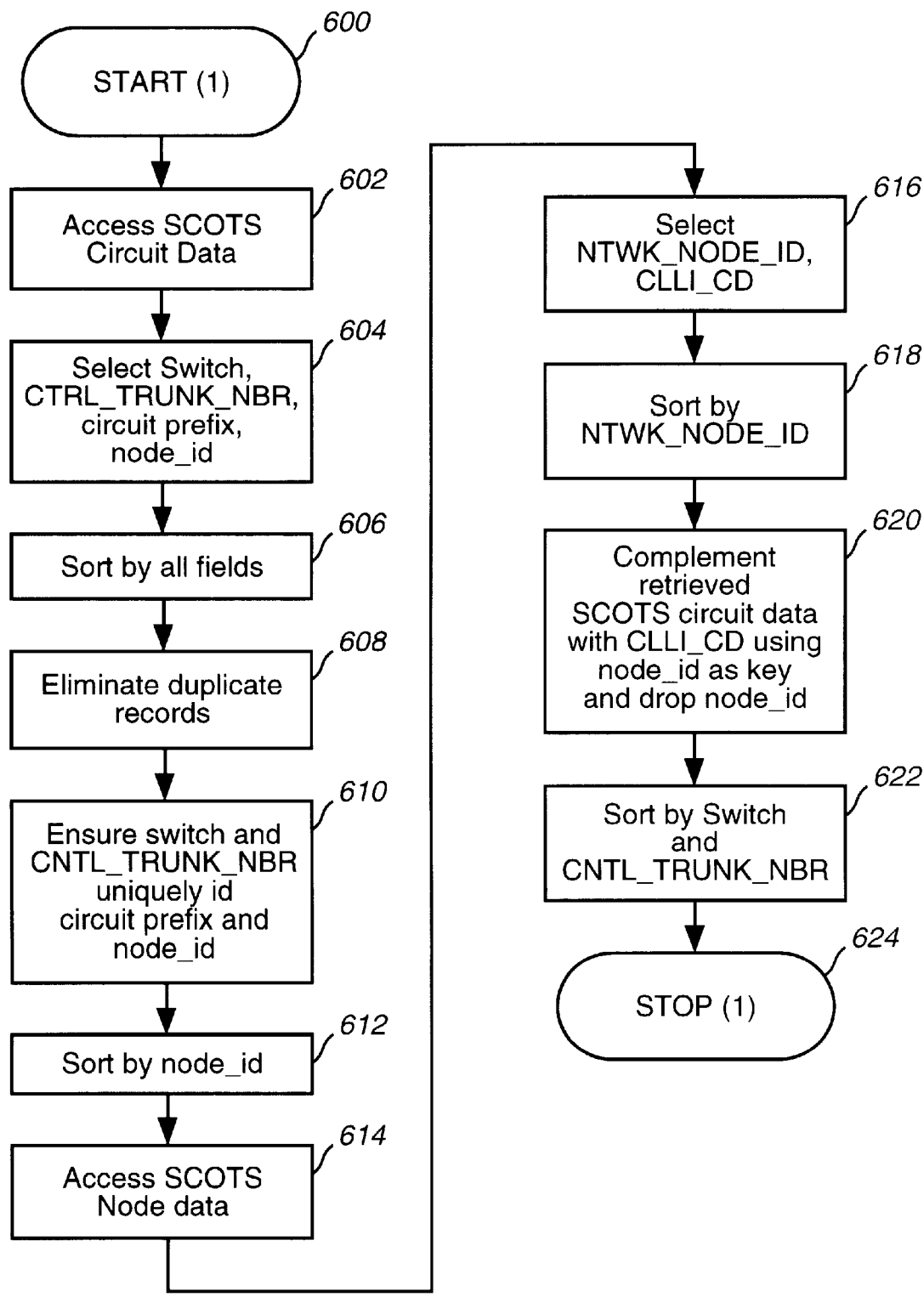

With reference now to all flowchart Figures from FIG. 35 and thereafter, flowcharts demonstrate processing of the present invention. Error handling is assumed in the processing in order to focus on important aspects of the present invention.

With reference again to FIG. 32, steps involved in manufacturing RCG data 820J (FIG. 29) and RCG to RCG traffic data 820M (FIG. 30) are demonstrated. In accordance with the present invention, data gathering shown in FIG. 32 uses the following sources of information from an actual MCI network:

Trunk Group Descriptor File 820A (TGDF)—used to retrieve directionality and TUI (Trunk Usage Identifier) of a trunk. Fields accessed therefrom include:

| Position | Field Name | Length | Representation | Description |
|---|---|---|---|---|
| 001 | FSID | 4 | Character | Switch id |
| 005 | TRK | 4 | Character | Trunk number |
| 017 | TRKCLASS | 1 | Character | Trunk Class |
| 020 | TRAF_DIR | 1 | Character | Traffic Direction |
| 234 | TUI | 4 | Character | Trunk Usage Identifier |

RTE7 End Office data 820B (R7 EO)—used to retrieve a SA id for a given EO. The RTE7 EO file provides information about homing relationships on originating sides of traffic. Fields accessed therefrom include:

| Position | Field Name | Length | Representation | Description |
|---|---|---|---|---|
| 001 | ENDOFC | 11 | Character | End Office CLLI |
| 015 | SERVAREA | 11 | Character | Serving Area CLLI |

RTE7 Serving Area data 820C (R7 SA)—used to retrieve a Switch where terminating traffic traverses for a given terminating SA and originating Switch. Fields accessed therefrom include:

| Position | Field Name | Length | Representation | Description |
|---|---|---|---|---|
| 001 | SERVAREA | 11 | Character | Serving Area CLLI (SA) |
| 020 | FORSWIT | 4 | Character | Originating Switch |
| 024 | HOMESWIT | 4 | Character | Home Switch of this SA |

NTAS Point-to-Point data 820D (PTP)—contains traffic information between local trunks homed to a particular switch and SA on terminating side. Fields accessed therefrom include:

| Position | Field Name | Length | Representation | Description |
|---|---|---|---|---|
| 005 | SWITCH | 4 | Character | Switch id |
| 009 | TRK | 3 | Packed decimal | Trunk number |
| 012 | SERVAREA | 11 | Character | Serving Area CLLI |
| 050 | TRKCLS | 1 | Numeric | Trunk Class |
| 053 | (B1–B24) | (PD4. + 9) | array-packed dec. | Blocked Call Attempts |
| 057 | (O1–O24) | (PD4. + 9) | array-packed dec. | Outpulsed Call Attempts |
| 061 | (C1–C24) | (PD5.2 + 9) | array-packed dec. | CCS |
| 371 | TOT_CCS | PD7.2 | packed decimal | Total CCS |

SCOTS Circuit data 820E (Circuits) and SCOTS Node data 820F (Nodes)—used to retrieve Distant End CLLI code for a given Switch trunk. Fields accessed therefrom include:

SCOT Circuit Data 820E

| Position | Field Name | Length | Representation | Description |
|---|---|---|---|---|
| 001 | CCT_NBR | 12 | Character | MCI circuit id |
| 073 | TERMINAL_ID2 | 3 | Character | POP |
| 076 | CNTL_TRUNK_NBR | 4 | Character | Trunk number |
| 132 | SWITCH | 4 | Character | Switch id |

SCOT Node Data 820F

| Position | Field Name | Length | Representation | Description |
|---|---|---|---|---|
| 001 | NTWK_NODE_ID | 3 | Character | Network node |
| 082 | CLLI_CD | 11 | Character | CLLI code of this node |
| 093 | Division | 2 | Character | Division id |
| 094 | Region | 1 | Character | Region id |
| 097 | TERM_ID_DEF | 3 | Character | Terminal |

DPUR data 820L—contains number of circuits per Switch trunk. Fields accessed therefrom include:

| Position | Field Name | Length | Representation | Description |
|---|---|---|---|---|
| 001 | SWITCH | 4 | Character | Switch id |
| 006 | TRUNK | 4 | Character | Trunk number |
| 014 | #_of_ckt | 5 | Character | # of circuits |

Other telecommunication networks will contain similar data that can be used by the present invention to construct RCG data 820J (FIG. 29) and RCG to RCG Traffic data 820M (FIG. 30).

Referring now to FIG. 35 in association with step 1 of FIG. 32, a table is created with the fields: Switch, Trunk, circuit prefix and Distant End CLLI code. Processing starts with block 600 and continues to block 602 where SCOTS Circuit data 820E is accessed. Thereafter, block 604 selects records with the fields: Switch, CNTL_TRUNK_NBR, circuit prefix (1–2 bytes of the CCT_NBR) and node_id (6–8 bytes of the CCT_NBR). CNTL_TRUNK_NBR is the trunk id. CCT_NBR is the circuit id. Block 604 flows to block 606 where all records are sorted using the key [Switch, CNTL_TRUNK_NBR, circuit prefix, node_id], and then to block 608 where all duplicate records are removed. A key in the form [K1, K2, ... Kn] implies Ki is more primary than Kj for i<j. Processing continues to block 610 where Switch and CNTL_TRUNK_NBR are validated to uniquely identify circuit prefix and node_id. If validation shows this not to be true, the data granulator 104 will report the error and terminate. Block 610 continues to block 612 where records are sorted by node_id and maintained as an accessible table. Thereafter, block 614 accesses SCOTS node data 820F and block 616 selects records therefrom with the fields NTWK_NODE_ID and CLLI_CD. NTKW_NODE_ID is an id of the network node, for example location of switch, tandem, EO, etc. CLLI_CD is the CLLI code for the equipment. Block 616 flows to block 618 where records are sorted by NTWK_NODE_ID. Thereafter, block 620 complements said accessible table with CLLI_CD using node_id as a key and dropping the node_id field. The result is a step 1 table with the fields Switch, Trunk, circuit prefix and CLLI_CD. Block 620 continues to block 622 which sorts step 1 table records with the key [Switch, Trunk] and processing terminates at block 624.

Figure 36:
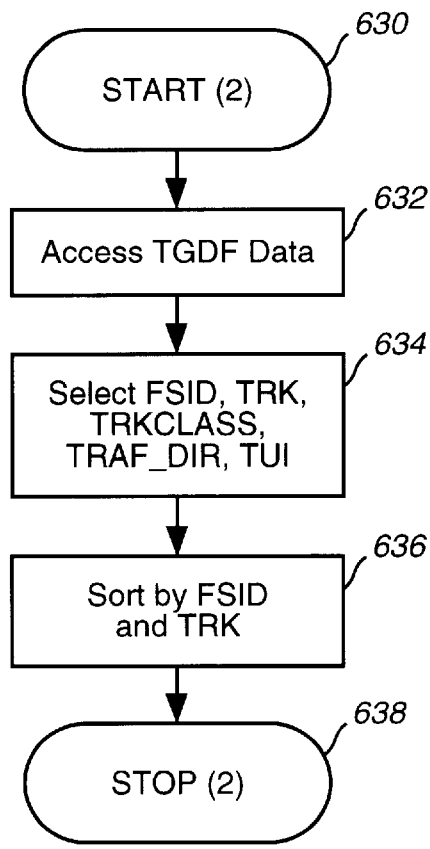

Referring now to FIG. 36 in association with step 2 of FIG. 32, step 2 processing starts in block 630 and continues to block 632 which accesses a Trunk Group Descriptor File 820A (TGDF) from NTAS. The TGDF provides directionality and the TUI for a trunk. Block 634 selects records therefrom with the fields FSID (Switch), TRK (Trunk), TRKCLASS, TRAF_DIR and TUI. FSID is the Switch id. TRK is the trunk id. TRKCLASS is defined as:

1=IMT

2=FX (Feature Group trunks)

3=WATS

4=DAL (Hardwire)

5=FXI (International Trunks).

TRAF_DIR is the traffic direction ('A' for access, 'T' for termination, 'B' for bidirectional). Block 634 continues to block 636 which sorts records with the key [FSID,TRK] and maintains the records as a step 2 table. Processing thereof terminates in block 638.

Figure 37:
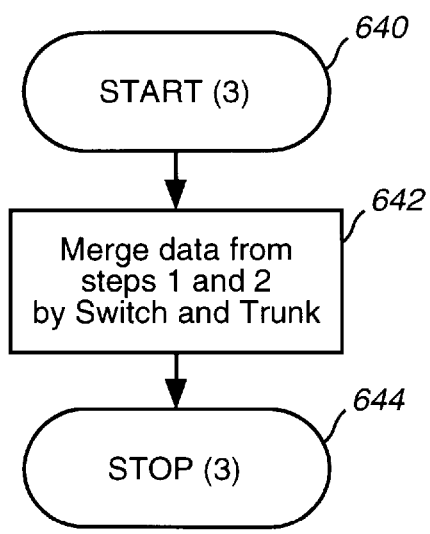

Referring now to FIG. 37 in association with step 3 of FIG. 32, step 3 processing starts in block 640, continues to block 642 which merges said step 1 table with said step 2 table by matching Switch and Trunk and terminates in block 644. The result is a step 3 table with records having the fields Switch, Trunk, Circuit Prefix, Distant End CLLI code, TRKCLS, DIR and TUI.

Figure 38:
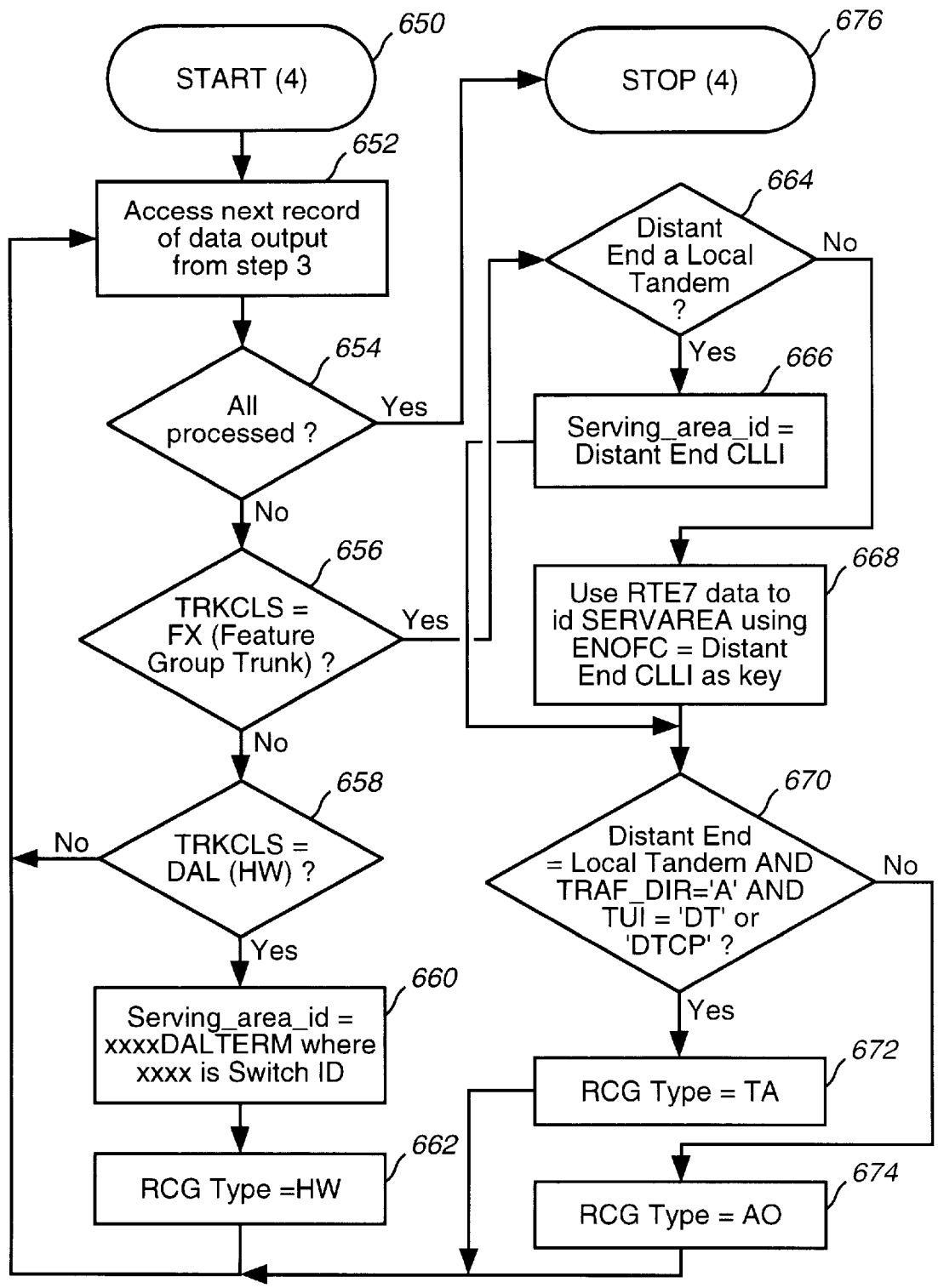

Referring now to FIG. 38 in association with step 4 of FIG. 32, said step 3 table is complemented with SA id and RCG type. SA id is the CLLI code of the local tandem that represents the Serving Area or HW string identifier. The result of step 4 is a temporary file 1 820G with the fields Switch, Trunk, Circuit Prefix, Distant End CLLI code, TRKCLS, DIR, TUI, Serving Area id and RCG Type. Step 4 processing starts in block 650 and continues to block 652 which accesses a record from the step 3 table. Block 652 defines the top of an iterative loop hereinafter described. If in block 654 the last record was determined to have been processed, then processing terminates in block 676. If in block 654 there is a remaining record to process, block 656 checks the current record for being a feature group trunk. If in block 656 the record is not a feature group trunk, block 658 checks the current record for being a DAL trunk. If in block 658 the trunk is not a DAL trunk, processing flows back to block 652 for another iteration.

Referring back to block 656, if the current record is a feature group trunk, then processing continues to block 664. If in block 664, the record distant end is a local tandem (i.e. second byte of the ckt prefix='T'), then the step 3 table is complemented in block 666 with a Serving_area_id field equal to the Distant End CLLI code. Thereafter, if in block 670 the Distant End is a local tandem and the traffic direction is access (A) and the TUI is either DT or DTCP (DT and DTCP identify Feature Group D tandem trunks. DT trunks go through a regular MCI terminal and DTCP trunks go through a closet POP), then RCG type=Tandem Access (TA) in block 672 and processing continues back to block 652. If in block 670, the condition is not true, then the RCG type=All Other (AO) in block 674 and processing continues to block 652.

Referring back to block 664, if the distant end is not a local tandem, then block 668 accesses Route 7 End Office data 820B (R7 EO). R7 EO data 820B of interest includes ENDOFC (End Office CLLI code) and SERVAREA (Serving Area CLLI code). Block 668 complements the step 3 table with Serving_area_id by matching the current record Distant End CLLI code. Thereafter, block 668 flows to block 670 which was described. Referring back to block 658, if the current step 3 table record is a DAL trunk, then block 660 complements the step 3 table with Serving_area_id set to the string "xxxxDALTERM" such that "xxxx" is the Switch identifier. Thereafter, block 662 sets RCG type to Hardwire (HW) and processing flows back to block 652 for another iteration.

Figure 39:
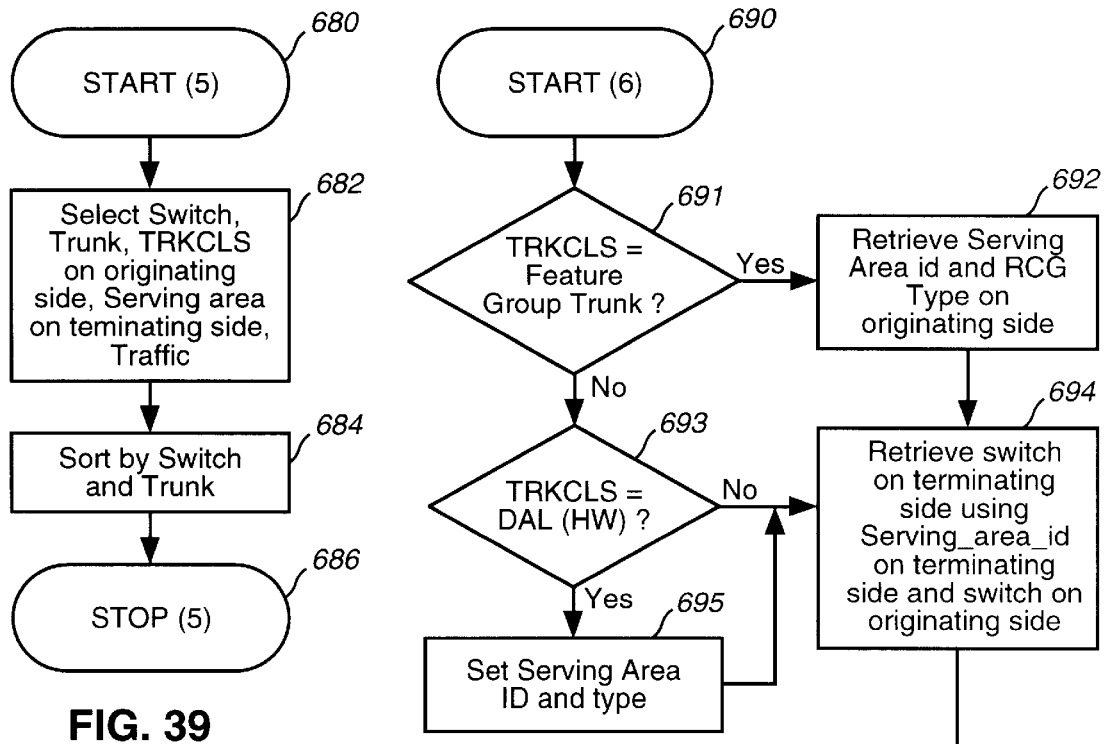

With reference now to FIG. 39 in association with step 5 of FIG. 32, the NTAS Point-to-Point data 820D (PTP) is accessed. Step 5 processing starts in block 680 and continues to block 682 which selects records from PTP data having the fields Switch, Trunk, TRKCLS on originating side, Serving Area on terminating side and Traffic (Traffic is actually 24 member arrays of CCS, blocked and outpulsed call attempts as well as total CCS). Block 682 continues to block 684 where records are sorted by Switch and Trunk to a step 5 table. Step 5 processing then terminates in block 686.

Figure 40:
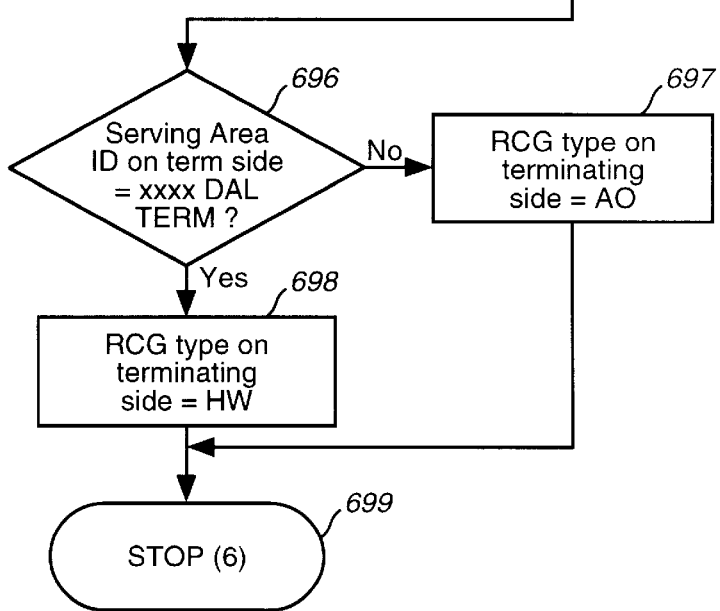

With reference now to FIG. 40 in association with step 6 of FIG. 32, the step 5 table is complemented with SA id and RCG Type on the originating side (FX and DAL trunks) and Switch and RCG Type on the terminating side. The step 6 process starts in block 690. Block 690 flows to block 691 which checks records for being a feature group trunk. If in block 691 a record is not a feature group trunk, block 691 continues to block 693. If in block 693 the trunk is not a DAL trunk, processing flows to block 694 which retrieves the Switch on the terminating side from Route 7 Serving Area data 820C (R7 SA) using Serving Area id on the terminating side and Switch on the originating side (foreign switch) as a key. Thereafter, processing continues to block 696. If in block 696, the Serving Area ID on the terminating side is not equal to xxxxDALTERM, then block 697 sets RCG type on terminating side to AO and block 699 terminates processing. If in block 696 the Serving Area ID on the terminating side is equal to xxxxDALTERM, then block 698 sets RCG type on terminating side to HW and block 699 terminates processing. Referring back to block 691, if a record is a feature group trunk, then processing continues to block 692 for retrieving Serving Area id and RCG Type on the originating side from temporary file 1 using Switch and Trunk as a key. Block 692 flows to block 694 which was already described. Referring back to block 693, if a record is a DAL trunk, then block 695 sets Serving Area ID to xxxxDALTERM and sets RCG type to HW. Processing continues therefrom to block 694 which was already described. The result of step 6 is a temporary file 2 820H with the fields Switch, Trunk, Serving Area id, RCG Type, TRKCLS on originating side, Switch, Serving Area id, RCG Type on terminating side and Traffic data. Every record in the temporary file 2 820H includes information about traffic between RCGs on the originating and terminating sides. Summarization procedures on temporary file 2 820H allows creating RCG data and RCG-RCG Traffic data.

Figure 41:
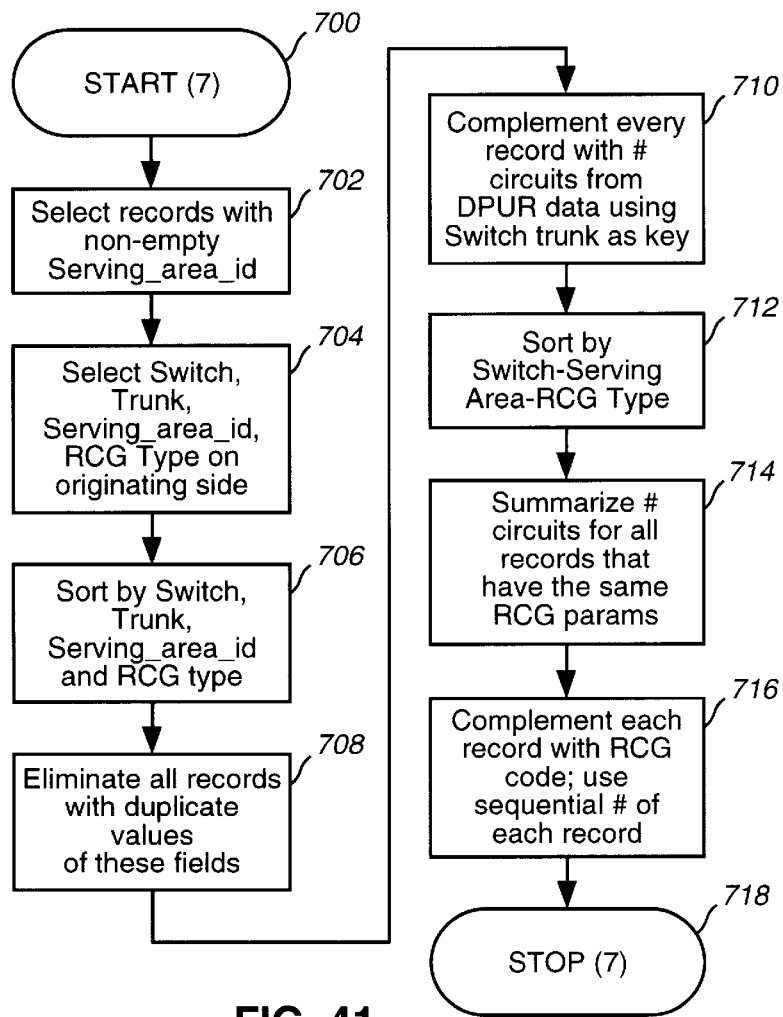

With reference now to FIG. 41 in association with step 7 of FIG. 32, temporary file 2 820H is to be summarized on an RCG level of granularity in order to create RCG data 820J. Step 7 processing starts in block 700 which proceeds to block 702 for selecting records from temporary file 2 820H with non-empty SA id. Processing continues to block 704 which then selects fields Switch, Trunk, SA id and RCG Type on originating side from those records and then on to block 706 for sorting the four field records, respectively, using the four fields as a key. Thereafter, block 708 eliminates duplicate records. Processing continues to block 710 where every four field record obtained so far is complemented with the number of circuits from DPUR data using the Switch and Trunk as a key. Block 710 flows to block 712 which sorts records by Switch-Serving Area and RCG Type. Then, block 714 summarizes the number of circuits for all records that have the same RCG triple (i.e. [Switch,Serving Area,RCG Type]). Block 714 continues to block 716 for complementing each record with an RCG code (i.e. identifier), using the sequential number of each record as the numerical RCG identifier. Processing then stops in block 718. At this point creation of the RCG data 820J is almost complete. Data for remaining fields will be determined in step 9.

Figure 42:
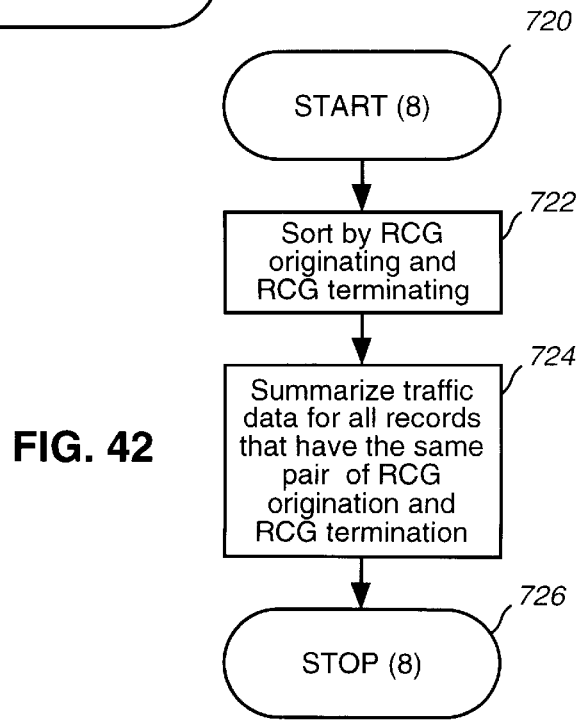

With reference now to FIG. 42 in association with step 8 of FIG. 32, traffic information is summarized from temporary file 2 820H on an RCG to RCG level of granularity. Step 8 processing starts in block 720 and continues to block 722 which sorts the temporary file 2 820H records by originating and terminating RCGs. Block 722 continues to block 724 which summarizes traffic data for all records that have the same pair of origination and termination RCGs. As a result, a temporary file 3 820K is created with the fields Switch, Serving Area id, RCG Type on originating side, Switch, Serving Area id, RCG Type on terminating side and Traffic. Processing then terminates in block 726.

Figures 43, 44:
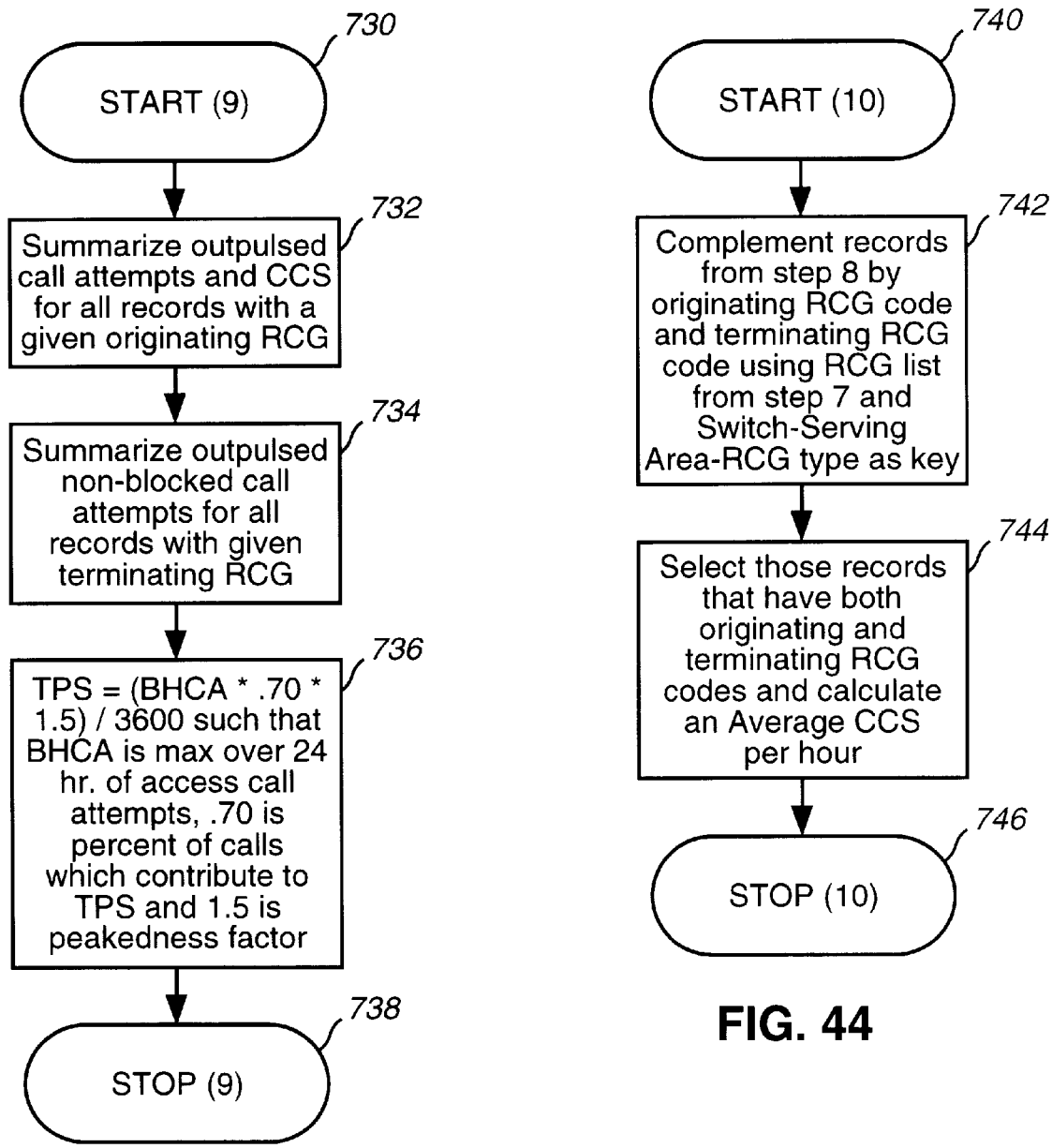

With reference now to FIG. 43 in association with step 9 of FIG. 32, calculations are made for every RCG, namely, an amount of access and egress call attempts, and CCS for each hour of a 24 hour day and TPS. The RCG list from step 7 is complemented. Block 730 starts processing for step 9 and flows to block 732 where outpulsed call attempts (arrays O1–O24, prefix O for Outpulsed) and CCS (array C1–C24, prefix C for CCS) for all records of temporary file 3 are summarized with a given originating RCG. This obtains an amount of access call attempts (x24 hour) and CCS (x24 hour) for a given RCG. Block 732 continues to block 734 where summarization is performed for outpulsed non-blocked call attempts (vector difference between O1–O24 and B1–B24, prefix B for Blocked call attempts) for all records of temporary file 3 820K with a given terminating RCG (terminating RCG is identified by Switch, Serving Area id and RCG Type on terminating side). This obtains total egress traffic for a given RCG. Block 736 then calculates the TPS resource using the formula:

$$TPS=(BHCA*0.70*1.5)/3{,}600$$

where BHCA is a maximum over 24 hours of access call attempts, 0.70=Percent of calls which contribute to TPS (access BHCA), 1.5=Peakedness Factor.

Finally, step 9 processing terminates in block 738. As a result the RCG data 820J (FIG. 29) has been created.

With reference now to FIG. 44 in association with step 10 of FIG. 32, the RCG to RCG Traffic data 820M is created. Step 10 processing begins in block 740 and flows to block 742 for complementing records of temporary file 3 820K from step 8 with originating RCG code and terminating RCG code using the RCG list from step 7 and Switch-Serving_Area-RCG_type as a key. Block 742 then continues to block 744 for selecting those records that have both originating and terminating RCG codes and calculate an Average CCS per hour (sum of all CCS from array divided by 24). Step 10 processing terminates with block 746. As a result the RCG to RCG Traffic data 820M (FIG. 30) has been created.

With reference to FIG. 33, steps involved in manufacturing Switch data 820N (FIG. 28) is demonstrated. In accordance with the present invention, data gathering shown in FIG. 33 uses the following sources of information from an actual MCI network:

NTAS Trunk Group Statistics File 820P (TGSF)—contains traffic information for every Switch and Trunk and is used to estimate a total number of call attempts per Switch. Fields accessed therefrom include:

| Position | Field Name | Length | Representation | Description |
|---|---|---|---|---|
| 005 | SWITCH | 4 | Character | Switch id |
| 009 | TRK | 3 | Packed decimal | Trunk number |
| 012 | DIR | 1 | Character | Traffic Direction |
| 063 | (VC1–VC24) | (PD4.0 + 22) array-packed dec. | | Valid Call Attempts |
| 067 | (BC1–BC24) | (PD4.0 + 22) array-packed dec. | | Blocked Call Attempts |

Switch Limits data 820Q—used as source of switch resource information including number of ports, BHCA and TPS limits). Fields accessed therefrom include Switch id, Switch Type, BHCA Limits, TPS Limits and Port Limits.

Other telecommunication networks will contain similar data that can be used by the present invention to construct Switch data 820N (FIG. 28).

With reference now to FIG. 45 in association with step 1 of FIG. 33, block 750 starts step 1 processing, block 752 summarizes the number of circuits from DPUR data 820L on a switch level. Thereafter, block 753 retrieves switch division and region information from SCOTS node data 820F. Switches are identifiable as belonging to these geographical organizations. Actual MCI data in the SCOTS node data 820F currently includes 8 divisions (NE—North East, MA—Mid Atlantic, MW—Mid West, SE—South East, SW—South West, WE—West, PA—Pacific, IT—International) and 3 regions (E—East, C—Central, W—West). Block 753 continues to block 754 which terminates step 1 processing.

With reference now to FIG. 46 in association with step 2 of FIG. 33, block 756 starts step 2 processing, and block 758 summarizes the number of circuits and total number of call attempts (access and egress) for each hour of a 24 hour day from the RCG data 820J on a switch level, taking into account that all intraswitch call attempts are counted twice. Block 754 then terminates step 2 processing.

With reference now to FIG. 47 in association with step 3 of FIG. 33, block 762 starts step 3 processing, and block 764 estimates for every switch an amount of intraswitch call attempts which involves selecting those records of the RCG to RCG traffic data 820M that have a given switch both on the originating and terminating side, and then summarizing call attempts for these records. Block 766 then terminates step 3 processing.

With reference now to FIG. 48 in association with step 4 of FIG. 33, block 768 starts step 4 processing, and block 770 estimates an amount of RCG to RCG call attempts that originated and/or terminated on a given switch. This includes subtracting from the amount of call attempts we calculated on step 2 an amount of call attempts we calculated on step 3. Thus, an amount of RCG to RCG call attempts (x24 hour) that originated and/or terminated on a given switch is obtained. Block 772 then terminates step 4 processing.

With reference now to FIG. 49 in association with step 5 of FIG. 33, block 774 starts step 5 processing, and block 776 selects a snapshot list of switch ids and resource limits (number of ports, BHCA and TPS) from the Switch Limits data 820Q. Block 778 then terminates step 5 processing.

Figure 50:
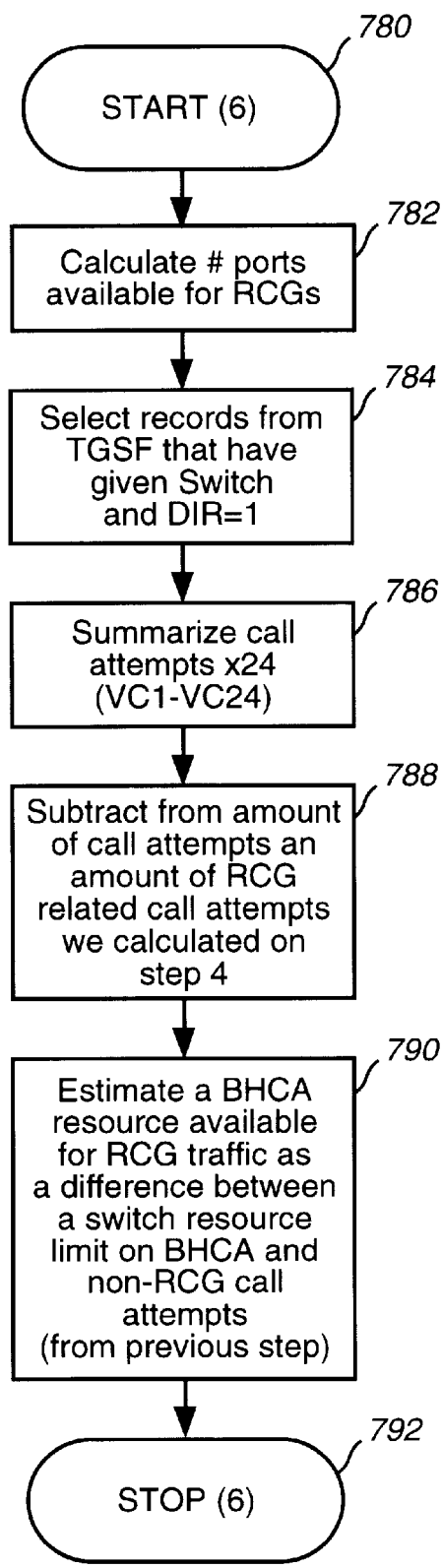

With reference now to FIG. 50 in association with step 6 of FIG. 33, records from step 5 are complemented with information on resources (# of ports and BHCA) available for RCG related traffic. Step 6 processing starts in block 780 and continues to block 782 where the number of ports available for RCGs are calculated with the following procedure:

Estimate for any Given Switch

A=total number of circuits in use for a given switch (FIG. 33 step 1);

B=number of circuits of all RCGs for a given switch (FIG. 33 step 2);

C=the difference A–B is number of ports used by non-FX and non-DAL trunks;

D=total number of ports (from Switch Limits file);

D–C=number of ports available for RCGs (FX and DAL traffic).

Block 782 flows to block 784 where processing begins for calculating BHCA resources available for RCGs traffic, taking into account not only access traffic that originated from a given switch, but also egress traffic for any given switch (both access and egress traffic use BHCA resources). For any given switch, traffic can be subdivided into 4 parts:

Access Interswitch Traffic—traffic that originated from a given switch and terminated to another switch;

Egress Interswitch Traffic—traffic that originated from another switch and terminated on serving area that is homed to a given switch;

Intraswitch Traffic—traffic that originated from serving area that is homed to a given switch and terminated on serving area that is homed to the same switch; and Transit IMT Traffic (forserving switch)—traffic which has originating and terminating serving areas that are not homed to the given switch.

These types of traffic use a BHCA switch resource. The three type RCG example heretofore described implies focusing on the Interswitch and Intraswitch traffic. This characterizes traffic that originated and/or terminated on RCGs.

Block 784 selects those records from TGSF (820P) that have a given Switch and DIR=1. Then, block 786 summarizes call attempts for each hour of a 24 hour day. Thereafter, block 788 subtracts from the amount of call attempts an amount of RCG related call attempts we calculated in step 4. The difference will be an amount of non-RCG traffic (array x24 hour). Block 788 then flows to block 790 for estimating a BHCA resource available for RCG traffic (array x24 hour) as a difference between a switch resource limit on BHCA (from step 5) and non-RCG call attempts (from block 788). Step 6 processing then terminates in block 792. As a result the Switch data 820N (FIG. 28) has been created.

With reference now to FIG. 34, the step involved in manufacturing Distance data of FIG. 31 is demonstrated. In accordance with the present invention, data gathering shown in FIG. 34 uses the following sources of information from an actual MCI network:

MECCA Distance data 820R—used to retrieve the shortest route mileage between any given pair.

| Position | Field Name | Length | Representation | Description |
| --- | --- | --- | --- | --- |
| 001 | STN1 | 6 | Character | Station 1 id |
| 007 | STN2 | 6 | Character | Station 2 id |
| 013 | MILEAGE | 5.1 | Numeric | Mileage |

Other telecommunication networks will contain similar data that can be used by the present invention to construct Distance data (FIG. 31).

Figure 51:
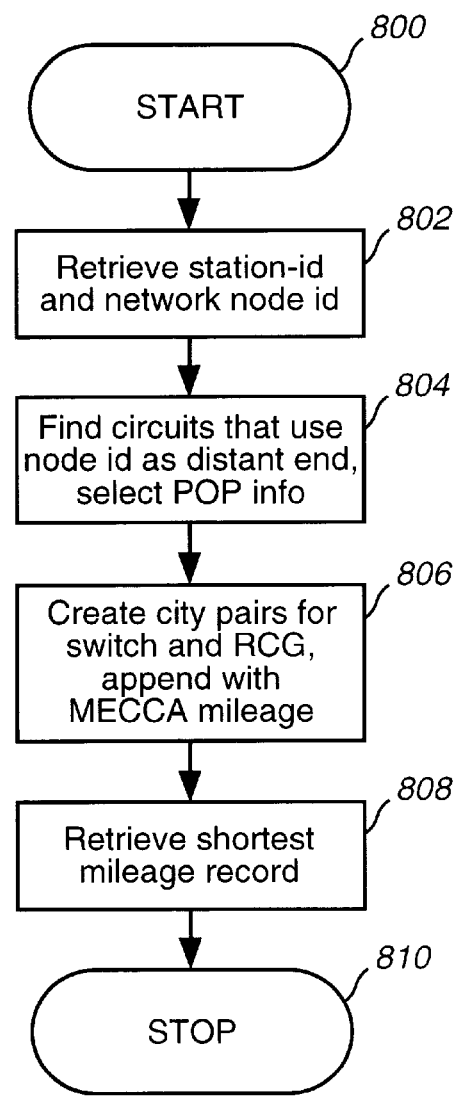

With reference now to FIG. 51 in association with step 1 of FIG. 34, relevant switch and circuit information is extracted from SCOTS for a given switch name (FSID) and RCG id. MECCA distance data 820R is accessed to find a shortest mileage between any given city pair. Block 800 starts step 1 processing and continues to block 802 which accesses SCOTS Node data 820F to retrieve a station-id (terminal) for a given switch name and Network Node id for a tandem CLLI code of a given RCG. Thereafter, block 804 accesses SCOTS Circuit data 820E to find all circuits that use the node id as a distant end and select POP information (station-id where POP is located). Then, block 806 creates a list of city pairs (terminal-POP) for a given switch and RCG. Block 806 also appends this information with mileage data from MECCA Mileage data. Block 806 continues to block 808 where the record with the shortest mileage is retrieved. Block 810 terminates processing, and as a result, distance data (FIG. 31) for a given switch and RCG has been created.

Figure 52:
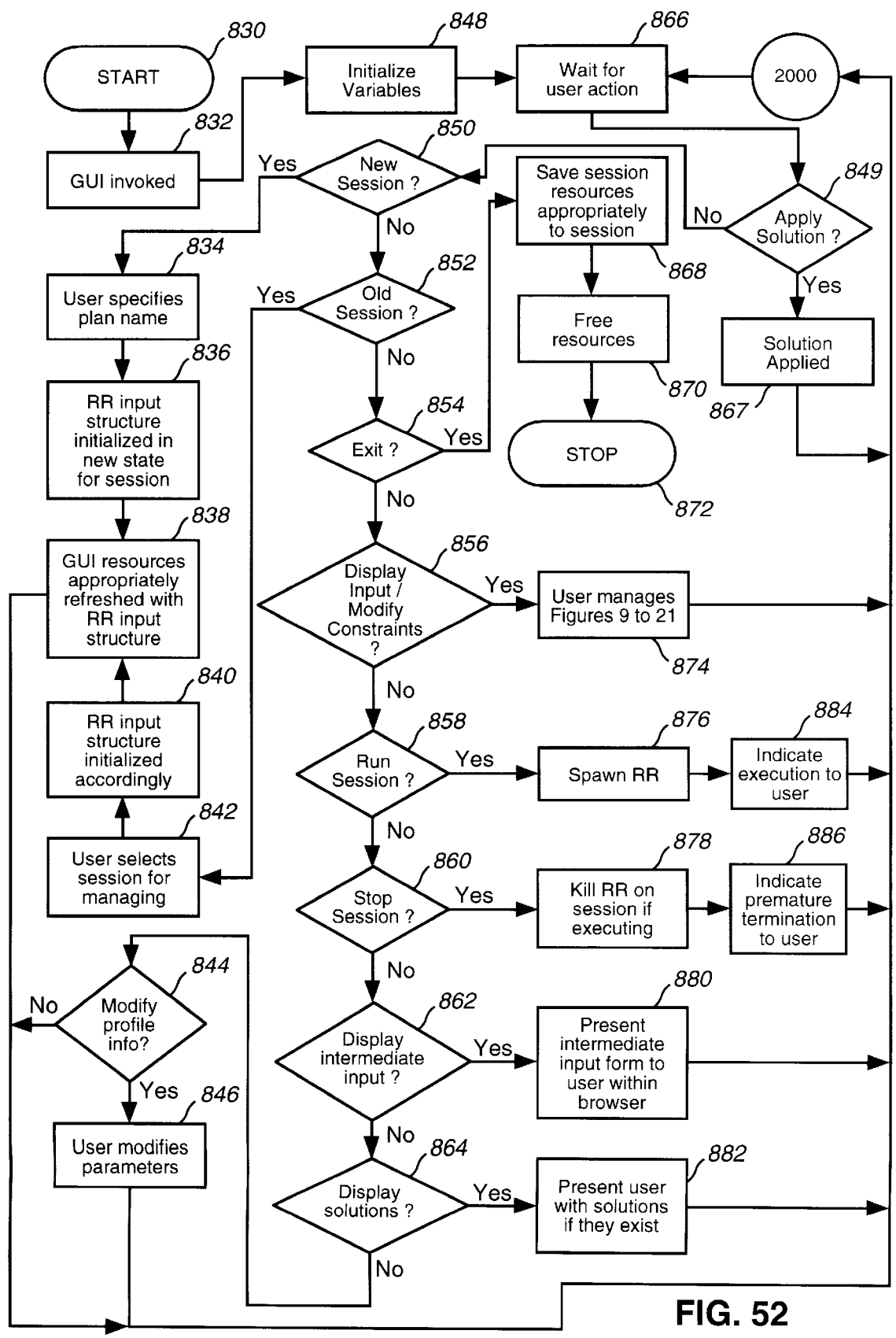
FIG. 52 depicts a flowchart demonstrating EUI driver and associated data preparation aspects of the present invention.

Turning now to FIG. 52, the flowchart for the EUI driver 114 is demonstrated. Because of the general nature of the Rehome Resolver (RR) 110 as will be described in FIGS. 53 through 55A–D, any type of network is applicable. The EUI and associated data preparation processing is the area which is specific for a particular application.

Block 830 starts processing for the EUI driver 110 and associated data preparation for a telecommunications network as heretofore described. Block 830 continues to block 832 where the GUI is invoked, and on to block 848. Block 848 initializes EUI management variables and any values which will be defaulted on various windows of the user interface. Block 848 also constructs tables which map switch names and RCGs to their internalized numeric reference numbers which are used in an RR input structure and vector assignments. Thereafter, block 866 waits for user action on GUI real estate as described by FIGS. 7 through 27F. Obvious processing for navigating and error handling associated with FIGS. 7 through 27F is omitted in lieu of focusing on important elements of the present invention. When user action is detected, processing continues to block 849. If in block 849, the user has already executed the RR and selects to apply a solution found, for example by invoking the Apply button 550 of FIG. 27A, then processing continues to block 867 where the solution is automatically applied to network administration interfaces of the telecommunications network. Block 867 then flows back to block 866. If in block 849 the user did not opt to Apply an optimized rehome solution, processing flows to block 850. If in block 850 a New Session option is selected, such as that which is found on the FIG. 7 pulldown, block 834 prompts the user for a validated plan name. Block 834 corresponds to processing in FIG. 8. Block 834 then continues to block 836 where an RR input structure is initialized. The RR input structure contains all information necessary for rehoming optimization calculation. The intermediate input data shown in FIGS. 23 through 25 is a dump of an RR input structure. Then, block 838 appropriately updates GUI resources for proper user interface according to the RR input structure. Processing flows back to block 866 for processing as previously described.

Referring back to block 850, if the user did not select action for a new session, processing continues to block 852. If in block 852 the Old Session option is selected, such as that which is found on the FIG. 7 pulldown, the user selects in block 842 a session for managing, for example from FIG. 22. Block 842 then continues to block 840 where the RR input structure is initialized according to the session selected. Block 840 preferably retrieves old session information, which includes the RR input structure data, from a shared database repository accessible to multiple users in a network. Then, processing flows to block 838 as previously described.

Referring back to block 852, if the user did not select action for an old session, processing continues to block 854. If in block 854 the user has selected to Exit, for example, from the Exit option such as that which is found on the FIG. 7 pulldown, block 868 saves to a shared database repository all RR input structures for all sessions maintained during the current invocation of the present invention user interface processing of FIG. 52. Thereafter, block 870 frees resources such as dynamically allocated memory for RR input structures and block 872 terminates the process which includes terminating the user interface.

With reference back to block 854, if the user did not select to Exit, then processing continues to block 856. If in block 856 the user opted to modify constraints or display input, for example, invoking the button 518 of FIG. 22 or invoking the Display Input pulldown option of FIG. 26, then block 874 interfaces with the user by way of FIGS. 9 through 21. Processing then flows back to block 866 as previously described. If in block 856, the user did not opt to modify constraints or display input, processing flows to block 858. If in block 858, the user opted to Run a session, for example, from FIG. 26 or with a hot key from FIG. 22, then block 876 spawns an asynchronous execution thread of the RR embodied by FIG. 53 and subsequent figures. Processing continues therefrom to block 884 which notifies the user appropriately that a session is running. Processing then flows back to block 866. If in block 858, the user did not opt to run a session, processing continues to block 860. If in block 860, the user opted to stop a currently running session, then block 878 terminates the session if it is running and block 886 indicates the termination appropriately on the user interface. Processing flows back to block 866.

Referring back to block 860, if the user did not opt to terminate a session, then processing continues to block 862. If in block 862 the user opted to display intermediate input, the flat file form is presented to the user in a browser in block 880 and processing continues back to block 866. A hot key out of browse mode and back to block 866 is assumed in FIG. 52 processing. If in block 862 the user did not opt to display intermediate input, processing continues to block 864. If in block 864 the user opted to display solutions for a previously executed session, for example by way of button 520 of FIG. 22, block 882 presents the user with solutions calculated by the RR and processing continues back to block 866. Block 882 presents the user with solutions in a form, for example, of FIG. 27A. Processing for FIG. 27A through FIG. 27F is assumed in block 882 of FIG. 52. If in block 864, the user did not opt to display solutions, processing continues to block 844. If in block 844 the user opted to modify profile information, for example by way of the pulldown in FIG. 7, the user modifies profile parameters in block 846 and processing continues back to block 866. If in block 844 the user does not opt to modify profile parameters, processing continues back to block 866 as previously described.

Figure 53:
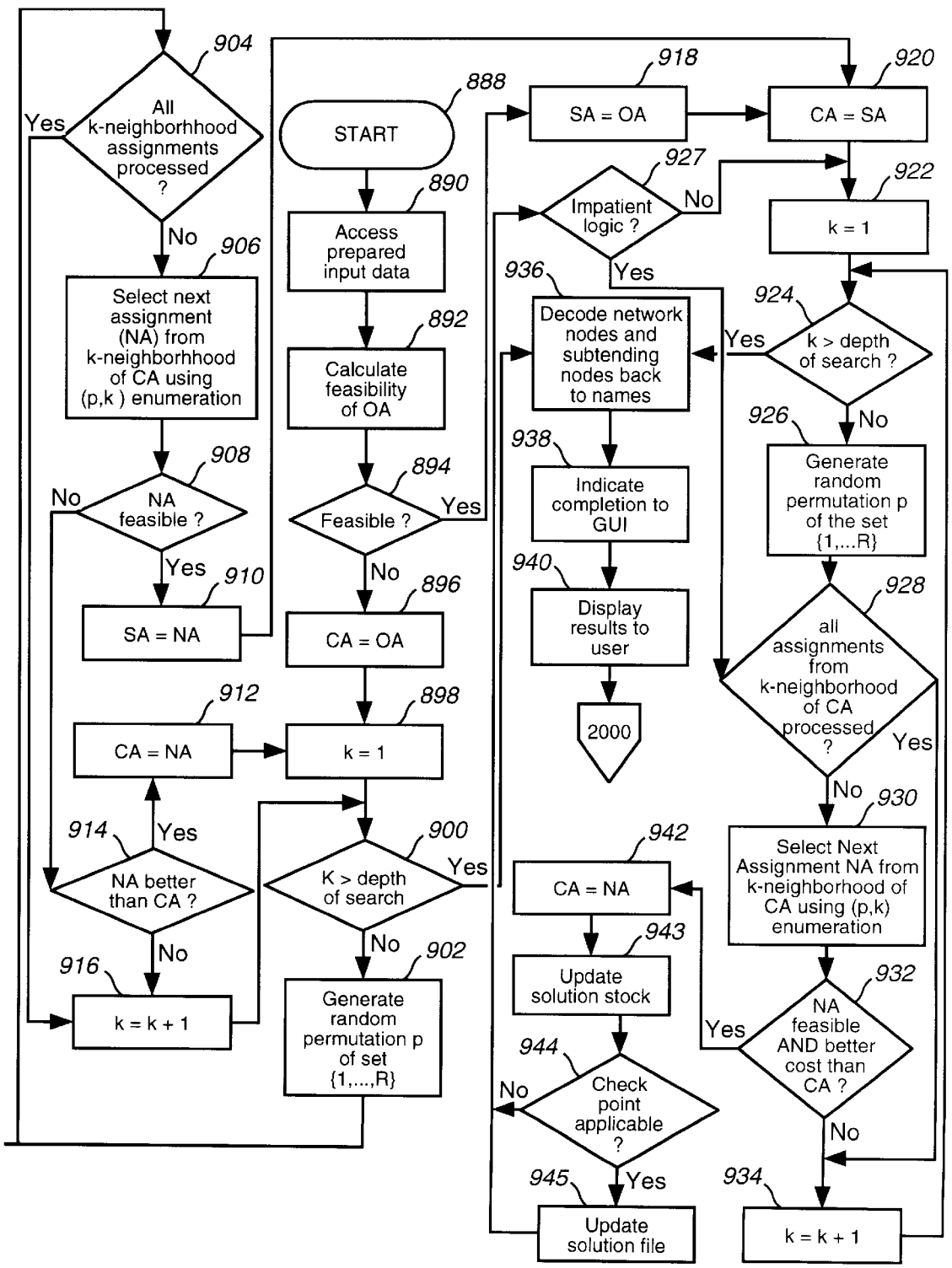
FIG. 53 through FIG. 56 depict flowcharts demonstrating the Rehoming Resolver aspect of the present invention.

Referring now to FIG. 53, processing for the Rehome Resolver (RR) 110 is demonstrated. Typical optimization problems concern linear programming, non-linear programming and integer programming. Linear programming problems are solved, for example, by simplex and boundary methods. Non-linear programming problems are solved, for example, by gradient methods. Integer programming problems are solved, for example, by branch and bound, implicit enumeration and heuristic methods. The present invention utilizes a combination approach of k-Interchange heuristics and stochastic enumeration. It is important to first understand the generic nature of the RR and some basic concepts used in processing thereof. A network node, such as an IXC switch, is a point of traffic accumulation and distribution in the network. Every network node may serve any number of subtending nodes. Numerical codes are used to internally identify network nodes in the RR, for example, 1, 2, . . . , S, where S is a total number of network nodes. The RR considers a subtending node to be a point of traffic origination or termination. Traffic from several subtending nodes is accumulated in the network node to which subtending nodes are homed. The RR assumes that a subtending node can be assigned (homed) to not more than one network node and a subtending node may change its home network node. These assumptions allow a straightforward handling of RCGs and many other types of network entities. While RCGs are certainly not nodes or subtending nodes, the RR can operate with a mathematical model as though RCGs are logically subtending nodes from a particular network node (i.e. switch). RCGs are also identified with internal numerical codes, namely, the enumeration attribute described in FIG. 6. This allows an abstract homing representation of a node and its subtending RCGs to be specified as an R-dimensional assignment vector, where R is a total number of subtending nodes (i.e. RCGs). For example, consider a subnetwork of five switches and ten RCGs wherein numeric codes 1,2,3,4 and 5 identifies the switches and 1,2, . . . ,10 identifies RCGs. If, for example, RCG #1 is homed to MCI switch #3,
RCG #2 is homed to MCI switch #4,
RCG #3 is homed to MCI switch #5,
RCG #4 is homed to MCI switch #3,
RCG #5 is homed to MCI switch #1,
RCG #6 is homed to MCI switch #1,
RCG #7 is homed to MCI switch #2,
RCG #8 is homed to MCI switch #5,
RCG #9 is homed to MCI switch #3, RCG #10 is homed to MCI switch #4, then this homing relationship is represented by the following assignment vector:

$$3\ 4\ 5\ 3\ 1\ 1\ 2\ 5\ 3\ 4$$

Thus, there is a 10-dimensional vector (10 is a number of RCGs) and each coordinate of the vector represents a numeric code of the switch (1 through 5) to which the corresponding RCG is homed (assigned). If RCG #2 is rehomed from switch #4 to switch #1, the result is the following assignment vector:

$$3\ 1\ 5\ 3\ 1\ 1\ 2\ 5\ 3\ 4$$

In general terms, the RR deals with the (S,R)-vector set of all R-dimensional assignment vectors, whose coordinates are integer numbers from 1 to S. The total number of different assignment vectors in the (S,R)-vector set (i.e. number of assignments for S Network Nodes and R Subtending Nodes) is equal to $S^R$.

From the RR perspective, rehoming is a process when a subtending node (e.g. RCG) changes its home network node (e.g. Switch). In terms of assignment, this includes a transition from one assignment vector to another assignment vector in the (S,R)-vector set.

The Cost function Cost(x) is a function of R-dimensional assignment vector $x=(x_1 x_2, \ldots x_R)$ that represents a quality of assignment x in numerical terms. The cost function is a weighted sum of several cost components. As previously discussed, a preferred embodiment cost function is:

$$\mathrm{Cost}(x) = w_1 * (\mathrm{IMT\_Traffic}(x)/\mathrm{IMT\_Traffic}(x_0)) +$$
$$w_2 * (Dist(x)/Dist(x_0)) +$$
$$w_3 * (PB(x)/PB(x_0))$$

The RR goal is to find assignment(s) with minimal cost value where x is a feasible assignment. Constraints are additional business conditions feasible assignment x should satisfy. In mathematical terms, constraints are presented as a set of equalities and/or inequalities:

$g_1(x)<=g_1$
$g_2(x)<=g_2$
$g_n(x)<=g_n$

Assignment x is called feasible if all these inequalities are true; otherwise assignment x is called infeasible. All constraints provided through the GUI are expressed as an equality/inequality. For example:
Switch Capacity Constraints; # ports, BHCA and TPS (for each Switch AAAA):

Total # of circuits of RCGs homed to AAAA (i.e. from assignment vector and field 599C, FIG. 29)<=available number of ports in AAAA (i.e. from field 599D, FIG. 28);

Total amount of Call Attempts processed by AAAA (i.e. from assignment vector and field 599A, FIG. 29)<=available BHCA limit for AAM (i.e. from field 599E, FIG. 28);

Total amount of TPS processed by AAAA (i.e. from assignment vector and field 599F, FIG. 29)<=TPS limit for AMA (i.e. from field 599G, FIG. 28);

Distant Limit Constraints; for every Switch AAAA and RCG BBBB:

There is a predefined limit D(AAAA) on distance between switch AAAA and any RCG that is homed to AAAA. If RCG BBBB is homed to a Switch AAAA then the distance between Switch AAAA and RCG BBBB (i.e. from field 599H, FIG. 31)<=D(AAAA) (i.e. from window 454, FIG. 11).

Distance actually refers to distance between the switch and opposite terminating end (usually POP) of the particular RCG.

Configuration Constraints; expressed in terms of assignment vectors as inequalities and/or equalities.

Homings to avoid, If, for example, RCG 5 should not be homed to a Switch 2, this constraint is expressed as inequality $x_5 \neq 2$.

Diversity, If, for example, RCGs 3, 7 and 11 belong to the same diversity group, coordinates $x_3$, $x_7$ and $x_{11}$ of the assignment vector should be different.

Not to Be Rehomed, If, for example, RCG 5 should not be rehomed from a Switch 2, this constraint is expressed as equality $x_5=2$.

Limit on Number of Rehomings; represents a limit on rehomings number (i.e. number of permutations between original assignment and optimal assignment). This inequality is expressed as:

Number of Rehomings for a given assignment<=limit on Number of Rehomings (i.e. from field 452, FIG. 10).

With regard to constraints, a deficit is a numerical value that measures a constraint violation. If, for example, $g_k(x)<=g_k$ is one of the constraints for assignment A (denoted (A)), and this constraint is not true for an assignment x, then x has a deficit for this constraint, and the value of this deficit is a negative value $g_k - g_k(x)$. For example, if a constraint: "Total # of circuits of all RCGs that are homed to Switch AAAA<=number of ports in AAAA" is not true for an assignment x, then assignment x has a deficit for number of ports in AAAA, and this deficit is equal to a (negative) value: (number of ports in AAAA)—(Total number of circuits of all RCGs that are homed to switch AMA).

A feasibility function F(x) gives a numerical estimate of feasibility for a given assignment x. If assignment x is feasible (i.e. all constraints are true), F(x)=0. Otherwise, F(x)=sum or maximum (depending on the Norm Type of Feasibility value specified in field 510 of FIG. 21) of all deficits for all constraints.

Rehoming Resolver (RR) 110 processing starts in block 888 and flows to block 890 which accesses the RR input structure for the session which was invoked for execution. FIG. 53 can be simultaneously and independently executed for a plurality of sessions. RR input structure data is made readily accessible in memory. Thereafter, block 892 calculates a feasibility of an Original Assignment vector (OA). Feasibility calculation is described by FIG. 54. The OA is an original configuration (homing relationship) of a network before applying an optimal solution. If no reasonable original configuration is known, the OA may be selected with a random number generator method. Processing continues to block 894. If the OA is not feasible in block 894, then subsequent processing will attempt to find a feasible solution. Block 896 sets a Current Assignment vector variable (CA) to OA. Thereafter, block 898 initializes a loop index k to 1 and block 900 determines whether a current loop iteration completes processing for the loop.

If in block 900, the variable k is greater than the depth of search specified by the user (FIG. 21, window 508), block 936 prepares user interface values by mapping internal numeric identifiers for switches and RCGs back to their names using tables built in block 848 of FIG. 52. The fact that block 936 was arrived at by block 900 implies no solutions were found. Block 936 and subsequent processing may also be arrived at after successfully finding solutions. Block 936 continues to block 938 which indicates a completion status in the user interface for the particular session and on to block 940 which displays solution results to the user, for example, using FIGS. 27A through 27F and associated functionality. Block 940 flows back to block 866 of FIG. 52 by way of off page connector 2000.

Referring back to block 900, if k is less than or equal to the depth of search, block 902 generates a random permutation p of the set {1, . . . ,R}, where R is a number of subtending nodes (e.g. RCGs) in the problem scope. A permutation p of the R-dimensional vector (1,2,3, . . . ,R) is another R-dimensional vector (p(1),p(2),p(3), . . . ,p(R)) of which coordinates are rearrangements of integers 1 to R. The R-dimensional vector has R!=1×2×3× . . . xR permutations. For example, vector (1,2,3) has 3!=1×2×3=6 permutations: (1,2,3), (1,3,2), (2,1,3), (2,3,1), (3,1,2) and (3,2,1). A random permutation of an R-dimensional vector is a permutation which is selected randomly with a probability 1/R! from the set of all R! different permutations of R-dimensional vector (1,2,3, . . . ,R). Block 902 flows to block 904 for a processing loop to check a feasibility value F for all assignments from a k-neighborhood of the CA using a (p,k)-enumeration method where p is a permutation from block 902. The (p,k) enumeration method defines the sequence order in which all R-dimensional assignment vectors are processed. For a given k-neighborhood, all assignments therein are checked for feasibility and if the next assignment NA is better than a previous assignment CA.

With reference now to FIG. 57, shown is a preferred embodiment for implementing a (p,k) enumeration method. FIG. 57 demonstrates with a C programming example. Those skilled in the art will appreciate varying embodiments for implementing the (p,k) enumeration method without departing from the spirit and scope of the invention. FIG. 57 is provided as a precise reference.

An assignment with a better feasibility value is sought. The term k-neighborhood, as used herein, is with regard to an assignment x in the (S,R)-vector set and is a set of all such assignment vectors y from the same (S,R)-vector set that differ from x at most in k coordinates. For example, consider three switches and six RCGs (S=3, R=6), and an assignment vector (2,2,1,3,1,1) from the (3,6)-vector set. The 1-neighborhood of this vector consists of the assignment vectors (1,2,1,3,1,1), (3,2,1,3,1,1), (2,1,1,3,1,1), (2,3,1,3,1,1), (2,2,2,3,1,1), (2,2,3,3,1,1), (2,2,1,1,1,1), (2,2,1,2,1,1), (2,2,2,3,2,1), (2,2,3,3,3,1), (2,2,1,1,1,2), and (2,2,1,2,1,3). With reference back to FIG. 53, if in block 904 all assignments from the k-neighborhood of the CA were not yet processed, block 906 sets a Next Assignment vector variable (NA) by selecting from k-neighborhood of the CA using a (p,k)-enumeration method, where p is a permutation generated by block 902. Block 906 flows to block 908. If in block 908 NA is not feasible (i.e. F(NA) not equal to 0), then processing continues to block 914. If in block 914, the NA is better than the CA (i.e. F(NA)>F(CA)), the CA is set to NA in block 912 which then flows to block 898 for processing as previously described. If in block 914, the NA is not better than CA, block 916 increments the variable k by 1 and loop processing continues back to block 900. Referring back to block 904, if all k-neighborhood assignments were processed, then processing continues to block 916 which was already described. Referring back to block 908, if the NA was feasible, the Starting Assignment vector variable (SA) is set to the NA in block 910. Thereafter, block 920 sets the CA to the SA. Referring back to block 894, if the OA was feasible, the SA is set to OA in block 918 and processing continues to block 920. Block 920 is arrived at only when there is at least one feasible solution to have been determined by all processing heretofore described for FIG. 53.

Subsequent processing to block 920 gathers all optimized rehoming solutions. Block 920 flows to block 922 where the variable k is initialized to 1 and on to block 924. If in block 924 k is less than or equal to the depth of search specified by the user, block 926 generates a random permutation p of the set {1, . . . ,R}, where R is a number of subtending nodes (e.g. RCGs) in the problem scope. Block 926 operates in the same manner as block 902.

Block 926 continues to block 928 for a processing loop to check cost value of all feasible assignments from the k-neighborhood of the CA using the (p,k)-enumeration method where p is a permutation from block 926. The best cost value feasible assignment is sought. If in block 928, all assignments from the k-neighborhood of the CA were not yet processed, block 930 sets a Next Assignment vector variable (NA) by selecting from k-neighborhood of the CA using the (p,k)-enumeration method, where p is a permutation generated by block 926. Blocks 928 and 930 operate similarly to blocks 904 and 906, respectively. Block 930 flows to block 932. If in block 932, the NA is feasible (i.e. F(NA)=0) and has a better cost than the CA (Cost(NA) <Cost(CA)), then block 942 sets the CA to the NA and block 943 updates the solution stock. The solution stock includes up to n solutions, where n is the number of solutions specified in window 490 of FIG. 20. Block 943 will update the solution stock in a priority order with the best solutions (as determined by minimized cost) appearing first in the stock. Block 943 continues to block 944. If in block 944, time elapsed since the last time of solution file update is greater than the check point time specified in window 496 of FIG. 20, then block 945 updates a solution file as embodied by FIGS. 27B through 27F. A contiguous file is internally maintained for all solutions, although the user has the perception that individual solution files are maintained. Block 945 then continues to If in block 927, the user check marked impatient logic on check mark box 512 of FIG. 21, then block 927 continues to block 928 for processing as described. If in block 927, the user did not select impatient logic, then block 927 continues to block 922 for processing as described. Referring back to block 944, if time elapsed since the update of the solution file is not greater than the specified check point time, then block 944 continues to block 927 for processing as described.

Referring back to block 932, If the NA is not feasible or not a better cost than the CA, processing continues to block 934 where the variable k is incremented by 1 and loop processing continues back to block 924.

Referring back to block 928, if all k-neighborhood assignments of CA were processed, then processing continues to block 934 for processing as described. Referring back to block 924, if k is greater than the depth of search specified, block 924 flows to block 936 for processing previously described. Solutions which are feasible and meet cost objectives pertain to processing in block 936 and subsequent processing. The user may opt to automatically apply processing of a solution to a network administration interface as determined by block 849 of FIG. 52 after FIG. 53 flows back to FIG. 52 by way of off page connector 2000. The user may also browse solutions and manually use an administration interface accordingly.

Figure 54:
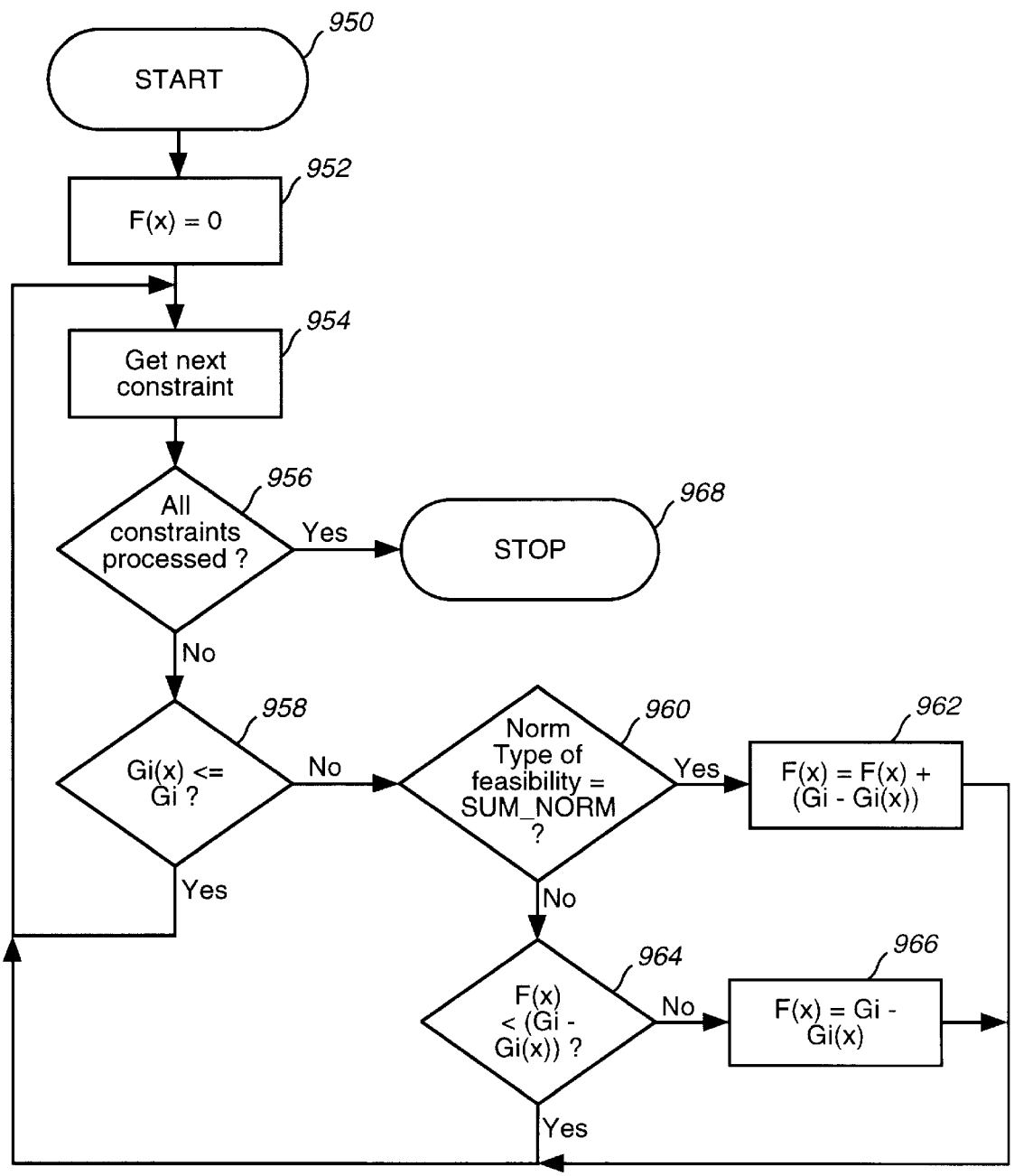

With reference now to FIG. 54, calculation of feasibility is demonstrated with regard to a feasibility value F(x) for an assignment x with a set of n constraints:

$g_1(x)<=g_1$
$g_2(x)<=g_2$
$g_n(x)<=g_n$

Feasibility calculations are performed in FIG. 53 blocks 894, 908, 914 and 932. Processing starts in block 950 and flows to block 952 where the feasibility function F(x) is initialized to 0. Thereafter, block 954 gets the next constraint $g_i$. If in block 956, all constraints have not yet been processed, the current constraint for assignment x is estimated in block 958. If in block 958 the constraint is true for the assignment x, processing flows back to block 954 for processing the next constraint of assignment x. If in block 958 the constraint is not true for the assignment x, then processing continues to block 960. If in block 960, the user selected a Norm Type of feasibility equal to SUM_NORM in window 510 of FIG. 21, then block 962 increments the feasibility function with the deficit for the i-th constraint. Block 962 then continues back to block 954 for processing as previously described. If in block 960, the user did not select SUM_NORM in the user interface, block 964 continues processing. If in block 964, the feasibility value F(x) is not less than the deficit for the i-th constraint, then block 966 sets the feasibility function to the deficit for the i-th constraint and processing flows back to block 954. If in block 964, the feasibility value F(x) is less than the deficit for the i-th constraint, then processing continues back to block 954. Referring back to block 956, if all constraints have been processed, processing terminates in block 968 and the feasibility value F(x) has been assessed.

With reference now to FIGS. 55A through 55D, and FIG. 56, cost function determination as utilized in block 932 of FIG. 53 is further described. In a preferred embodiment, formal definitions for three components follow.

IMT traffic (or intraswitch traffic) is total traffic between those pairs of RCGs that are homed (according to assignment x) to mutually different switches. IMT traffic for assignment x is calculated by the formula:

$$IMT\_\text{traffic}(x) = \Sigma_{ij} Traf(i,j): x_i \neq x_j,$$

where Traf(i,j) is an amount of traffic originated on the i-th RCG and terminated on the j-th RCG; coordinates $x_i$ and $x_j$ are numeric codes of the switches i-th and j-th RCGs are assigned to, respectively. Traffic data is available from field 599B, FIG. 30.

Total Distance Dist(x) is a sum of all distances between RCGs and switches the RCGs are homed to, according to assignment x. Total distance is calculated by the formula:

$$Dist(x) = \Sigma D(i, x_i),$$

where $D(i, x_i)$ is a distance between RCG i and switch $x_i$ that the i-th RCG is assigned to. This data is available from field 599H, FIG. 31.

Port Balancing component PB is a dispersion of port utilization. This non-negative number estimates in numeric terms how evenly port utilizations are distributed among all switches in the scope of the problem. The larger the PB value, the more dispersion exists between port utilization for different switches. If PB=0, all switches have the same port utilization. The following statistical formula is used to calculate the port balancing component PB as a dispersion of port utilization PU(i):

$$PB(x) = sqrt((\Sigma_i (PU(i) - AVG\_PU)^2)/(S-1)),$$

where sqrt is a square root symbol, S is a number of switches, AVG_PU is an average port utilization calculated by formula:

$$AVG\_PU = (\Sigma_i PU(i))/S,$$

Port utilization for the i-th switch PU(i) is calculated by the formula:

$$PU(i) = Used\_port(i)/Switch\_port(i),$$

where Switch_port(i) is a total number of ports in the i-th switch which is available for local circuits (from field 599D, FIG. 28), and Used_port(i) is a number of ports in i-th switch which is used for local circuits:

$$Used\_port(i) = \Sigma_j RCG\_ckt(j) \text{ such that } x_j = i,$$

where RCG_ckt(j) is a number of circuits in the j-th RCG wherein the sum is taken over all those RCGs j that are assigned to i-h switch. RCG_ckt(j) data is available from field 599C, FIG. 29.

Figure 55A:
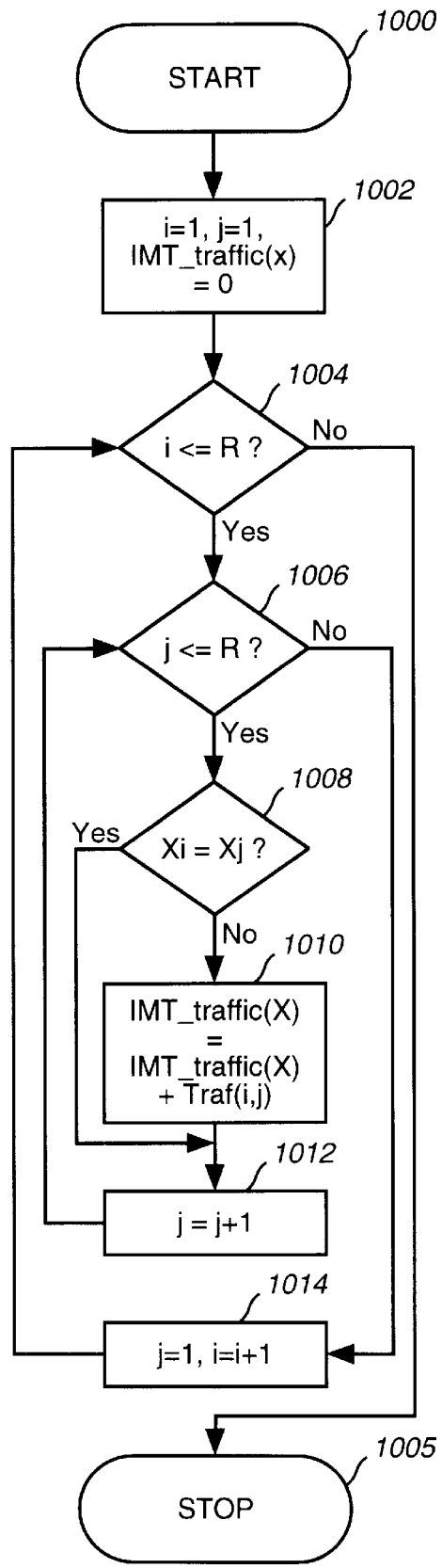

With reference in particular to FIG. 55A, a preferred embodiment for calculating the IMT traffic component for a given assignment x is demonstrated. Processing starts in block 1000 and flows to block 1002. At block 1002 a calculation of IMT_traffic(x) begins with initialization of variables i and j (internal numbers for pair of RCGs) to 1 and IMT_traffic(x) to 0. Thereafter, block 1004 determines whether a current main loop iteration completes processing. If in block 1004, the variable i is not greater than the number of RCGs R, then processing continues to block 1006. Block 1006 determines whether a current inner loop iteration completes processing. If in block 1006, the variable j is not greater than the number of RCGs R, then processing continues to block 1008. Block 1008 determines whether i-th and j-th RCGs are homed to the same switch. If in block 1008, $x_i$ is not equal to $x_j$ (i.e. i-th and j-th RCGs are not homed to the same switch), processing continues to block 1010. Block 1010 calculates IMT_traffic(x) (interswitch traffic) by summarization of traffic amounts between all i-th and j-th RCGs that are not homed to the same switch. Block 1010 flows to block 1012 where the variable j is incremented by 1 and inner loop processing continues back to block 1006. Referring back to block 1008, if $x_i$ is equal to $x_j$ (i.e. i-th and j-h RCGs are homed to the same switch), processing continues to block 1012 which was already described. Referring back to block 1006, if the variable j is greater than the number of RCGs R, then processing continues to block 1014. Block 1014 initializes variable j to 1, increments variable i by 1 and outer loop processing continues back to block 1004. Referring back to block 1004, if the variable i is greater than the number of RCGs R, then processing terminates in block 1005 and the IMT traffic component for a particular assignment x has been calculated.

Figure 55B:
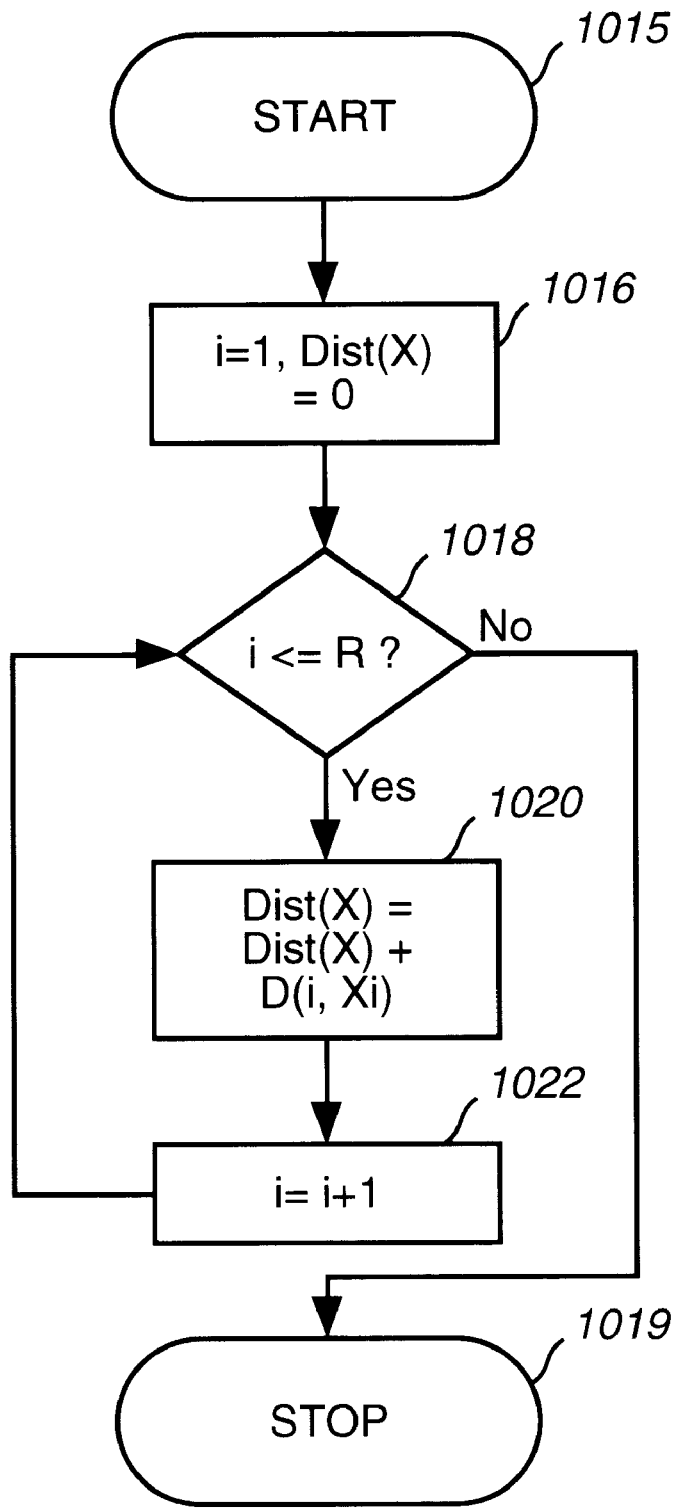

With reference now to FIG. 55B, a preferred embodiment for calculating the Distance component for a given assignment x is demonstrated. Processing starts in block 1015 and flows to block 1016. At block 1016 a calculation of total distance Dist(x) between RCGs and their respective home switches begins with initialization of variable i to 1 and Dist(x) to 0. Block 1016 flows to block 1018. Block 1018 determines loop iteration. If in block 1018, the variable i is not greater than the number of RCGs R, then processing continues to block 1020. Block 1020 calculates Dist(x) by summarization of distances $D(i, x_i)$ between the i-th RCG and the switch $x_i$ that the RCGs are homed to. Block 1020 flows to block 1022 where the variable i is incremented by 1 and loop processing continues back to block 1018. Referring back to block 1018, if the variable i is greater than the number of RCGs R, then processing terminates in block 1019 and the Distance component for a particular assignment x has been calculated.

Figure 55C:
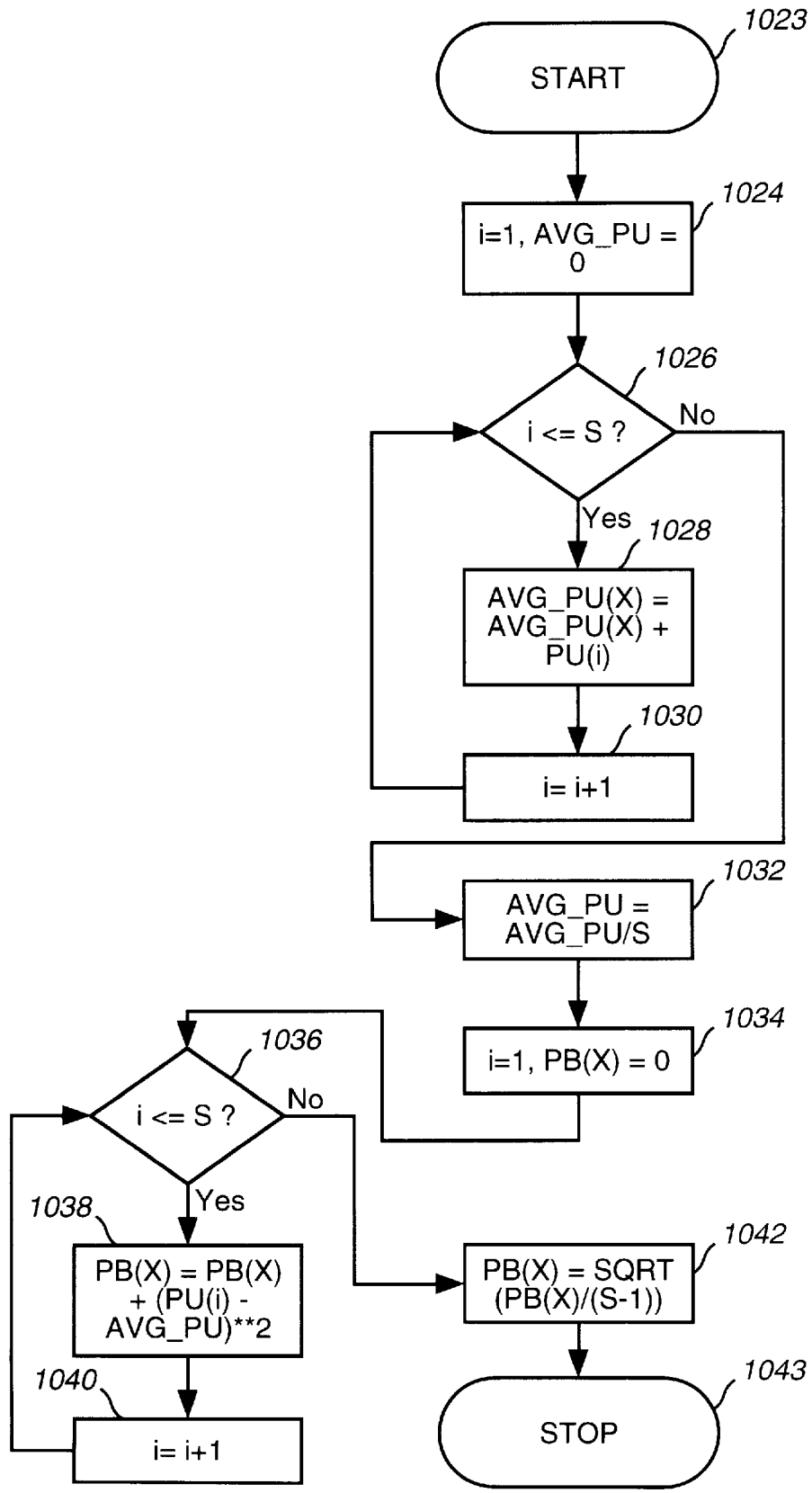
Figure 55D:
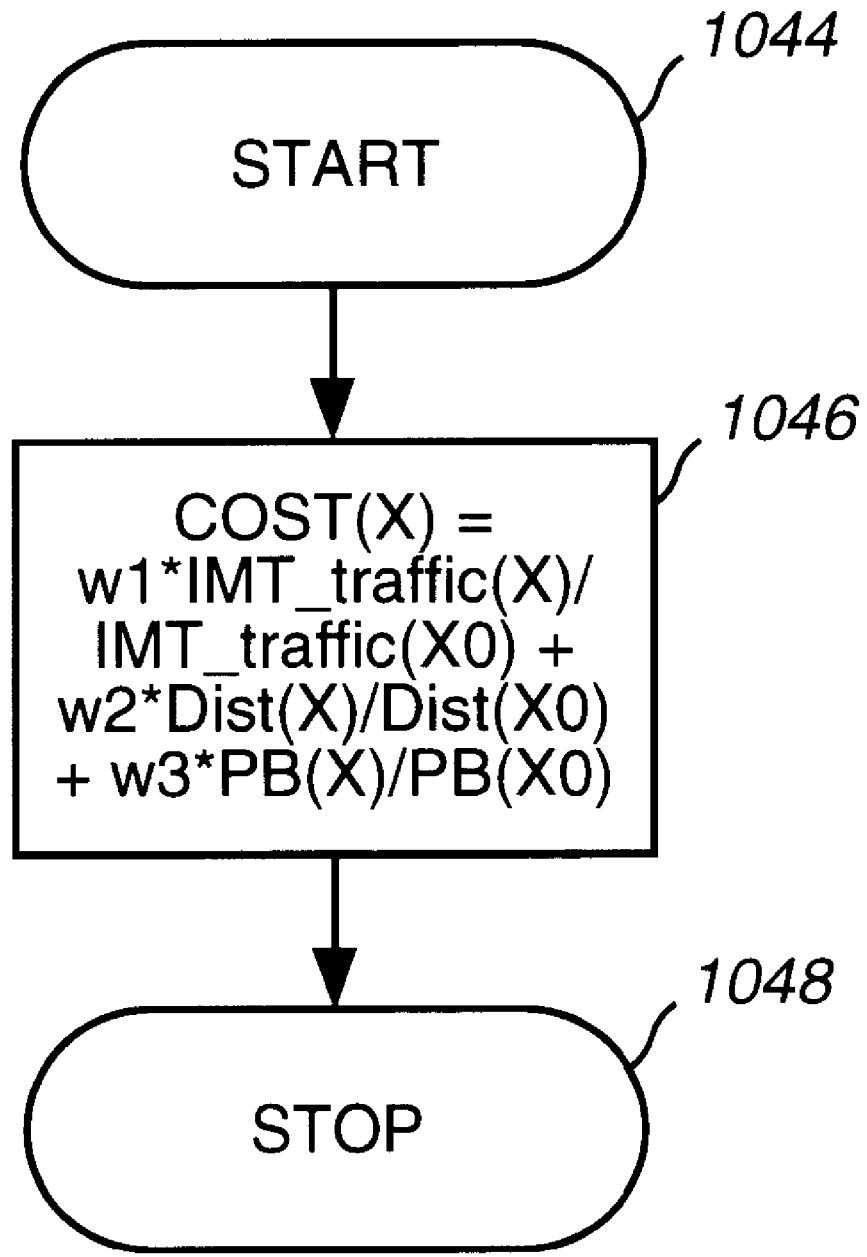

With reference now to FIG. 55C, a preferred embodiment for calculating the Port Balancing component for a given assignment x is demonstrated. Processing starts in block 1023 and flows to block 1024. At block 1024 a calculation of average port utilization AVG_PU begins with initialization of variable i to 1 and AVG_PU to 0. Block 1024 flows to block 1026. Block 1026 determines whether a current loop iteration completes. If in block 1026 the variable i is not greater than the number of switches S, then processing continues to block 1028. Block 1028 accumulates in AVG_PU a total amount of port utilization PU(i) for all switches. Block 1028 flows to block 1030 where the variable i is incremented by 1 and loop processing continues back to block 1026. Referring back to block 1026, if the variable i is greater than the number of switches S, then processing continues to block 1032. In block 1032 an average port utilization AVG_PU is calculated as a total amount of port utilization for all switches (stored in AVG_PU) divided by the number of switches S. Processing continues to block 1034. At this point a calculation of average port utilization AVG_PU is completed. At block 1034 a calculation of port balancing PB(x) begins with initialization of variable i to 1 and PB(x) to 0. Block 1034 flows to block 1036. Block 1036 determines whether a current loop iteration completes. If in block 1036, the variable i is not greater than the number of switches S, then processing continues to block 1038. Block 1038 accumulates in PB(x) a square deviations of port utilization values PU(i) from its average AVG_PU. Block 1038 flows to block 1040 where the variable i is incremented by 1 and loop processing continues back to block 1036. Referring back to block 1036, if the variable i is greater than the number of switches S, then processing continues to block 1042. In block 1042, a port balancing PB(x) is calculated as a square root of total square deviations (stored in PB(x)) divided by the quantity (S−1). Processing then terminates in block 1043 and the Port Balancing component for a particular assignment x has been calculated With reference now to FIG. 55D, a preferred embodiment for calculating the cost function is demonstrated. Processing starts in block 1044 and flows to block 1046. At block 1046 a cost value Cost(x) for a given assignment x and an original assignment $x_0$ is calculated as a weighted sum as heretofore described. Components are derived according to FIGS. 55A through 55C. Weight coefficients $w_1$, $w_2$ and $w_3$ for the Cost(x) calculation are specified by a user on FIG. 10 as a Cost per Erlang of IMT traffic (window 500), Cost per mile of POP-switch distance (window 502) and on FIG. 18 as Port balance coefficient (window 506). Thereafter, processing terminates in block 1048.

Figure 56:
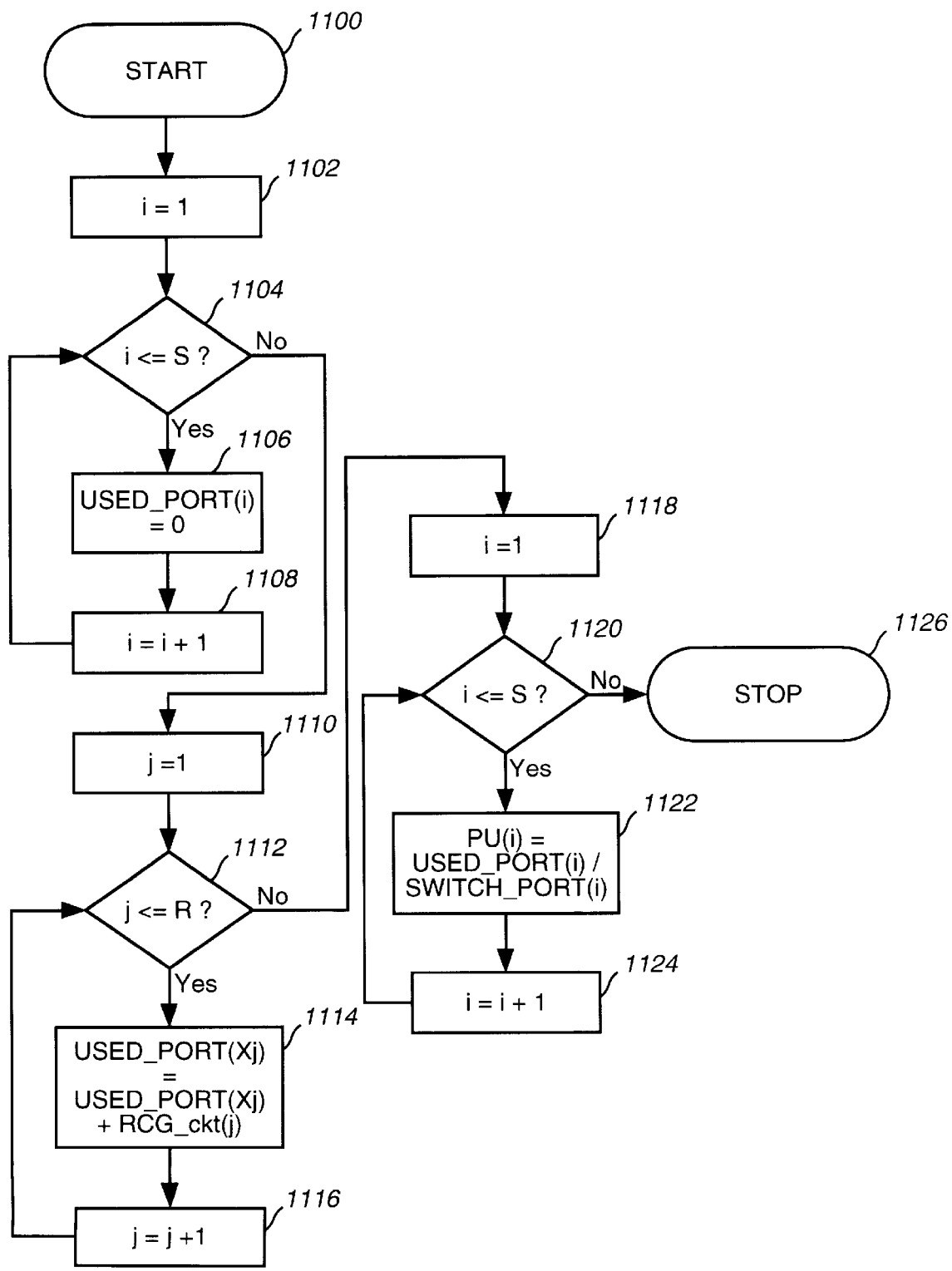

With reference now to FIG. 56, a preferred embodiment for calculation of the Port utilization array PU for an assignment x is demonstrated. Block 1028 and 1038 of FIG. 55C required such a calculation. Processing starts in block 1100 and flows to block 1102. At blocks 1102 through 1108, elements of array USED_PORT(i) are initialized to 0. Block 1102 initializes a variable i to 1. Block 1102 flows to block 1104. Block 1104 determines whether a current loop iteration completes processing for the loop. If in block 1104 the variable i is not greater than the number of switches S, then processing continues to block 1106. Block 1106 initializes a value USED_PORT(i) to 0. Block 1106 flows to block 1108 where the variable i is incremented by 1 and loop processing continues back to block 1104. Referring back to block 1104, if the variable i is greater than the number of switches S, then processing continues to block 1110. At block 1110 a calculation of array USED_PORT begins with initialization of variable j to 1. Block 1110 flows to block 1112. Block 1112 determines whether a current loop iteration completes processing for the loop. If in block 1112, the variable j is not greater than the number of RCGs R, then processing continues to block 1114. Block 1114 accumulates in USED_PORT($x_j$) the number of circuits of the j-th RCG that is homed to switch $x_j$. Block 1114 flows to block 1116 where the variable j is incremented by 1 and loop processing continues back to block 1112.

Referring back to block 1112, if the variable j is greater than the number of RCGs R, then processing continues to block 1118. At this point a calculation of array USED_PORT is completed. At block 1118 a calculation of Port utilization array PU begins with initialization of variable i to 1. Block 1118 flows to block 1120. Block 1120 determines whether a current loop iteration completes processing for the loop. If in block 1120, the variable i is not greater than the number of switches S, then processing continues to block 1122. Block 1122 calculates PU(i) as USED_PORT(i) divided by number switch_port(i) of available ports in the i-th switch. Block 1122 flows to block 1124 where the variable i is incremented by 1 and loop processing continues back to block 1120. Referring back to block 1120, if the variable i is greater than the number of switches S, then processing terminates in block 1126.

Figure 58:
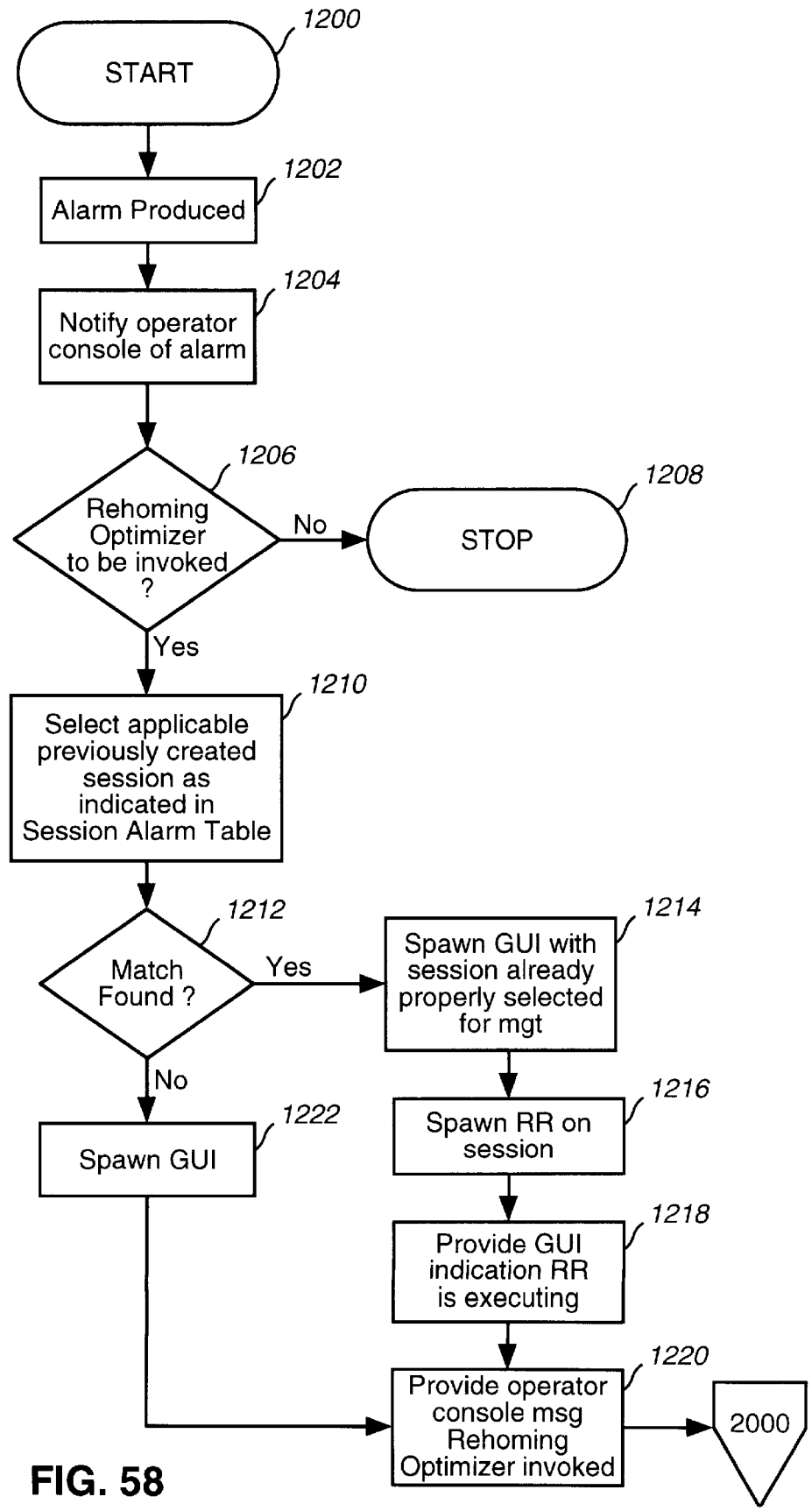
FIG. 58 depicts a flowchart demonstrating the network alarm processing aspect of the present invention.

With reference now to FIG. 58, the alarm processing aspect of the present invention is shown. The alarm processing aspect requires a separately maintained session alarm configuration, preferably embodied as a Session Alarm table, which maps alarm criteria to a previously created rehoming optimizer 108 session. Alarm criteria includes the error code along with the Switch id (FSID) with optional trunk id, circuit id, or combinations thereof. The Key value of a previously managed session is mapped to this criteria. The Session Alarm table will contain at least fields for an alarm code, an FSID and a handle (the Key) to a particular rehoming optimizer 108 session. A user can maintain the Session Alarm table with a flat file editor or a database interface. Values stored therein are appropriately converted for compare to binary values for the alarm, session number, FSID, etc. Block 1200 starts processing and block 1202 produces an alarm. Alarm processing is well known to those skilled in the art and may be caused by a variety of situations. Block 1202 flows to block 1204 where the appropriate operator console(s) are notified with an appropriate message as in current art. Thereafter, if in block 1206, the rehoming optimizer 108 is configured to be automatically spawned, as determined by an environment variable or profile configuration setting (e.g. in config.sys or win.ini), block 1210 accesses the preconfigured Session Alarm table with the alarm criteria and retrieves a matching entry's session enumeration value. The enumeration value, as embodied by the Key field in FIG. 22, is the handle to the saved session in the shared database repository discussed for blocks 840 and 868 of FIG. 52.

Thereafter, if in block 1212, a match is found, block 1214 spawns the rehoming optimizer 108 with the matched session. The rehoming optimizer 108 is initialized therein in a manner such that processing of blocks 852, 842, 840 and 838 of FIG. 52, respectively, takes place. Process continues therefrom to block 1216 where the session is automatically spawned with the RR as described by blocks 858 and 876, respectively, of FIG. 52. Block 1216 flows to block 1218 where the GUI is appropriately updated as described by block 884 in FIG. 52, to indicate the RR is executing. Block 1218 then flows to block 1220 where the Operator console is notified that the rehoming optimizer 108 has been invoked. Further investigation by the user will provide whether or not the rehoming optimizer 108 is currently executing to find optimal solutions. Thereafter, block 1220 flows to block 866 of FIG. 52 for processing as heretofore described, by way of off page connector 2000. Referring back to block 1212, if a match was not found according to the alarm, block 1222 spawns the rehoming optimizer 108 with no special initialization provisions. Thereafter, block 1222 flows to block 1220 for processing already described. Referring back to block 1206, if the operator console system was not configured to automatically invoke the rehoming optimizer 108, processing terminates in block 1208.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for rehome optimization of a telecommunications network, said method comprising:
    constructing a set of rehome circuit groups and data associated thereof;
    specifying a problem scope as a subset of said set of rehome circuit groups;
    specifying input for predicating said rehome optimization, wherein the step of specifying input for predicating said rehome optimization comprises the step of specifying a cost function comprising:
        specifying cost function components;
        specifying a number of solutions for report of said rehome optimization solutions;
        calculating rehome cost for each candidate rehome optimization solution in accordance with said cost function; and
        confining report of said rehome optimization solutions with respect to said number of solutions and in accordance with said rehome cost for each candidate rehome optimization solution in accordance with said cost function; and
    calcalating rehome optimization solutions for said problem scope in accordance with said input.

2. The method of claim 1 wherein the step of specifying cost function components further comprises the step of associating a user defined weight coefficient to each of said cost function components.

3. The method of claim 1 wherein the step of specifying cost function components further comprises the step of specifying an intermachine trunk traffic measurement component.

4. The method of claim 1 wherein the step of specifying cost function components further comprises the step of specifying a distance component.

5. The method of claim 1 wherein the step of specifying cost function components further comprises the step of specifying a port balancing component.

6. A method in a data processing system for rehome optimization of a telecommunications network, said method comprising:
    constructing a set of rehome circuit groups and data associated thereof;
    specifying a problem scope as a subset of said set of rehome circuit groups;
    specifying input for predicating said rehome optimization; and
    calculating rehome optimization solutions for said problem scope in accordance with said input, wherein the step of calculating rehome optimization solutions for said problem scope in accordance with said input further comprises the steps of:
        generating unique rehome circuit group enumeration for said rehome circuit groups;
        generating unique switch enumeration for switches for which said rehome circuit groups capable of being homed;
        constructing a set of assignment vectors according to said unique circuit group enumeration and said unique switch enumeration; and
        sequencing candidate assignment vectors of said set of assignment vectors.

7. The method of claim 6 further comprising the steps of:
    associating constraints with said candidate assignment vectors;
    associating a feasibility function with said candidate assignment vectors according to said constraints;
    assessing feasibility of said candidate assignment vectors in accordance with said feasibility function; and
    selecting a feasible assignment vector from said candidate assignment vectors according to said feasibility function.

8. The method of claim 7 further comprising the steps of:
    associating a cost function with said set of assignment vectors;
    calculating a cost for said candidate assignment vectors; and
    constructing rehome optimization solution information for said set of assignment vectors from said candidate assignment vectors in accordance with said feasibility function and said cost function.

9. The method of claim 6 wherein the step of sequencing candidate assignment vectors comprises the steps of:
    constructing an (S,R)-vector set of said set of assignment vectors for a number S of switches and a number R of rehome circuit groups;
    constructing a k-neighborhood from said (S,R)-vector set for a depth of search parameter k;
    constructing a random permutation p for said number R of rehome circuit groups;
    performing (p,k)-enumeration of said set of assignment vectors in said k-neighborhood; and
    sequencing said set of assignment vectors in said (S,R)-vector set in order of said (p,k)-enumeration.

10. The method of claim 8 further comprising the step of reporting said rehome optimization solution information.

11. The method of claim 10 wherein the step of reporting said rehome optimization solution information further comprises the step of reporting rehome optimization solutions in a priority order.

12. The method of claim 10 wherein the step of reporting said rehome optimization solution information further comprises the step of reporting the best rehome optimization solution.

13. A method in a data processing system for automatically creating logical groups of data for the purpose of rehome optimization of a telecommunications network, said method comprising the steps of:

automatically accessing a plurality of network system data repositories;

comparing data found in said plurality of network system data repositories;

complementing data found in said plurality of network system data repositories;

constructing a set of rehome circuit groups and associated data thereof;

creating a working copy of said set of rehome circuit groups and associated data thereof;

presenting a user interface to a user for managing said working copy of said set of rehome circuit groups and associated data thereof; and altering only said working copy of said set of rehome circuit groups and associated data thereof.

* * * * *